(12) United States Patent
Huang

(10) Patent No.: US 12,158,566 B2
(45) Date of Patent: Dec. 3, 2024

(54) OPTICAL IMAGE LENS ASSEMBLY, IMAGE CAPTURING UNIT AND ELECTRONIC DEVICE INCLUDING NINE LENSES OF +--+---+-, +-+++--+-, +---++-+-, +--+++-+- or +---+-+-+- REFRACTIVE POWERS

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/378,115

(22) Filed: Oct. 9, 2023

(65) Prior Publication Data
US 2024/0061215 A1    Feb. 22, 2024

Related U.S. Application Data

(63) Continuation of application No. 17/075,568, filed on Oct. 20, 2020, now Pat. No. 11,815,662.

(30) Foreign Application Priority Data

Aug. 28, 2020 (TW) .................. 109129595

(51) Int. Cl.
G02B 13/00    (2006.01)
G02B 9/64    (2006.01)

(52) U.S. Cl.
CPC ........... G02B 13/0045 (2013.01); G02B 9/64 (2013.01)

(58) Field of Classification Search
CPC .............................. G02B 13/0045; G02B 9/64
See application file for complete search history.

(56) References Cited

U.S. PATENT DOCUMENTS 4,824,236 A    4/1989    Jeda
5,229,887 A    7/1993    Hayashi et al.
(Continued)

FOREIGN PATENT DOCUMENTS

CN    101365975 A    2/2009
CN    101553748 A    10/2009
(Continued)

OTHER PUBLICATIONS

TW Office Action dated Nov. 13, 2020 as received in Application No. 109129595.
(Continued)

*Primary Examiner* — Wen Huang
(74) *Attorney, Agent, or Firm* — Maschoff Brennan

(57) ABSTRACT

An optical image lens assembly includes nine lens elements which are, in order from an object side to an image side along an optical path: a first lens element, a second lens element, a third lens element, a fourth lens element, a fifth lens element, a sixth lens element, a seventh lens element, an eighth lens element and a ninth lens element. Each of the nine lens elements has an object-side surface facing toward the object side and an image-side surface facing toward the image side. The first lens element has positive refractive power. The second lens element has negative refractive power. The image-side surface of the ninth lens element is concave in a paraxial region thereof and has at least one inflection point.

28 Claims, 24 Drawing Sheets

(56) References Cited

U.S. PATENT DOCUMENTS

| | | | |
|---|---|---|---|
| 5,455,713 A | 10/1995 | Kreitzer | |
| 11,106,014 B2 | 8/2021 | Kuo | |
| 11,340,430 B2 | 5/2022 | Chen | |
| 2009/0225441 A1 | 9/2009 | Do | |
| 2010/0118416 A1 | 5/2010 | Do | |
| 2013/0162889 A1 | 6/2013 | Kurioka | |
| 2019/0049705 A1 | 2/2019 | Cook | |
| 2020/0209593 A1 | 7/2020 | Hirano | |
| 2020/0209594 A1 | 7/2020 | Hirano | |
| 2020/0393648 A1 | 12/2020 | Lin et al. | |
| 2020/0393652 A1 | 12/2020 | Kuo | |
| 2020/0393653 A1 | 12/2020 | Chen | |
| 2021/0382281 A1 | 12/2021 | Huang et al. | |
| 2021/0396965 A1 | 12/2021 | Hsieh et al. | |
| 2022/0057605 A1* | 2/2022 | Li | G02B 13/0045 |
| 2023/0034285 A1 | 2/2023 | Hsu et al. | |

FOREIGN PATENT DOCUMENTS

| | | |
|---|---|---|
| CN | 209879119 U | 12/2019 |
| CN | 110716293 A | 1/2020 |
| CN | 111381350 A | 7/2020 |
| CN | 111443465 A | 7/2020 |
| CN | 111694137 A | 9/2020 |
| CN | 113238366 A | 8/2021 |
| JP | H03-131808 A | 6/1991 |
| JP | H05-93864 A | 4/1993 |
| JP | H08-297247 A | 11/1996 |
| JP | H11-23969 A | 1/1999 |
| JP | H11-52240 A | 2/1999 |
| JP | H11-64730 A | 3/1999 |
| JP | 2002-196234 A | 7/2002 |
| JP | 2011-070174 A | 4/2011 |
| JP | 2011-075632 A | 4/2011 |
| TW | I684807 B | 2/2020 |
| TW | I691751 B | 4/2020 |
| TW | I694268 B | 5/2020 |
| WO | 2021/197398 A1 | 10/2021 |

OTHER PUBLICATIONS

IN Patent Examination Report dated Mar. 8, 2022 as received in Application No. 202034054980.

* cited by examiner

OPTICAL IMAGE LENS ASSEMBLY, IMAGE CAPTURING UNIT AND ELECTRONIC DEVICE INCLUDING NINE LENSES OF +--+---+-, +-+++--+-, +---++-+-, +--+++-+- or +---+-+-+- REFRACTIVE POWERS

RELATED APPLICATIONS

This application is a continuation patent application of U.S. application Ser. No. 17/075,568 filed on Oct. 20, 2020, which claims priority to Taiwan Application 109129595, filed on Aug. 28, 2020, which is incorporated by reference herein in its entirety.

BACKGROUND

Technical Field

The present disclosure relates to an optical image lens assembly, an image capturing unit and an electronic device, more particularly to an optical image lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical image lens assembly includes nine lens elements. The nine lens elements are, in order from an object side to an image side along an optical path, a first lens element, a second lens element, a third lens element, a fourth lens element, a fifth lens element, a sixth lens element, a seventh lens element, an eighth lens element and a ninth lens element. Each of the nine lens elements has an object-side surface facing toward the object side and an image-side surface facing toward the image side.

The first lens element has positive refractive power. The second lens element has negative refractive power. The image-side surface of the ninth lens element is concave in a paraxial region thereof and has at least one inflection point.

When a total number of lens elements having an Abbe number smaller than in the optical image lens assembly is NV40, a maximum image height of the optical image lens assembly is ImgH, and an axial distance between the image-side surface of the ninth lens element and an image surface is BL, the following conditions are satisfied:

$5 \leq NV40 \leq 9$; and $3.90 < ImgH/BL < 15.0$.

According to another aspect of the present disclosure, an optical image lens assembly includes nine lens elements. The nine lens elements are, in order from an object side to an image side along an optical path, a first lens element, a second lens element, a third lens element, a fourth lens element, a fifth lens element, a sixth lens element, a seventh lens element, an eighth lens element and a ninth lens element. Each of the nine lens elements has an object-side surface facing toward the object side and an image-side surface facing toward the image side.

The first lens element has positive refractive power. The second lens element has negative refractive power. The image-side surface of the ninth lens element is concave in a paraxial region thereof and has at least one inflection point.

When a total number of lens elements having an Abbe number smaller than 40 in the optical image lens assembly is NV40, a curvature radius of the object-side surface of the eighth lens element is R15, and a curvature radius of the image-side surface of the eighth lens element is R16, the following conditions are satisfied:

$5 \leq NV40 \leq 9$; and $-0.50 < R15/R16 < 0.70$.

According to another aspect of the present disclosure, an image capturing unit includes one of the aforementioned optical image lens assemblies and an image sensor, wherein the image sensor is disposed on the image surface of the optical image lens assembly, and the image sensor has at least 40 megapixels or has a size larger than 1/1.4 inches.

According to another aspect of the present disclosure, an electronic device includes at least two image capturing units which face the same direction. The at least two image capturing units includes a first image capturing unit and a second image capturing unit. The first image capturing unit includes one of the aforementioned optical image lens assemblies and an image sensor that is disposed on the image surface of the optical image lens assembly. The second image capturing unit includes an optical lens assembly and an image sensor that is disposed on an image surface of the optical lens assembly. A maximum field of view of the first image capturing unit and a maximum field of view of the second image capturing unit differ by at least 20 degrees.

BRIEF DESCRIPTION OF THE DRAWINGS

The disclosure can be better understood by reading the following detailed description of the embodiments, with reference made to the accompanying drawings as follows.

DETAILED DESCRIPTION

An optical image lens assembly includes nine lens elements. The nine lens elements are, in order from an object side to an image side along an optical path, a first lens element, a second lens element, a third lens element, a fourth lens element, a fifth lens element, a sixth lens element, a seventh lens element, an eighth lens element and a ninth lens element. Each of the nine lens elements has an object-side surface facing toward the object side and an image-side surface facing toward the image side.

The first lens element has positive refractive power. Therefore, it is favorable for providing significant light convergence so as to effectively reduce the size of the optical image lens assembly for the miniaturization requirement.

The second lens element has negative refractive power. Therefore, it is favorable for correcting aberrations generated by the first lens element so as to correct spherical aberration and chromatic aberration. The object-side surface of the second lens element can be convex in a paraxial region thereof, and the image-side surface of the second lens element can be concave in a paraxial region thereof. Therefore, it is favorable for effectively correcting aberrations generated by the first lens element and for controlling light rays in both tangential and sagittal directions so as to correct astigmatism.

The seventh lens element can have negative refractive power. Therefore, it is favorable for arranging a proper refractive power distribution of the optical image lens assembly so as to achieve good image quality. The image-side surface of the seventh lens element can be concave in a paraxial region thereof and can have at least one convex critical point in an off-axis region thereof. Therefore, it is favorable for partially adjusting light convergence for off-axis fields and increasing peripheral image quality in close-up photography. Please refer to FIG. 21, which shows a schematic view of a convex critical point C on the image-side surface 172 of the seventh lens element 170 according to the 1st embodiment of the present disclosure.

Figure 21:
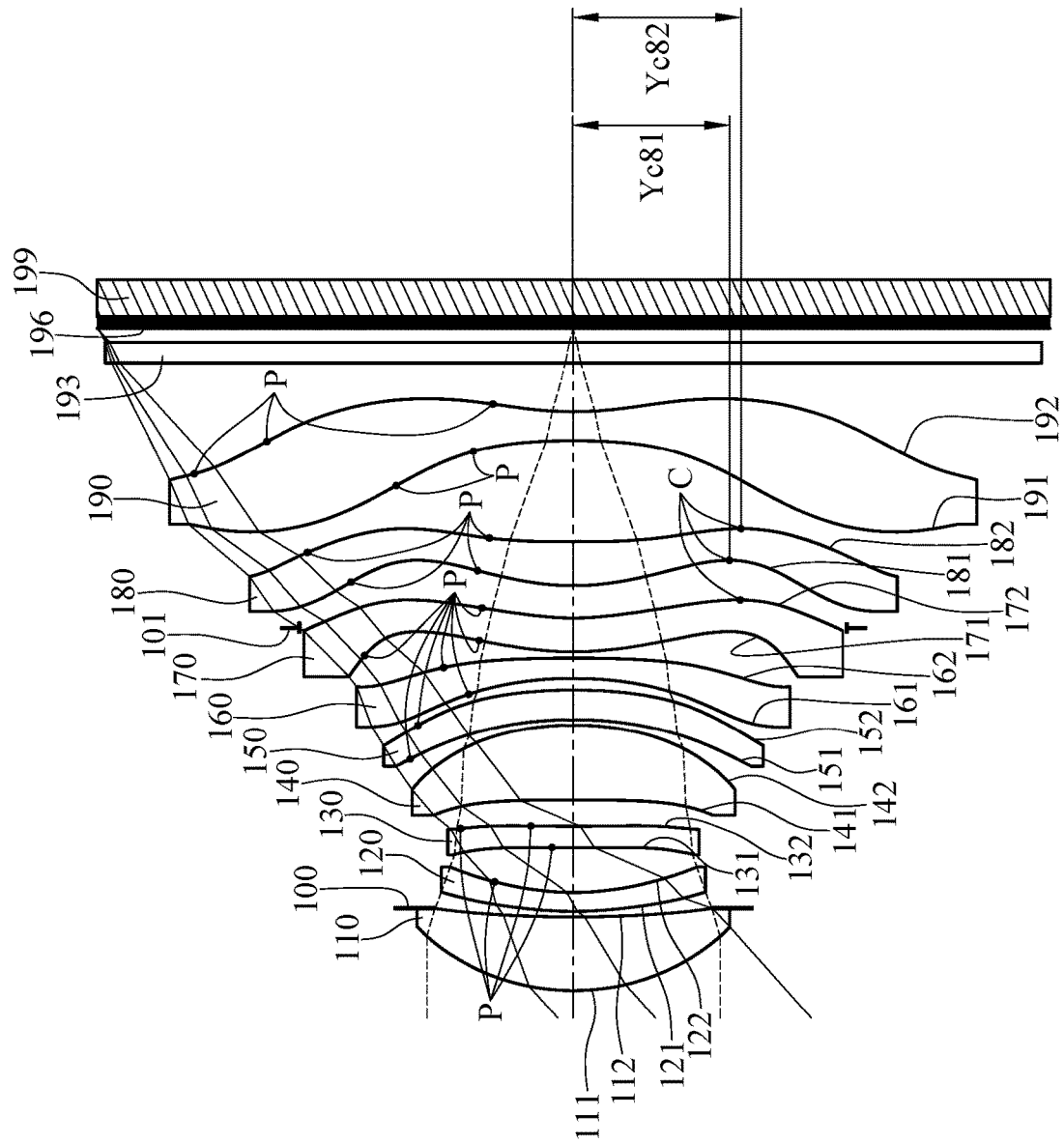
FIG. 21 shows a schematic view of Yc81, Yc82, several inflection points and critical points of the lens elements according to the 1st embodiment of the present disclosure.

The eighth lens element can have positive refractive power. Therefore, it is favorable for balancing the refractive power of the ninth lens element so as to correct overall aberrations. The image-side surface of the eighth lens element can be concave in a paraxial region thereof. Therefore, it is favorable for increasing the effective radius of the eighth lens element so as to correct peripheral light rays. The object-side surface of the eighth lens element can have at least one critical point in an off-axis region thereof, and the image-side surface of the eighth lens element can have at least one critical point in an off-axis region thereof. Therefore, it is favorable for adjusting the surface shapes of the eighth lens element so as to correct off-axis aberrations such as field curvature. Please refer to FIG. 21, which shows a schematic view of critical points C on the object-side surface 181 and the image-side surface 182 of the eighth lens element 180 according to the 1st embodiment of the present disclosure. The critical points on the image-side surface of the seventh lens element, the object-side surface of the eighth lens element and the image-side surface of the eighth lens element in FIG. 21 are only exemplary. Other lens element may also have one or more critical points.

The ninth lens element can have negative refractive power. Therefore, it is favorable for achieving a miniaturized camera module so as to reduce the size of the overall electronic device. The image-side surface of the ninth lens element has at least one inflection point. Therefore, it is favorable for optimizing imaging quality at different object distances. Please refer to FIG. 21, which shows a schematic view of inflection points P on the image-side surface 192 of the ninth lens element 190 according to the 1st embodiment of the present disclosure.

According to the present disclosure, at least one of the object-side surface and the image-side surface of each of at least four lens elements of the optical image lens assembly can have at least one inflection point. Therefore, it is favorable for correcting field curvature so as to provide miniaturization and flatten the Petzval surface. Please refer to FIG. 21, which shows a schematic view of several inflection points P of the lens elements according to the 1st embodiment of the present disclosure. The inflection points of the second lens element, the third lens element, the fifth lens element, the sixth lens element, the seventh lens element, the eighth lens element and the ninth lens element in FIG. 21 are only exemplary. Other lens element may also have one or more inflection points.

According to the optical image lens assembly of the present disclosure, the nine lens elements (e.g., the first through the ninth lens elements) can include at least four materials with different refractive indices. Specifically, the nine lens elements can be made of different plastic materials, resulting in different refractive indices of the nine lens elements. Therefore, it is favorable for increasing the diversity of lens materials so as to correct different aberrations.

When a total number of lens elements having an Abbe number smaller than in the optical image lens assembly is NV40, the following condition is satisfied: $5 \leq NV40 \leq 9$. Therefore, it is favorable for ensuring a sufficient light control capability from lens materials of the optical image lens assembly so as to balance the focus positions at different wavelengths, thereby preventing overlapped images.

When a maximum image height of the optical image lens assembly (half of a diagonal length of an effective photosensitive area of an image sensor) is ImgH, and an axial distance between the image-side surface of the ninth lens element and an image surface is BL, the following condition can be satisfied: $3.90 < ImgH/BL < 15.0$. Therefore, it is favorable for effectively reducing the back focal length while having a large light-receiving region. Moreover, the following condition can also be satisfied: $3.90 < ImgH/BL < 10.0$.

When a curvature radius of the object-side surface of the eighth lens element is R15, and a curvature radius of the image-side surface of the eighth lens element is R16, the following condition can be satisfied: $-0.50 < R15/R16 < 0.70$. Therefore, it is favorable for enhancing the light path control capability of the object-side surface of the eighth lens element, wherein the specification requirements can be satisfied by the object-side surface configuration, and aberrations can be corrected by the image-side surface configuration.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, and an Abbe number of the i-th lens element is Vi, at least two lens elements of the optical image lens assembly can satisfy the following condition: $31.0 < Vi < 40.0$, wherein $i=1, 2, 3, 4, 5, 6, 7, 8$, or 9. Therefore, it is favorable for balancing the image quality of close-up and telephoto images so as to improve the applicability in products. Moreover, at least three lens elements of the optical image lens assembly can also satisfy the following condition: $31.0 < Vi < 40.0$, wherein $i=1, 2, 3, 4, 5, 6, 7, 8$, or 9.

When the Abbe number of the first lens element is V1, the Abbe number of the second lens element is V2, the Abbe number of the third lens element is V3, the Abbe number of the fourth lens element is V4, the Abbe number of the fifth lens element is V5, the Abbe number of the sixth lens element is V6, the Abbe number of the seventh lens element is V7, the Abbe number of the eighth lens element is V8, the Abbe number of the ninth lens element is V9, the Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the i-th lens element is Ni, and a minimum value of Vi/Ni is (Vi/Ni)min, at least one lens element of the optical image lens assembly can satisfy the following condition: $7.0 < (Vi/Ni)min < 11.80$, wherein $i=1, 2, 3, 4, 5, 6, 7, 8$, or 9. Therefore, it is favorable for having a sufficient image control capability of the optical image lens assembly so as to correct various aberrations. Moreover, at least one lens element of the optical image lens assembly can also satisfy the following condition: $9.0 < (Vi/Ni)min < 11.50$, wherein $i=1, 2, 3, 4, 5, 6, 7, 8$, or 9.

When the Abbe number of the seventh lens element is V7, the following condition can be satisfied: $5.0 < V7 < 30.0$. Therefore, it is favorable for enhancing the density difference between the lens material of the seventh lens element and air so as to achieve a strong light path control capability in a limited space. Moreover, the following condition can also be satisfied: $10.0 < V7 < 23.0$. Moreover, the following condition can also be satisfied: $10.0 < V7 < 20.0$.

When a focal length of the optical image lens assembly is f, and a focal length of the fourth lens element is f4, the following condition can be satisfied: $0.30 < f/f4 < 2.50$. Therefore, it is favorable for providing a convergence capability of the light path in the middle section of the optical image lens assembly so as to balance image qualities at different fields of view for a large image sensor. Moreover, the following condition can also be satisfied: $0.45 < f/f4 < 1.80$.

When the focal length of the optical image lens assembly is f, and a focal length of the seventh lens element is f7, the following condition can be satisfied: $-3.0 < f/f7 < 0.15$. Therefore, it is favorable for increasing symmetry of the optical image lens assembly and reducing sensitivity so as to improve image quality of the image side of the optical image lens assembly. Moreover, the following condition can also be satisfied: $-2.0 < f/f7 < 0.15$. Moreover, the following condition can also be satisfied: $-1.0 < f/f7 < 0.15$.

When a focal length of the third lens element is f3, and a focal length of the eighth lens element is f8, the following condition can be satisfied: $-1.3 < f8/f3 < 0.15$. Therefore, it is favorable for having the third lens element as a correction lens so as to prevent an overly large curvature on the lens surface and along with the arrangement of the eighth lens element to balance aberrations between lens elements of the object side and the image side.

When the focal length of the optical image lens assembly is f, an entrance pupil diameter of the optical image lens assembly is EPD, and the maximum image height of the optical image lens assembly is ImgH, the following condition can be satisfied: $0.10\ [1/mm] < f/(EPD \times ImgH) < 0.30\ [1/mm]$. Therefore, it is favorable for receiving a large amount of light by utilizing a large-size image sensor with a large sensing area. Moreover, the following condition can also be satisfied: $0.10\ [1/mm] < f/(EPD \times ImgH) < 0.28\ [1/mm]$. Moreover, the following condition can also be satisfied: $0.13\ [1/mm] < f/(EPD \times ImgH) < 0.25\ [1/mm]$.

When half of a maximum field of view of the optical image lens assembly is HFOV, the following condition can be satisfied: $0.80 \leq \tan(HFOV) < 3.0$. Therefore, it is favorable for having a sufficient field of view of the optical image lens assembly so as to meet the popular specification requirement. Moreover, the following condition can also be satisfied: $0.86 \leq \tan(HFOV) < 2.0$.

When a sum of axial distances between each of all adjacent lens elements of the optical image lens assembly is $\Sigma AT$, an axial distance between the second lens element and the third lens element is T23, and an axial distance between the eighth lens element and the ninth lens element is T89, the following condition can be satisfied: $1.0 < \Sigma AT/(T23+T89) < 3.0$. Therefore, it is favorable for utilizing space properly so as to obtain a balance between the size of the optical image lens assembly and its assembly yield rate. Moreover, the following condition can also be satisfied: $1.0 < \Sigma AT/$ (T23+T89)<2.25. Moreover, the following condition can also be satisfied: 1.0<ΣAT/(T23+T89)<2.0.

When the focal length of the optical image lens assembly is f, and the entrance pupil diameter of the optical image lens assembly is EPD, the following condition can be satisfied: 0.80<f/EPD<2.0. Therefore, it is favorable for effectively adjusting the lens aperture so as to control the amount of incident light in the optical image lens assembly, thereby increasing image brightness. Moreover, the following condition can also be satisfied: 0.80<f/EPD<1.85. Moreover, the following condition can also be satisfied: 1.20<f/EPD<1.80.

When a curvature radius of the object-side surface of the fifth lens element is R9, and the focal length of the optical image lens assembly is f, the following condition can be satisfied: −10.0<R9/f<15.0. Therefore, it is favorable for preventing light passing through the fifth lens element from overly diverging so as to control the total track length of the optical image lens assembly. Moreover, the following condition can also be satisfied: −2.50<R9/f<10.0.

When a vertical distance between the at least one critical point on the object-side surface of the eighth lens element and an optical axis is Yc81, and a vertical distance between the at least one critical point on the image-side surface of the eighth lens element and the optical axis is Yc82, the following condition can be satisfied: 0.20<Yc81/Yc82<3.0. Therefore, it is favorable for providing good image quality at different object distances and for correcting distortion and field curvature. Moreover, the following condition can also be satisfied: 0.30<Yc81/Yc82<2.0. Please refer to FIG. 21, which shows a schematic view of Yc81 and Yc82 according to the 1st embodiment of the present disclosure.

When an axial distance between the object-side surface of the first lens element and the image surface is TL, and the maximum image height of the optical image lens assembly is ImgH, the following condition can be satisfied: 0.50<TL/ImgH<1.55. Therefore, it is favorable for ensuring a sufficient light receiving area while reducing the size of the optical image lens assembly so as to prevent vignetting at the image periphery. Moreover, the following condition can also be satisfied: 0.50<TL/ImgH<1.50.

When a curvature radius of the object-side surface of the ninth lens element is R17, and a curvature radius of the image-side surface of the ninth lens element is R18, the following condition can be satisfied: 0.50<(R17+R18)/(R17−R18)<4.0. Therefore, it is favorable for balancing the surface shapes of the ninth lens element so as to enhance the light control capability on the image-side surface of the ninth lens element and image quality. Moreover, the following condition can also be satisfied: 0.50<(R17+R18)/(R17−R18)<2.0.

According to the present disclosure, the optical image lens assembly can further include an aperture stop. When an axial distance between the aperture stop and the image surface is SL, and the axial distance between the object-side surface of the first lens element and the image surface is TL, the following condition can be satisfied: 0.73<SL/TL<0.98. Therefore, it is favorable for effectively positioning the aperture stop so as to control the size of the optical image lens assembly.

When the Abbe number of the fourth lens element is V4, the following condition can be satisfied: 10.0<V4<45.0. Therefore, it is favorable for correcting chromatic aberration by the fourth lens element so as to prevent image position deviation caused by light with different wavelengths. Moreover, the following condition can also be satisfied: 30.0<V4<45.0.

When the Abbe number of the ninth lens element is V9, the following condition can be satisfied: 8.0<V9<50.0. Therefore, it is favorable for enhancing the control capability at the image side of the optical image lens assembly so as to correct aberrations and reduce the back focal length. Moreover, the following condition can also be satisfied: 31.0<V9<50.0.

When a maximum value among refractive indices of all lens elements of the optical image lens assembly is Nmax, the following condition can be satisfied: 1.66<Nmax<1.78. Therefore, it is favorable for preventing a high difficulty in manufacturing lens elements so as to increase the possibility of commercialization. Moreover, the following condition can also be satisfied: 1.67<Nmax<1.73.

When a minimum value among Abbe numbers of all lens elements of the optical image lens assembly is Vmin, the following condition can be satisfied: 5.0<Vmin<20.0. Therefore, it is favorable for controlling the light path of the optical image lens assembly so as to improve light convergence while receiving light with different wavelengths, thereby correcting chromatic aberration. Moreover, the following condition can also be satisfied: 8.0<Vmin<19.0.

When a curvature radius of the image-side surface of the fourth lens element is R8, and the focal length of the optical image lens assembly is f, the following condition is satisfied: −2.50<R8/f<1.30. Therefore, it is favorable for ensuring a sufficient curvature on the image-side surface of the fourth lens element so as to control the direction of the light path and enhance the functionality of this configuration.

When an axial distance between the fifth lens element and the sixth lens element is T56, and a central thickness of the sixth lens element is CT6, the following condition can be satisfied: 0.20<T56/CT6<2.50. Therefore, it is favorable for obtaining a balance between the thickness of the sixth lens element and the gap distance between the fifth and sixth lens elements, which improves the assembly of the lens elements and its yield rate.

When a central thickness of the eighth lens element is CT8, and a central thickness of the ninth lens element is CT9, the following condition can be satisfied: 0.78<CT8/CT9<4.0. Therefore, it is favorable for control the thicknesses of the lens elements at the image side of the optical image lens assembly so as to ensure the quality and stability of molding the lens elements. Moreover, the following condition can also be satisfied: 1.0≤CT8/CT9<3.0.

When the focal length of the optical image lens assembly is f, and the focal length of the third lens element is f3, the following condition can be satisfied: −2.0<f/f3<0.05. Therefore, it is favorable for effectively arranging the third lens element with the second lens element so as to prevent a single lens element having an overly large refractive power, thereby correcting the aberrations generated by the first lens element. Moreover, the following condition can also be satisfied: −1.50<f/f3<0.0. Moreover, the following condition can also be satisfied: −1.0<f/f3<0.0.

When the focal length of the third lens element is f3, and the focal length of the fourth lens element is f4, the following condition can be satisfied: −1.20<f4/f3<0.85. Therefore, it is favorable for properly arranging the refractive power distribution of the third and fourth lens elements so as to effectively control light path directions at different fields of view, thereby facilitating the correction at the image periphery of a large image sensor. Moreover, the following condition can also be satisfied: −1.0<f4/f3<0.50.

When the focal length of the optical image lens assembly is f, and the focal length of the eighth lens element is f8, the following condition can be satisfied: 0.40<f/f8<2.00. Therefore, it is favorable for ensuring the convergence of the light path at the image side of the optical image lens assembly so as to reduce the total track length. Moreover, the following condition can also be satisfied: 0.60≤f/f8<2.00. Moreover, the following condition can also be satisfied: 0.85<f/f8<2.00.

When the axial distance between the object-side surface of the first lens element and the image surface is TL, and the focal length of the optical image lens assembly is f, the following condition can be satisfied: 0.80<TL/f<1.50. Therefore, it is favorable for balancing the total track length of the optical image lens assembly and controlling the field of view so as to meet the specification requirement of products.

When the maximum image height of the optical image lens assembly is ImgH, the following condition can be satisfied: 5.80 [mm]<ImgH<9.0 [mm]. Therefore, it is favorable for controlling the light receiving area and obtaining a balance between sufficient image brightness and the specification requirements.

According to the present disclosure, the aforementioned features and conditions can be utilized in numerous combinations so as to achieve corresponding effects.

According to the present disclosure, the lens elements of the optical image lens assembly can be made of either glass or plastic material. When the lens elements are made of glass material, the refractive power distribution of the optical image lens assembly may be more flexible, and the influence on imaging caused by external environment temperature change may be reduced. The glass lens element can either be made by grinding or molding. When the lens elements are made of plastic material, the manufacturing costs can be effectively reduced. Moreover, at least five lens elements of the optical image lens assembly can be made of plastic material. Therefore, it is favorable for effectively reducing manufacturing cost and increasing shape design flexibility of lens elements so as to correct off-axis aberrations. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the optical image lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical image lens assembly, based on the corresponding image sensor, can be flat or curved, especially a curved surface being concave facing towards the object side of the optical image lens assembly.

According to the present disclosure, an image correction unit, such as a field flattener, can be optionally disposed between the lens element closest to the image side of the optical image lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 22:
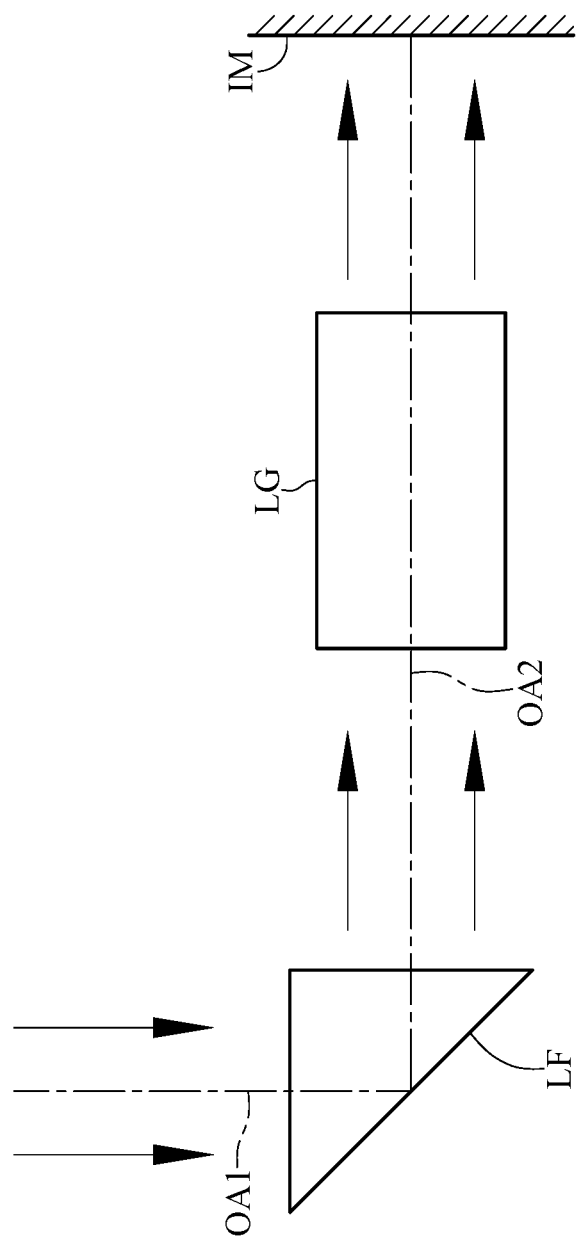
FIG. 22 shows a schematic view of a configuration of a light-folding element in an optical image lens assembly according to one embodiment of the present disclosure.
Figure 23:
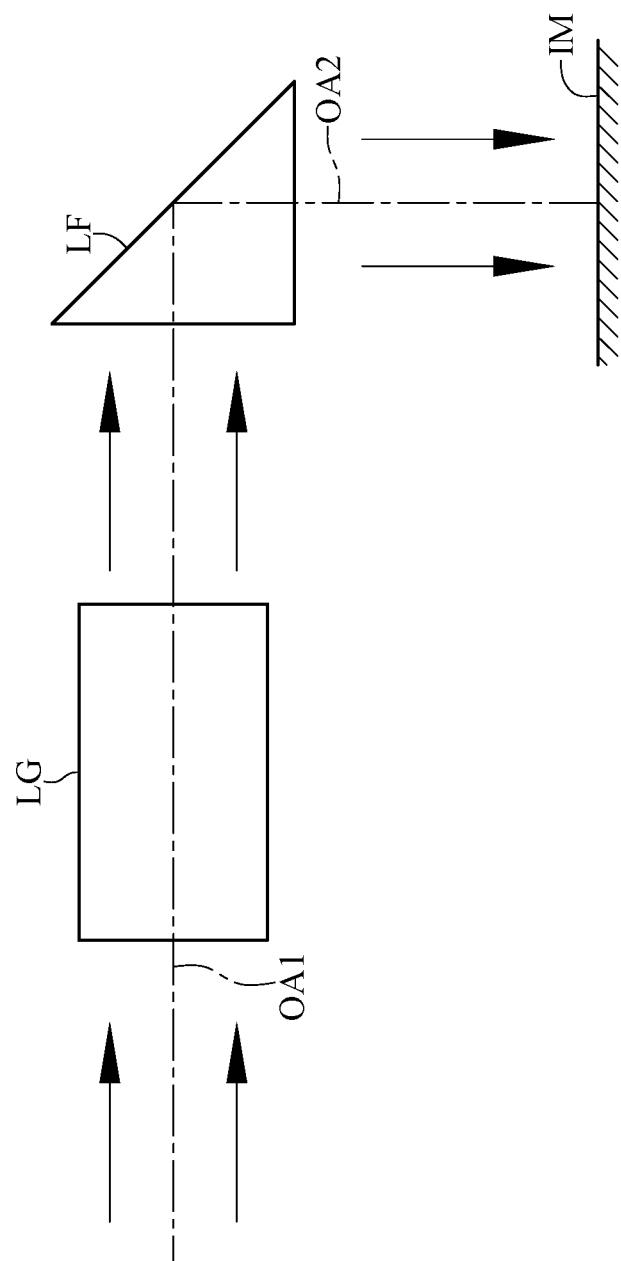
FIG. 23 shows a schematic view of another configuration of a light-folding element in an optical image lens assembly according to one embodiment of the present disclosure.
Figure 24:
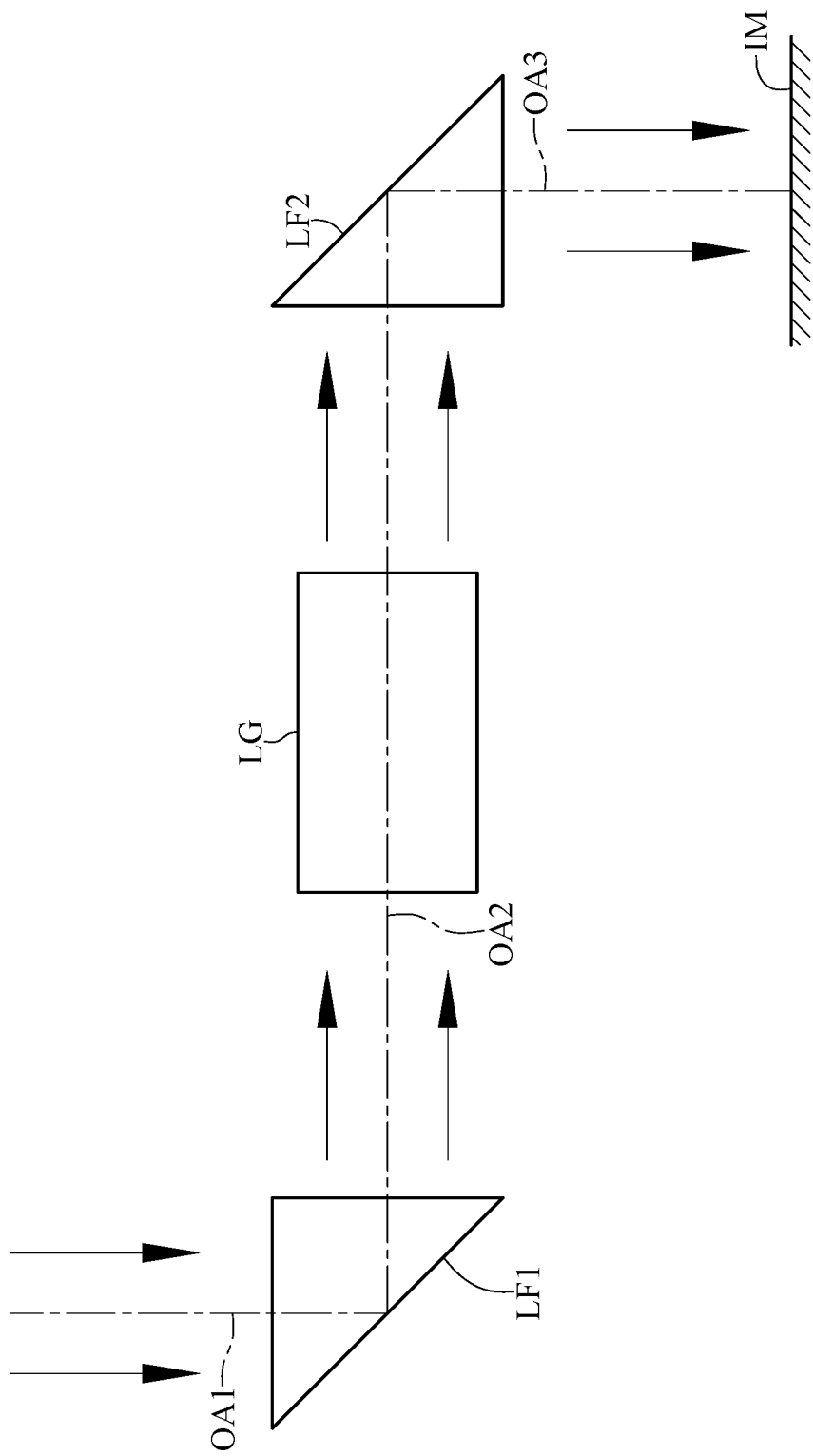
FIG. 24 shows a schematic view of a configuration of two light-folding elements in an optical image lens assembly according to one embodiment of the present disclosure.

According to the present disclosure, at least one light-folding element, such as a prism or a mirror, can be optionally disposed between an imaged object and the image surface on the imaging optical path, such that the optical image lens assembly can be more flexible in space arrangement, and therefore the dimensions of an electronic device is not restricted by the total track length of the optical image lens assembly. Specifically, please refer to FIG. 22 and FIG. 23. FIG. 22 shows a schematic view of a configuration of a light-folding element in an optical image lens assembly according to one embodiment of the present disclosure, and FIG. 23 shows a schematic view of another configuration of a light-folding element in an optical image lens assembly according to one embodiment of the present disclosure. In FIG. 22 and FIG. 23, the optical image lens assembly can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the optical image lens assembly as shown in FIG. 22 or disposed between a lens group LG of the optical image lens assembly and the image surface IM as shown in FIG. 23. Furthermore, please refer to FIG. 24, which shows a schematic view of a configuration of two light-folding elements in an optical image lens assembly according to one embodiment of the present disclosure. In FIG. 24, the optical image lens assembly can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical image lens assembly, the second light-folding element LF2 is disposed between the lens group LG of the optical image lens assembly and the image surface IM, and the travelling direction of light on the first optical axis OA1 can be the same direction as the travelling direction of light on the third optical axis OA3 as shown in FIG. 24. The optical image lens assembly can be optionally provided with three or more light-folding elements, and the present disclosure is not limited to the type, amount and position of the light-folding elements of the embodiments disclosed in the aforementioned figures.

According to the present disclosure, the optical image lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical image lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical image lens assembly and thereby provides a wider field of view for the same.

According to the present disclosure, the optical image lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
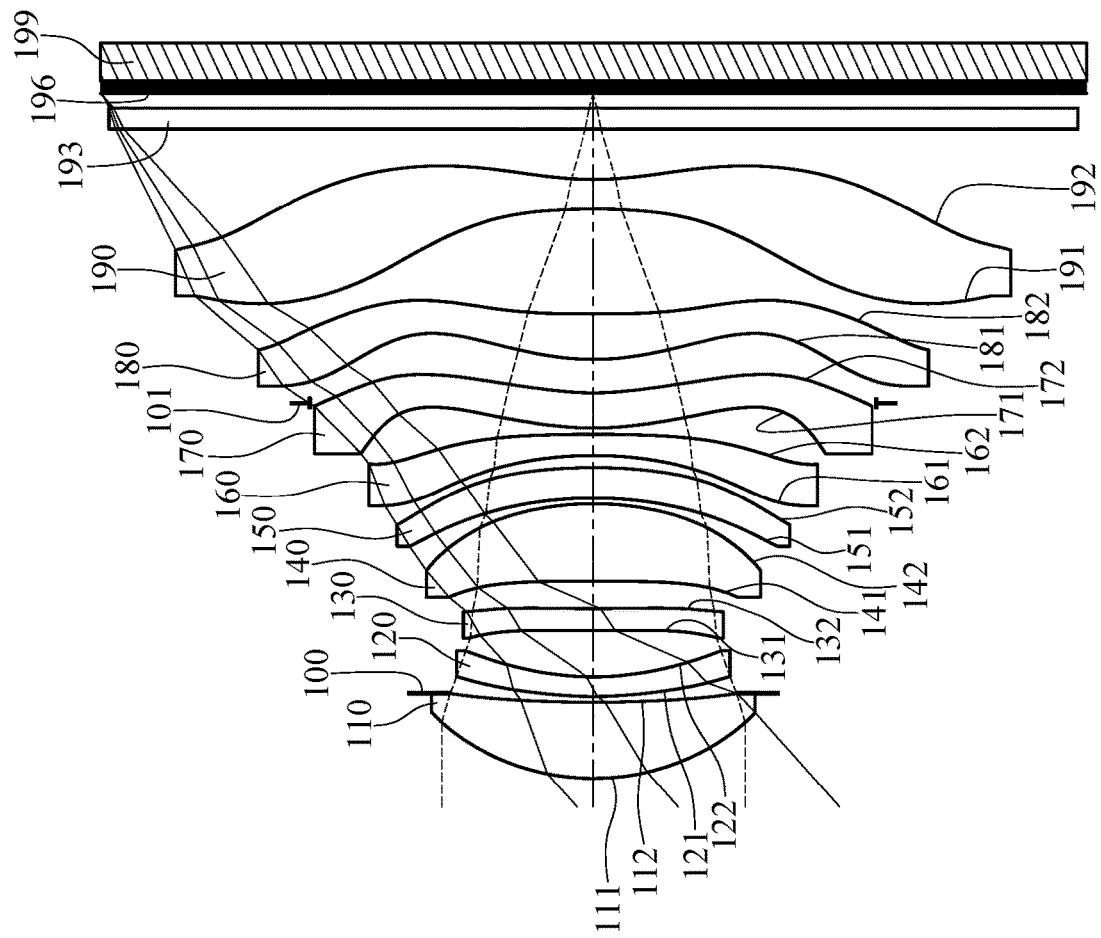
FIG. 1 is a schematic view of an image capturing unit according to the 1st embodiment of the present disclosure.
Figure 2:
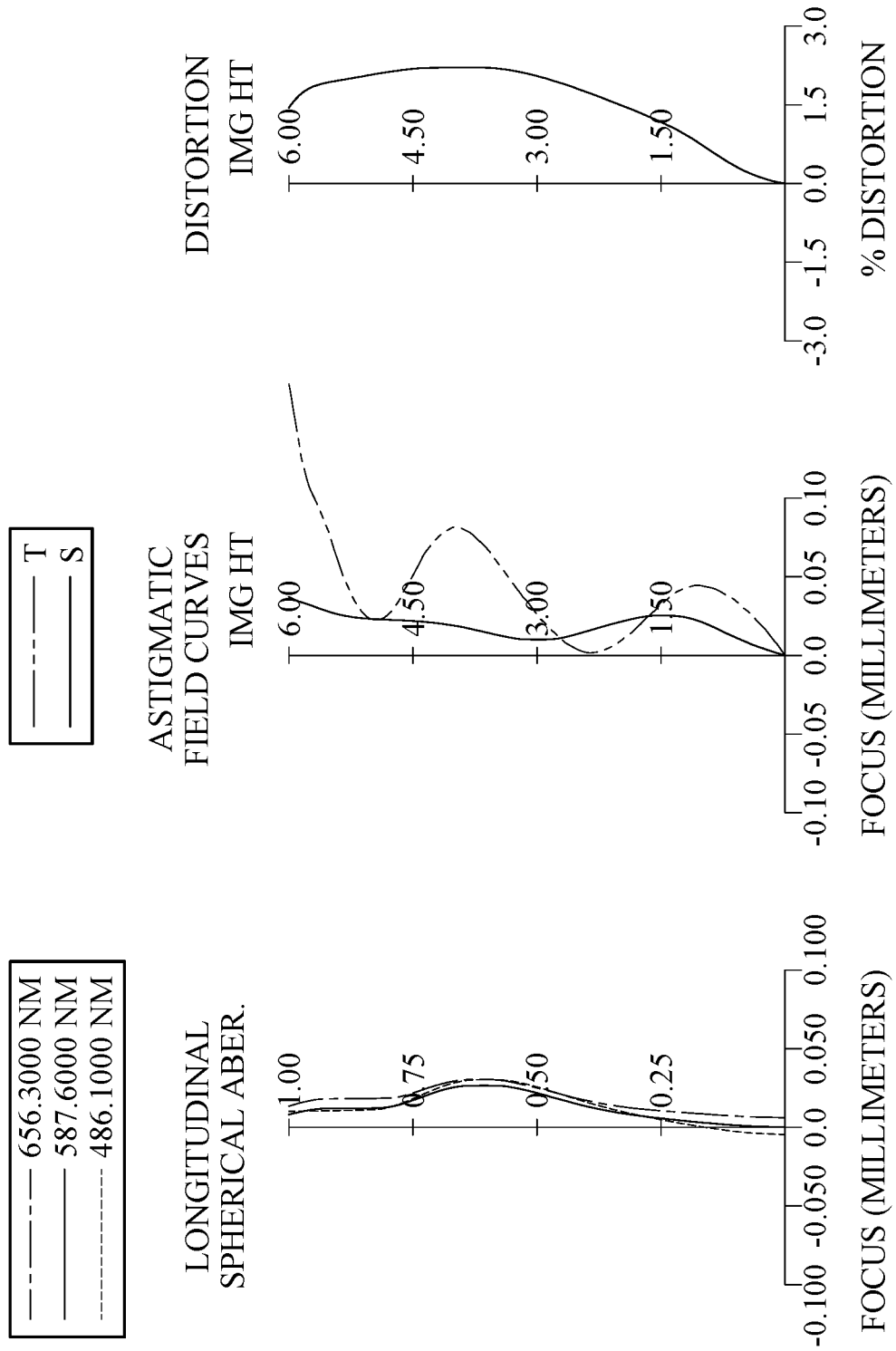
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical image lens assembly (its reference numeral is omitted) of the present disclosure and an image sensor 199. The optical image lens assembly includes, in order from an object side to an image side along an optical path, a first lens element 110, an aperture stop 100, a second lens element 120, a third lens element 130, a fourth lens element 140, a fifth lens element 150, a sixth lens element 160, a seventh lens element 170, a stop 101, an eighth lens element 180, a ninth lens element 190, a filter 193 and an image surface 196. The optical image lens assembly includes nine lens elements (110, 120, 130, 140, 150, 160, 170, 180 and 190) with no additional lens element disposed between each of the adjacent nine lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. The image-side surface 122 of the second lens element 120 has one inflection point.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has one inflection point. The image-side surface 132 of the third lens element 130 has two inflection points.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has one inflection point. The image-side surface 152 of the fifth lens element 150 has one inflection point.

The sixth lens element 160 with negative refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 has one inflection point. The image-side surface 162 of the sixth lens element 160 has one inflection point.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has two inflection points. The image-side surface 172 of the seventh lens element 170 has one inflection point. The image-side surface 172 of the seventh lens element 170 has at least one convex critical point in an off-axis region thereof.

The eighth lens element 180 with positive refractive power has an object-side surface 181 being convex in a paraxial region thereof and an image-side surface 182 being concave in a paraxial region thereof. The eighth lens element 180 is made of plastic material and has the object-side surface 181 and the image-side surface 182 being both aspheric. The object-side surface 181 of the eighth lens element 180 has two inflection points. The image-side surface 182 of the eighth lens element 180 has two inflection points. The object-side surface 181 of the eighth lens element 180 has at least one critical point in an off-axis region thereof. The image-side surface 182 of the eighth lens element 180 has at least one critical point in an off-axis region thereof.

The ninth lens element 190 with negative refractive power has an object-side surface 191 being concave in a paraxial region thereof and an image-side surface 192 being concave in a paraxial region thereof. The ninth lens element 190 is made of plastic material and has the object-side surface 191 and the image-side surface 192 being both aspheric. The object-side surface 191 of the ninth lens element 190 has two inflection points. The image-side surface 192 of the ninth lens element 190 has three inflection points.

The filter 193 is made of glass material and located between the ninth lens element 190 and the image surface 196, and will not affect the focal length of the optical image lens assembly. The image sensor 199 is disposed on or near the image surface 196 of the optical image lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the optical image lens assembly of the image capturing unit according to the 1st embodiment, when a focal length of the optical image lens assembly is f, an f-number of the optical image lens assembly is Fno, and half of a maximum field of view of the optical image lens assembly is HFOV, these parameters have the following values: f=6.63 millimeters (mm), Fno=1.79, HFOV=41.7 degrees (deg.).

When an Abbe number of the fourth lens element 140 is V4, the following condition is satisfied: V4=40.4.

When an Abbe number of the seventh lens element 170 is V7, the following condition is satisfied: V7=20.4.

When an Abbe number of the ninth lens element 190 is V9, the following condition is satisfied: V9=37.4.

When a minimum value among Abbe numbers of all lens elements of the optical image lens assembly is Vmin, the following condition is satisfied: Vmin=18.4. In this embodiment, among the first through ninth lens elements (110-190), the Abbe number of the second lens element 120 is smaller than Abbe numbers of the other lens elements, and Vmin is equal to the Abbe number of the second lens element 120.

When a maximum value among refractive indices of all lens elements of the optical image lens assembly is Nmax, the following condition is satisfied: Nmax=1.679. In this embodiment, among the first through ninth lens elements (110-190), the refractive index of the second lens element 120 is larger than refractive indices of the other lens elements, and Nmax is equal to the refractive index of the second lens element 120.

When an Abbe number of the first lens element 110 is V1, the Abbe number of the second lens element 120 is V2, an Abbe number of the third lens element 130 is V3, the Abbe number of the fourth lens element 140 is V4, an Abbe number of the fifth lens element 150 is V5, an Abbe number of the sixth lens element 160 is V6, the Abbe number of the seventh lens element 170 is V7, an Abbe number of the eighth lens element 180 is V8, the Abbe number of the ninth lens element 190 is V9, an Abbe number of the i-th lens element is Vi, a refractive index of the first lens element 110 is N1, the refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, a refractive index of the eighth lens element 180 is N8, a refractive index of the ninth lens element 190 is N9, a refractive index of the i-th lens element is Ni, and a minimum value of Vi/Ni is (Vi/Ni)min, the following conditions are satisfied: V1/N1=36.30; V2/N2=10.98; V3/N3=11.65; V4/N4=25.95; V5/N5=16.09; V6/N6=14.34; V7/N7=12.29; V8/N8=23.91; V9/N9=23.91; and (Vi/Ni)min=10.98. In this embodiment, among the first through ninth lens elements (110-190), the second lens element 120 has a smaller value of Vi/Ni than that of the other lens elements, and the value of (Vi/Ni)min is equal to the value of Vi/Ni of the second lens element 120 (e.g., V2/N2).

When a total number of lens elements having an Abbe number smaller than 40 in the optical image lens assembly is NV40, the following condition is satisfied: NV40=7.

When half of the maximum field of view of the optical image lens assembly is HFOV, the following condition is satisfied: tan(HFOV)=0.89.

When a central thickness of the eighth lens element 180 is CT8, and a central thickness of the ninth lens element 190 is CT9, the following condition is satisfied: CT8/CT9=1.51.

When an axial distance between the fifth lens element 150 and the sixth lens element 160 is T56, and a central thickness of the sixth lens element 160 is CT6, the following condition is satisfied: T56/CT6=0.59. In this embodiment, an axial distance between two adjacent lens elements is a distance in a paraxial region between two adjacent lens surfaces of the two adjacent lens elements.

When a sum of axial distances between each of all adjacent lens elements of the optical image lens assembly is ΣAT, an axial distance between the second lens element 120 and the third lens element 130 is T23, and an axial distance between the eighth lens element 180 and the ninth lens element 190 is T89, the following condition is satisfied: ΣAT/(T23+T89)=1.61. In this embodiment, ΣAT is a sum of axial distances between the first lens element 110 and the second lens element 120, the second lens element 120 and the third lens element 130, the third lens element 130 and the fourth lens element 140, the fourth lens element 140 and the fifth lens element 150, the fifth lens element 150 and the sixth lens element 160, the sixth lens element 160 and the seventh lens element 170, the seventh lens element 170 and the eighth lens element 180, and the eighth lens element 180 and the ninth lens element 190.

When a curvature radius of the image-side surface 142 of the fourth lens element 140 is R8, and the focal length of the optical image lens assembly is f, the following condition is satisfied: R8/f=−0.56.

When a curvature radius of the object-side surface 151 of the fifth lens element 150 is R9, and the focal length of the optical image lens assembly is f, the following condition is satisfied: R9/f=−0.71.

When a curvature radius of the object-side surface 181 of the eighth lens element 180 is R15, and a curvature radius of the image-side surface 182 of the eighth lens element 180 is R16, the following condition is satisfied: R15/R16=0.08.

When a curvature radius of the object-side surface 191 of the ninth lens element 190 is R17, and a curvature radius of the image-side surface 192 of the ninth lens element 190 is R18, the following condition is satisfied: (R17+R18)/(R17−R18)=0.39.

When the focal length of the optical image lens assembly is f, and a focal length of the third lens element 130 is f3, the following condition is satisfied: f/f3=−0.08.

When the focal length of the optical image lens assembly is f, and a focal length of the fourth lens element 140 is f4, the following condition is satisfied: f/f4=0.92.

When the focal length of the third lens element 130 is f3, the focal length of the fourth lens element 140 is f4, the following condition is satisfied: f4/f3=−0.08.

When the focal length of the optical image lens assembly is f, and a focal length of the seventh lens element 170 is f7, the following condition is satisfied: f/f7=−0.10.

When the focal length of the optical image lens assembly is f, and a focal length of the eighth lens element 180 is f8, the following condition is satisfied: f/f8=1.07.

When the focal length of the third lens element 130 is f3, and the focal length of the eighth lens element 180 is f8, the following condition is satisfied: f8/f3=−0.07.

When the focal length of the optical image lens assembly is f, and an entrance pupil diameter of the optical image lens assembly is EPD, the following condition is satisfied: f/EPD=1.79.

When a vertical distance between the at least one critical point on the object-side surface 181 of the eighth lens element 180 and the optical axis is Yc81, and a vertical distance between the at least one critical point on the image-side surface 182 of the eighth lens element 180 and the optical axis is Yc82, the following condition is satisfied: Yc81/Yc82=0.93.

When the focal length of the optical image lens assembly is f, the entrance pupil diameter of the optical image lens assembly is EPD, and a maximum image height of the optical image lens assembly is ImgH, the following condition is satisfied: f/(EPD×ImgH)=0.30 [1/mm].

When the maximum image height of the optical image lens assembly is ImgH, the following condition is satisfied: ImgH=6.00 [mm].

When an axial distance between the object-side surface 111 of the first lens element 110 and the image surface 196 is TL, and the maximum image height of the optical image lens assembly is ImgH, the following condition is satisfied: TL/ImgH=1.40.

When the maximum image height of the optical image lens assembly is ImgH, and an axial distance between the image-side surface 192 of the ninth lens element 190 and the image surface 196 is BL, the following condition is satisfied: ImgH/BL=5.72.

When an axial distance between the aperture stop 100 and the image surface 196 is SL, and the axial distance between the object-side surface 111 of the first lens element 110 and the image surface 196 is TL, the following condition is satisfied: SL/TL=0.88.

When the axial distance between the object-side surface 111 of the first lens element 110 and the image surface 196 is TL, and the focal length of the optical image lens assembly is f, the following condition is satisfied: TL/f=1.26.

The detailed optical data of the 1st embodiment are shown in Table 1 and the aspheric surface data are shown in Table 2 below.

TABLE 1

1st Embodiment
f = 6.63 mm, Fno = 1.79, HFOV = 41.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.925 | (ASP) | 0.928 | Plastic | 1.545 | 56.1 | 6.61 |
| 2 | | 13.782 | (ASP) | 0.112 | | | | |
| 3 | Ape. Stop | Plano | | −0.040 | | | | |
| 4 | Lens 2 | 4.882 | (ASP) | 0.240 | Plastic | 1.679 | 18.4 | −19.79 |
| 5 | | 3.510 | (ASP) | 0.566 | | | | |
| 6 | Lens 3 | 28.440 | (ASP) | 0.265 | Plastic | 1.669 | 19.5 | −88.29 |
| 7 | | 19.125 | (ASP) | 0.337 | | | | |
| 8 | Lens 4 | −40.670 | (ASP) | 0.947 | Plastic | 1.559 | 40.4 | 7.20 |
| 9 | | −3.690 | (ASP) | 0.070 | | | | |
| 10 | Lens 5 | −4.676 | (ASP) | 0.373 | Plastic | 1.614 | 26.0 | −25.87 |
| 11 | | −6.829 | (ASP) | 0.150 | | | | |
| 12 | Lens 6 | −5.056 | (ASP) | 0.256 | Plastic | 1.639 | 23.5 | −10.71 |
| 13 | | −19.796 | (ASP) | 0.078 | | | | |
| 14 | Lens 7 | 3.861 | (ASP) | 0.428 | Plastic | 1.660 | 20.4 | −68.08 |
| 15 | | 3.399 | (ASP) | −0.126 | | | | |
| 16 | Stop | Plano | | 0.536 | | | | |
| 17 | Lens 8 | 3.247 | (ASP) | 0.555 | Plastic | 1.566 | 37.4 | 6.21 |
| 18 | | 39.625 | (ASP) | 1.279 | | | | |
| 19 | Lens 9 | −9.057 | (ASP) | 0.367 | Plastic | 1.566 | 37.4 | −4.84 |
| 20 | | 3.985 | (ASP) | 0.615 | | | | |

TABLE 1-continued

1st Embodiment
f = 6.63 mm, Fno = 1.79, HFOV = 41.7 deg.

| Surface # | | Curvature Radius | Thickness | Material | Index | Abbe # | Focal Length |
|---|---|---|---|---|---|---|---|
| 21 | Filter | Plano | 0.260 | Glass | 1.517 | 64.2 | — |
| 22 | | Plano | 0.175 | | | | |
| 23 | Image | Plano | — | | | | |

Note:
Reference wavelength is 587.6 nm (d-line).
An effective radius of the stop 101 (Surface 16) is 3.458 mm.

TABLE 2

Aspheric Coefficients

| Surface # | 1 | 2 | 4 | 5 | 6 |
|---|---|---|---|---|---|
| k = | −5.1018E−01 | 7.2995E+00 | 4.7831E−01 | −1.4057E−01 | 7.2367E+01 |
| A4 = | 2.6355E−03 | −1.1461E−02 | −2.6511E−02 | −1.9312E−02 | −2.4130E−02 |
| A6 = | 2.3364E−03 | 1.1581E−02 | 1.4860E−02 | 1.0220E−02 | −5.3204E−03 |
| A8 = | −1.9485E−03 | −6.8710E−03 | −3.6460E−03 | −3.6656E−03 | 4.0585E−03 |
| A10 = | 1.1530E−03 | 2.9420E−03 | −6.9617E−04 | 1.0431E−03 | −8.9532E−04 |
| A12 = | −3.8251E−04 | −8.5724E−04 | 8.5929E−04 | −2.6944E−04 | −2.4623E−04 |
| A14 = | 6.9145E−05 | 1.5067E−04 | −2.4604E−04 | 6.5595E−05 | 1.8504E−04 |
| A16 = | −5.1130E−06 | −1.1960E−05 | 2.3785E−05 | −1.2818E−05 | −2.8840E−05 |

| Surface # | 7 | 8 | 9 | 10 | 11 |
|---|---|---|---|---|---|
| k = | 1.1912E+01 | 8.9949E+01 | 7.9836E−01 | 4.4598E−01 | −6.3692E+00 |
| A4 = | −2.2407E−02 | −8.6864E−03 | −1.0724E−03 | 8.2044E−03 | −1.2526E−02 |
| A6 = | 1.3427E−03 | 9.3523E−03 | 7.9773E−05 | −1.1061E−02 | −3.1653E−03 |
| A8 = | −6.1658E−03 | −3.3365E−02 | −3.5505E−03 | 6.9350E−03 | 4.0426E−03 |
| A10 = | 6.9736E−03 | 4.1297E−02 | 2.1868E−03 | −3.0201E−03 | −2.5798E−03 |
| A12 = | −3.0672E−03 | −2.9104E−02 | −6.4972E−04 | 9.4263E−04 | 8.7989E−04 |
| A14 = | 6.5563E−04 | 1.2351E−02 | 1.1243E−04 | −1.8784E−04 | −1.6548E−04 |
| A16 = | −5.1655E−05 | −3.1016E−03 | −1.1962E−05 | 2.0450E−05 | 1.7829E−05 |
| A18 = | — | 4.2282E−04 | 6.2538E−07 | −9.0172E−07 | −1.1099E−06 |
| A20 = | — | −2.4006E−05 | −7.5555E−09 | −1.7929E−11 | 3.5064E−08 |

| Surface # | 12 | 13 | 14 | 15 | 17 |
|---|---|---|---|---|---|
| k = | −1.3080E+01 | −7.2356E+01 | 1.2403E−02 | −1.1489E+00 | −6.0691E−01 |
| A4 = | −3.1843E−02 | −4.0903E−03 | −4.0091E−02 | −7.7882E−02 | −2.1798E−02 |
| A6 = | 1.6853E−02 | −1.5846E−03 | 2.5620E−02 | 4.7724E−02 | 3.7936E−03 |
| A8 = | −7.7793E−03 | −9.6308E−04 | −1.3578E−02 | −1.9784E−02 | −1.7655E−03 |
| A10 = | 1.9006E−03 | 7.1270E−04 | 4.2436E−03 | 5.0875E−03 | 3.3896E−04 |
| A12 = | −2.0448E−04 | −1.6576E−04 | −8.6480E−04 | −8.3487E−04 | −3.6153E−05 |
| A14 = | 8.9069E−06 | 1.5034E−05 | 1.1814E−04 | 8.7233E−05 | 2.6210E−06 |
| A16 = | −9.1292E−07 | 2.8925E−07 | −1.0711E−05 | −5.5978E−06 | −1.3548E−07 |
| A18 = | 1.7615E−07 | −1.3413E−07 | 5.8251E−07 | 2.0083E−07 | 4.4117E−09 |
| A20 = | −9.8441E−09 | 6.0896E−09 | −1.4047E−08 | −3.0837E−09 | −6.4913E−11 |

| Surface # | 18 | 19 | 20 |
|---|---|---|---|
| k = | −1.3670E+01 | −4.4743E+01 | −7.4047E−01 |
| A4 = | 3.7483E−02 | −2.7652E−02 | −3.5410E−02 |
| A6 = | −1.3905E−02 | 1.8354E−03 | 4.9587E−03 |
| A8 = | 2.3123E−03 | 3.9386E−04 | −4.8556E−04 |
| A10 = | −2.4527E−04 | −7.9901E−05 | 2.8593E−05 |
| A12 = | 1.7885E−05 | 6.7447E−06 | −8.3824E−07 |
| A14 = | −8.6286E−07 | −3.2570E−07 | −1.6921E−09 |
| A16 = | 2.3796E−08 | 9.3852E−09 | 9.6723E−10 |
| A18 = | −2.4057E−10 | −1.5114E−10 | −2.8357E−11 |
| A20 = | −1.5639E−12 | 1.0518E−12 | 2.7549E−13 |

In Table 1, the curvature radius, the thickness and the focal length are shown in millimeters (mm). Surface numbers 0-23 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
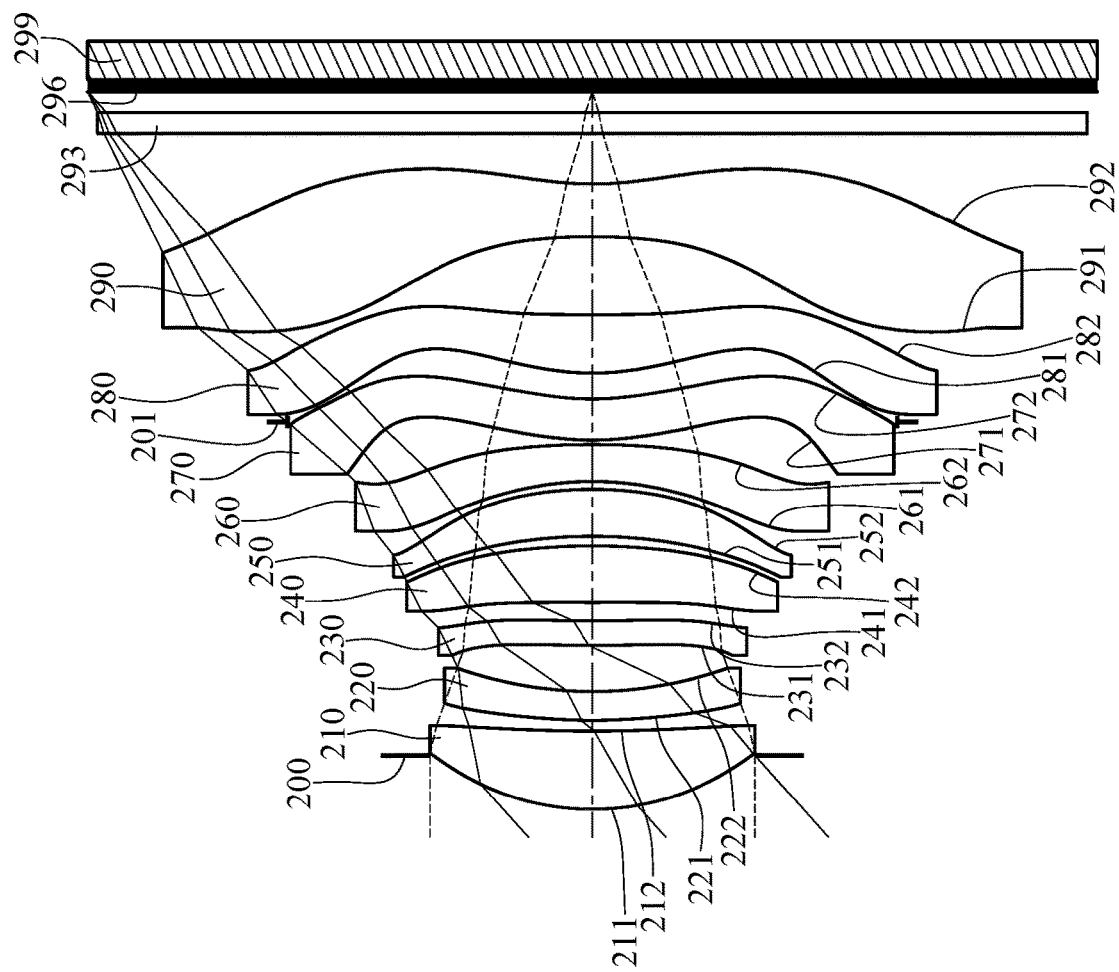
FIG. 3 is a schematic view of an image capturing unit according to the 2nd embodiment of the present disclosure.
Figure 4:
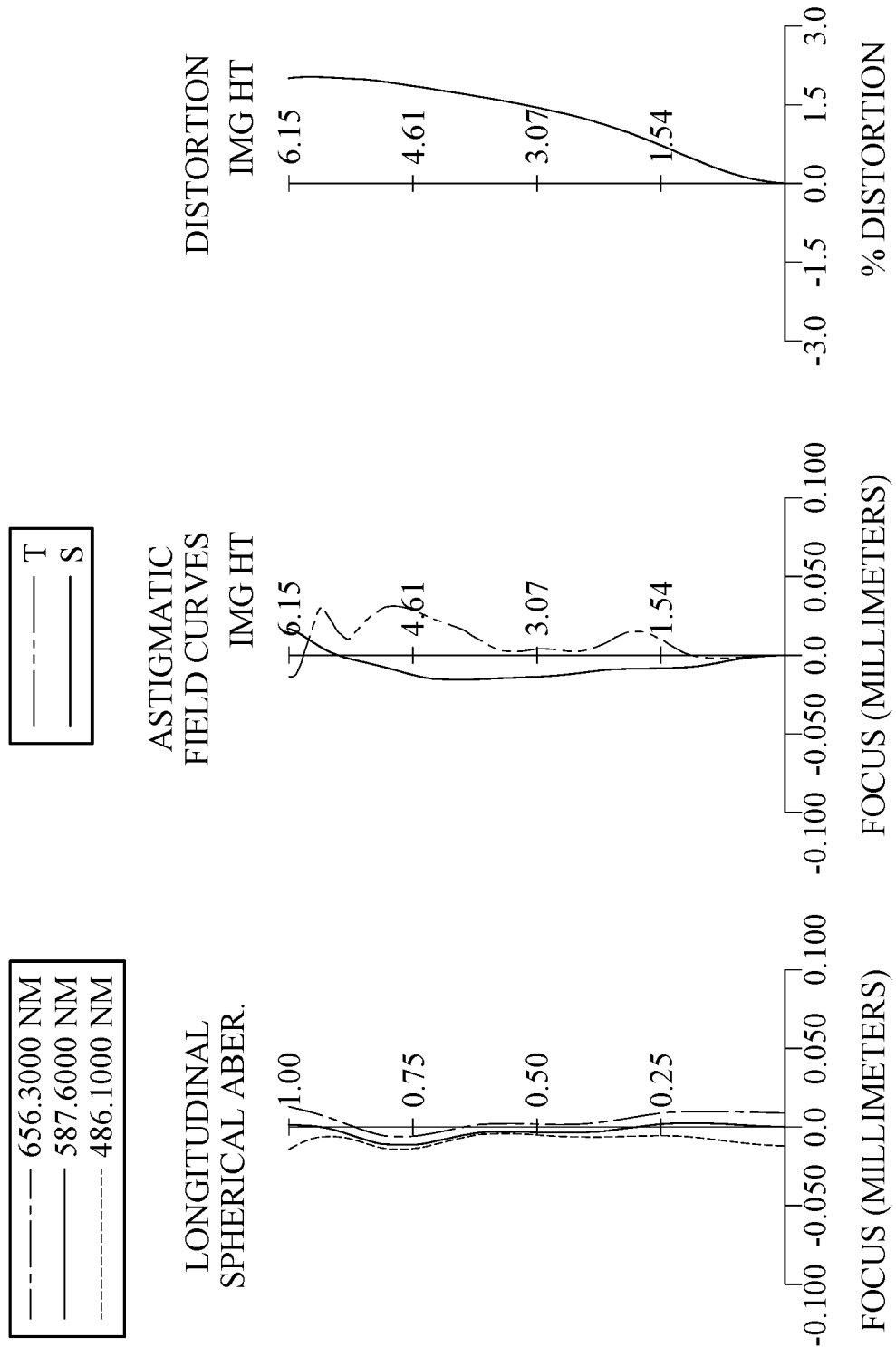
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical image lens assembly (its reference numeral is omitted) of the present disclosure and an image sensor 299. The optical image lens assembly includes, in order from an object side to an image side along an optical path, an aperture stop 200, a first lens element 210, a second lens element 220, a third lens element 230, a fourth lens element 240, a fifth lens element 250, a sixth lens element 260, a seventh lens element 270, a stop 201, an eighth lens element 280, a ninth lens element 290, a filter 293 and an image surface 296. The optical image lens assembly includes nine lens elements (210, 220, 230, 240, 250, 260, 270, 280 and 290) with no additional lens element disposed between each of the adjacent nine lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has one inflection point. The image-side surface 212 of the first lens element 210 has one inflection point.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has one inflection point. The image-side surface 232 of the third lens element 230 has two inflection points.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has two inflection points.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The image-side surface 252 of the fifth lens element 250 has one inflection point.

The sixth lens element 260 with negative refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has one inflection point. The image-side surface 262 of the sixth lens element 260 has one inflection point.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has two inflection points. The image-side surface 272 of the seventh lens element 270 has one inflection point. The image-side surface 272 of the seventh lens element 270 has at least one convex critical point in an off-axis region thereof.

The eighth lens element 280 with positive refractive power has an object-side surface 281 being convex in a paraxial region thereof and an image-side surface 282 being convex in a paraxial region thereof. The eighth lens element 280 is made of plastic material and has the object-side surface 281 and the image-side surface 282 being both aspheric. The object-side surface 281 of the eighth lens element 280 has two inflection points. The image-side surface 282 of the eighth lens element 280 has three inflection points. The object-side surface 281 of the eighth lens element 280 has at least one critical point in an off-axis region thereof. The image-side surface 282 of the eighth lens element 280 has at least one critical point in an off-axis region thereof.

The ninth lens element 290 with negative refractive power has an object-side surface 291 being concave in a paraxial region thereof and an image-side surface 292 being concave in a paraxial region thereof. The ninth lens element 290 is made of plastic material and has the object-side surface 291 and the image-side surface 292 being both aspheric. The object-side surface 291 of the ninth lens element 290 has two inflection points. The image-side surface 292 of the ninth lens element 290 has three inflection points.

The filter 293 is made of glass material and located between the ninth lens element 290 and the image surface 296, and will not affect the focal length of the optical image lens assembly. The image sensor 299 is disposed on or near the image surface 296 of the optical image lens assembly.

The detailed optical data of the 2nd embodiment are shown in Table 3 and the aspheric surface data are shown in Table 4 below.

TABLE 3

2nd Embodiment
f = 6.73 mm, Fno = 1.70, HFOV = 41.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.660 | | | | |
| 2 | Lens 1 | 3.160 | (ASP) | 0.960 | Plastic | 1.545 | 56.1 | 7.06 |
| 3 | | 15.840 | (ASP) | 0.129 | | | | |
| 4 | Lens 2 | 6.735 | (ASP) | 0.350 | Plastic | 1.669 | 19.5 | −20.47 |
| 5 | | 4.421 | (ASP) | 0.563 | | | | |
| 6 | Lens 3 | 15.664 | (ASP) | 0.300 | Plastic | 1.669 | 19.5 | 452.68 |
| 7 | | 16.391 | (ASP) | 0.222 | | | | |
| 8 | Lens 4 | 279.473 | (ASP) | 0.688 | Plastic | 1.544 | 56.0 | 14.44 |
| 9 | | −8.078 | (ASP) | 0.120 | | | | |
| 10 | Lens 5 | −6.149 | (ASP) | 0.577 | Plastic | 1.544 | 56.0 | 29.27 |
| 11 | | −4.582 | (ASP) | 0.096 | | | | |
| 12 | Lens 6 | −3.716 | (ASP) | 0.450 | Plastic | 1.639 | 23.5 | −10.06 |
| 13 | | −9.234 | (ASP) | 0.054 | | | | |
| 14 | Lens 7 | 3.765 | (ASP) | 0.499 | Plastic | 1.639 | 23.5 | −50.58 |
| 15 | | 3.198 | (ASP) | −0.277 | | | | |
| 16 | Stop | Plano | | 0.595 | | | | |
| 17 | Lens 8 | 3.235 | (ASP) | 0.713 | Plastic | 1.566 | 37.4 | 5.62 |
| 18 | | −174.672 | (ASP) | 0.946 | | | | |
| 19 | Lens 9 | −8.056 | (ASP) | 0.650 | Plastic | 1.566 | 37.4 | −4.63 |
| 20 | | 3.994 | (ASP) | 0.615 | | | | |
| 21 | Filter | Plano | | 0.260 | Glass | 1.517 | 64.2 | — |
| 22 | | Plano | | 0.247 | | | | |
| 23 | Image | Plano | | — | | | | |

Note:
Reference wavelength is 587.6 nm (d-line).
An effective radius of the stop 201 (Surface 16) is 3.719 mm.

TABLE 4

Aspheric Coefficients

| Surface # | 2 | 3 | 4 | 5 | 6 |
|---|---|---|---|---|---|
| k = | −3.2418E−01 | −2.7375E+01 | 1.6368E+00 | 3.1739E+00 | 6.4579E+01 |
| A4 = | 1.1545E−03 | −1.2833E−02 | −2.4990E−02 | −1.9627E−02 | −2.3230E−02 |
| A6 = | 1.7339E−03 | 1.0984E−02 | 1.6726E−02 | 8.2923E−03 | −3.1887E−03 |
| A8 = | −1.8723E−03 | −6.0055E−03 | −7.7960E−03 | −3.0528E−03 | 3.0364E−03 |
| A10 = | 1.1374E−03 | 2.2972E−03 | 2.7019E−03 | 5.6467E−04 | −1.6855E−03 |
| A12 = | −3.7259E−04 | −6.1139E−04 | −6.6525E−04 | −8.4457E−05 | 3.8283E−04 |
| A14 = | 6.2019E−05 | 9.6153E−05 | 1.0316E−04 | 8.4920E−06 | −3.9731E−05 |
| A16 = | −4.3449E−06 | −6.5695E−06 | −6.3836E−06 | −4.6766E−07 | — |

| Surface # | 7 | 8 | 9 | 10 | 11 |
|---|---|---|---|---|---|
| k = | 2.6914E+01 | −9.9000E+01 | 5.0781E+00 | 1.6186E+00 | −3.5282E+00 |
| A4 = | −1.9936E−02 | −4.9445E−03 | −1.0998E−03 | −7.7615E−04 | −1.2291E−02 |
| A6 = | −4.5662E−03 | −4.9888E−03 | −4.8868E−04 | 1.6672E−05 | 2.7360E−03 |
| A8 = | 3.1932E−03 | 1.3506E−03 | −2.0702E−05 | −1.4169E−06 | −2.1827E−03 |
| A10 = | −1.0120E−03 | −2.6175E−04 | 2.8513E−06 | 5.2675E−07 | 2.9765E−04 |
| A12 = | 2.0809E−04 | 1.2737E−04 | 8.0274E−07 | −3.6949E−08 | 1.0403E−04 |
| A14 = | −1.4484E−05 | −2.5628E−05 | 1.1786E−07 | −1.7149E−08 | −2.8950E−05 |
| A16 = | — | 1.6375E−06 | — | — | 2.0022E−06 |
| A18 = | — | −9.2553E−10 | — | — | 2.5499E−10 |
| A20 = | — | −2.6330E−10 | — | — | 6.4960E−11 |

| Surface # | 12 | 13 | 14 | 15 | 17 |
|---|---|---|---|---|---|
| k = | −1.4037E+01 | −2.5316E+01 | 3.4019E−02 | −1.2745E+00 | −6.0876E−01 |
| A4 = | −2.1006E−02 | −1.6310E−03 | −3.6985E−02 | −6.4926E−02 | −2.1753E−02 |
| A6 = | 3.5518E−03 | −6.5980E−03 | 2.2219E−02 | 3.6566E−02 | 7.7519E−04 |
| A8 = | 1.9269E−03 | 2.2146E−03 | −1.1691E−02 | −1.4401E−02 | −3.7123E−05 |
| A10 = | −2.3962E−03 | −2.5422E−04 | 3.6535E−03 | 3.4908E−03 | −1.7072E−04 |
| A12 = | 1.0243E−03 | −1.9133E−05 | −7.5033E−04 | −5.3840E−04 | 5.0856E−05 |
| A14 = | −2.2058E−04 | 6.8820E−06 | 1.0369E−04 | 5.2782E−05 | −6.2642E−06 |
| A16 = | 2.6092E−05 | −1.6737E−07 | −9.5080E−06 | −3.1710E−06 | 4.0035E−07 |
| A18 = | −1.6370E−06 | −5.9072E−08 | 5.2257E−07 | 1.0624E−07 | −1.3199E−08 |
| A20 = | 4.2981E−08 | 3.6370E−09 | −1.2771E−08 | −1.5200E−09 | 1.7840E−10 |

TABLE 4-continued

| | Aspheric Coefficients | | |
|---|---|---|---|
| Surface # | 18 | 19 | 20 |
| k = | -9.9000E+01 | -4.9654E+01 | -8.2203E-01 |
| A4 = | 3.7535E-02 | -2.6915E-02 | -3.2745E-02 |
| A6 = | -1.4497E-02 | 2.0536E-03 | 4.7546E-03 |
| A8 = | 2.6502E-03 | 2.1739E-04 | -5.3208E-04 |
| A10 = | -3.3109E-04 | -4.3162E-05 | 4.1969E-05 |
| A12 = | 2.9898E-05 | 2.9094E-06 | -2.2794E-06 |
| A14 = | -1.8488E-06 | -9.6041E-08 | 8.3428E-08 |
| A16 = | 7.1441E-08 | 1.3378E-09 | -1.9674E-09 |
| A18 = | -1.5092E-09 | 3.0177E-12 | 2.7142E-11 |
| A20 = | 1.2943E-11 | -1.9877E-13 | -1.6805E-13 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.73 | T56/CT6 | 0.21 |
| Fno | 1.70 | ΣAT/(T23 + T89) | 1.62 |
| HFOV [deg.] | 41.9 | R8/f | -1.20 |
| V4 | 56.0 | R9/f | -0.91 |
| V7 | 23.5 | R15/R16 | -0.02 |
| V9 | 37.4 | (R17 + R18)/(R17 - R18) | 0.34 |
| Vmin | 19.5 | f/f3 | 0.01 |
| Nmax | 1.669 | f/f4 | 0.47 |
| V1/N1 | 36.30 | f4/f3 | 0.03 |
| V2/N2 | 11.65 | f/f7 | -0.13 |
| V3/N3 | 11.65 | f/f8 | 1.20 |
| V4/N4 | 36.26 | f8/f3 | 0.01 |
| V5/N5 | 36.26 | f/EPD | 1.70 |
| V6/N6 | 14.34 | Yc81/Yc82 | 9.64; 0.97 |
| V7/N7 | 14.34 | f/(EPD × ImgH) [1/mm] | 0.28 |
| V8/N8 | 23.91 | ImgH [mm] | 6.15 |
| V9/N9 | 23.91 | TL/ImgH | 1.42 |
| (V/N)min | 11.65 | ImgH/BL | 5.48 |
| NV40 | 6 | SL/TL | 0.92 |
| tan(HFOV) | 0.90 | TL/f | 1.30 |
| CT8/CT9 | 1.10 | — | — |

3rd Embodiment

Figure 5:
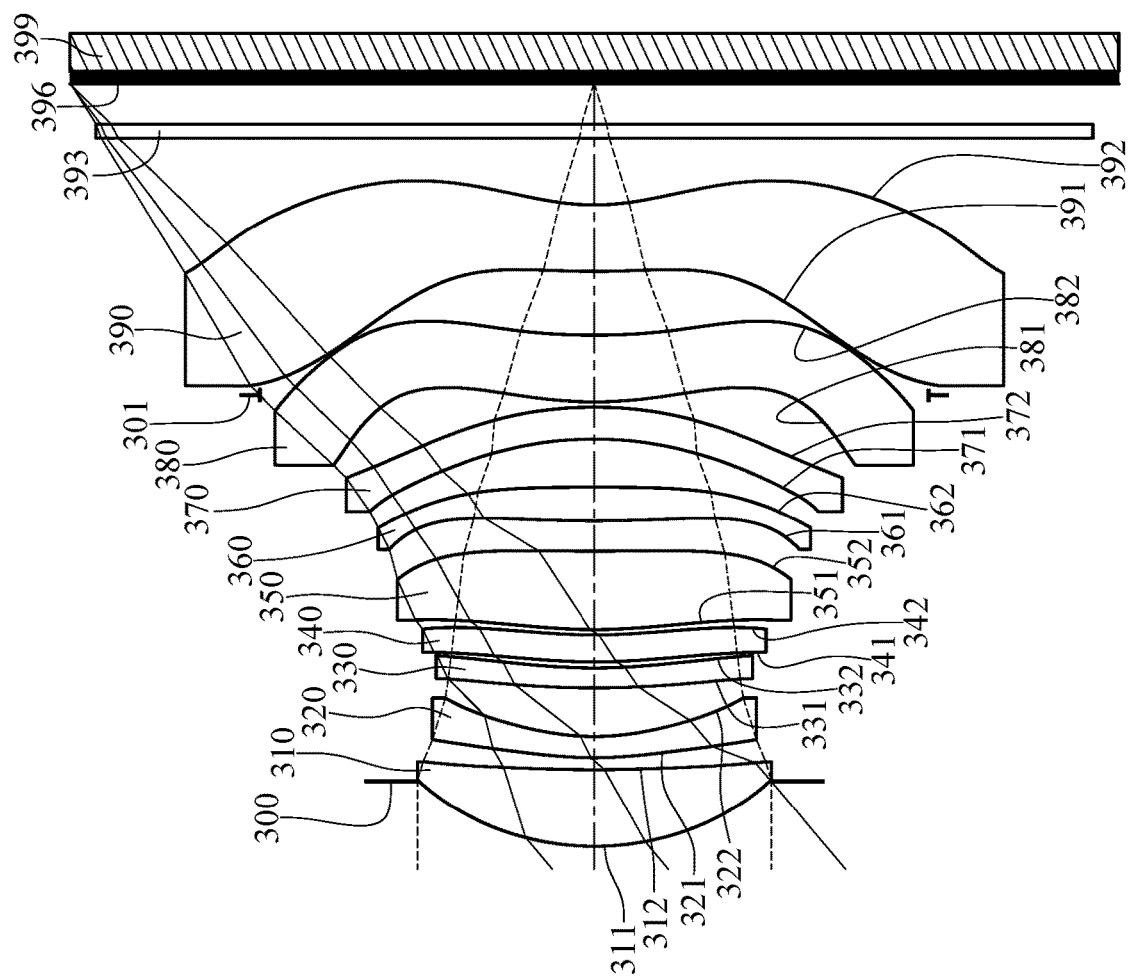
FIG. 5 is a schematic view of an image capturing unit according to the 3rd embodiment of the present disclosure.
Figure 6:
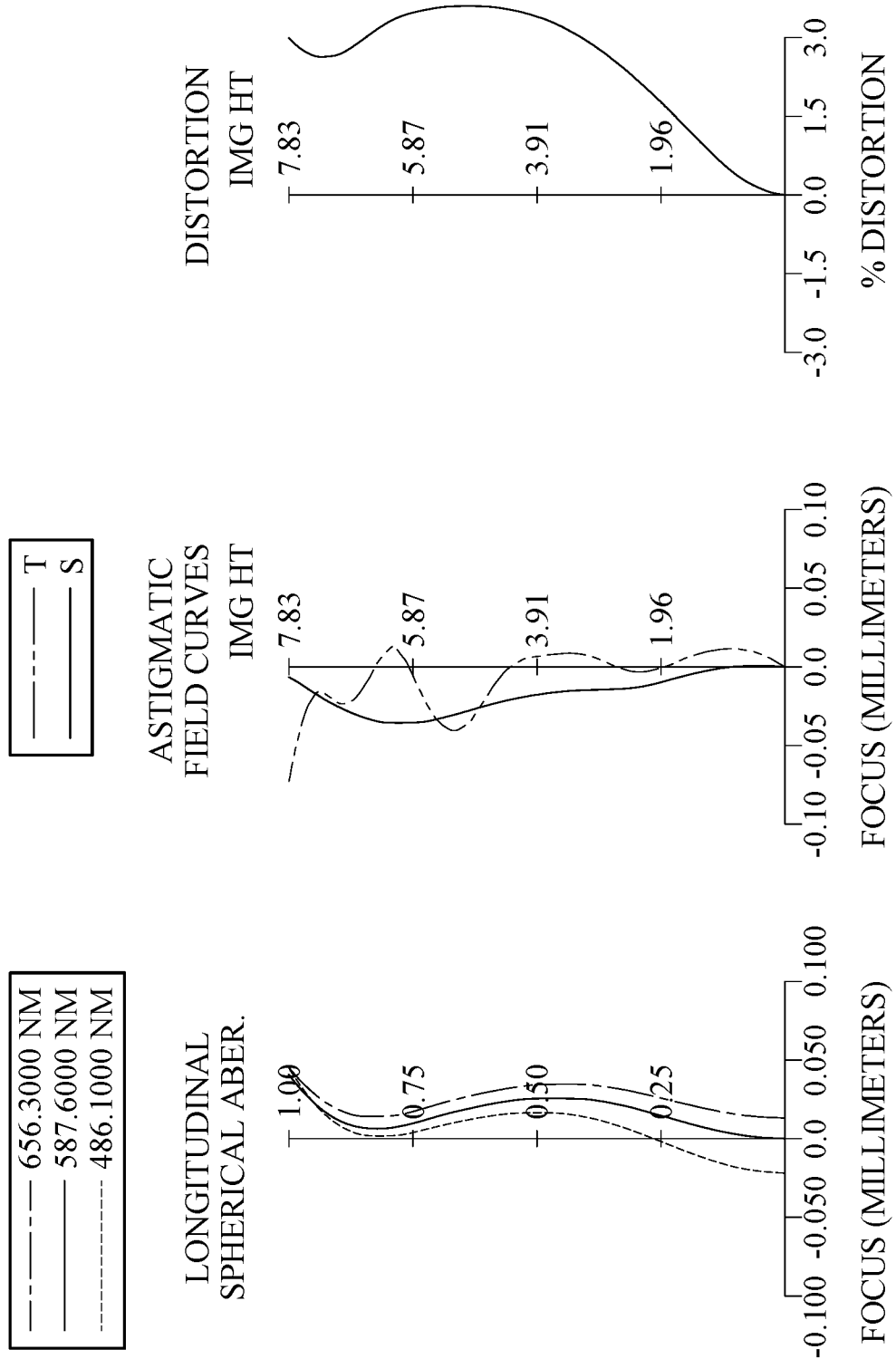
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical image lens assembly (its reference numeral is omitted) of the present disclosure and an image sensor 399. The optical image lens assembly includes, in order from an object side to an image side along an optical path, an aperture stop 300, a first lens element 310, a second lens element 320, a third lens element 330, a fourth lens element 340, a fifth lens element 350, a sixth lens element 360, a seventh lens element 370, an eighth lens element 380, a stop 301, a ninth lens element 390, a filter 393 and an image surface 396. The optical image lens assembly includes nine lens elements (310, 320, 330, 340, 350, 360, 370, 380 and 390) with no additional lens element disposed between each of the adjacent nine lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has one inflection point.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has one inflection point. The image-side surface 332 of the third lens element 330 has one inflection point.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has one inflection point. The image-side surface 342 of the fourth lens element 340 has one inflection point.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has one inflection point. The image-side surface 352 of the fifth lens element 350 has one inflection point.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has one inflection point. The image-side surface 362 of the sixth lens element 360 has one inflection point.

The seventh lens element 370 with negative refractive power has an object-side surface 371 being concave in a paraxial region thereof and an image-side surface 372 being convex in a paraxial region thereof. The seventh lens element 370 is made of plastic material and has the object-side surface 371 and the image-side surface 372 being both aspheric. The image-side surface 372 of the seventh lens element 370 has three inflection points.

The eighth lens element 380 with positive refractive power has an object-side surface 381 being convex in a paraxial region thereof and an image-side surface 382 being concave in a paraxial region thereof. The eighth lens element 380 is made of plastic material and has the object-side surface 381 and the image-side surface 382 being both aspheric. The object-side surface 381 of the eighth lens element 380 has two inflection points. The image-side surface 382 of the eighth lens element 380 has one inflection point. The object-side surface 381 of the eighth lens element 380 has at least one critical point in an off-axis region thereof. The image-side surface 382 of the eighth lens element 380 has at least one critical point in an off-axis region thereof.

The ninth lens element 390 with negative refractive power has an object-side surface 391 being convex in a paraxial region thereof and an image-side surface 392 being concave in a paraxial region thereof. The ninth lens element 390 is made of plastic material and has the object-side surface 391 and the image-side surface 392 being both aspheric. The object-side surface 391 of the ninth lens element 390 has two inflection points. The image-side surface 392 of the ninth lens element 390 has two inflection points.

The filter 393 is made of glass material and located between the ninth lens element 390 and the image surface 396, and will not affect the focal length of the optical image lens assembly. The image sensor 399 is disposed on or near the image surface 396 of the optical image lens assembly.

The detailed optical data of the 3rd embodiment are shown in Table 5 and the aspheric surface data are shown in Table 6 below.

TABLE 5

3rd Embodiment
f = 9.04 mm, Fno = 1.71, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.977 | | | | |
| 2 | Lens 1 | 4.118 | (ASP) | 1.149 | Plastic | 1.544 | 55.9 | 9.38 |
| 3 | | 19.221 | (ASP) | 0.181 | | | | |
| 4 | Lens 2 | 5.441 | (ASP) | 0.317 | Plastic | 1.634 | 23.8 | −19.49 |
| 5 | | 3.692 | (ASP) | 0.726 | | | | |
| 6 | Lens 3 | 14.129 | (ASP) | 0.300 | Plastic | 1.566 | 37.4 | −37.00 |
| 7 | | 8.372 | (ASP) | 0.089 | | | | |
| 8 | Lens 4 | 8.385 | (ASP) | 0.403 | Plastic | 1.566 | 37.4 | −423.96 |
| 9 | | 7.961 | (ASP) | 0.081 | | | | |
| 10 | Lens 5 | 7.820 | (ASP) | 1.169 | Plastic | 1.544 | 55.9 | 17.39 |
| 11 | | 42.691 | (ASP) | 0.452 | | | | |
| 12 | Lens 6 | 16.649 | (ASP) | 0.510 | Plastic | 1.544 | 55.9 | 24.49 |
| 13 | | −65.979 | (ASP) | 0.719 | | | | |
| 14 | Lens 7 | −5.536 | (ASP) | 0.476 | Plastic | 1.686 | 18.4 | −64.91 |
| 15 | | −6.543 | (ASP) | 0.078 | | | | |
| 16 | Lens 8 | 5.976 | (ASP) | 1.000 | Plastic | 1.544 | 55.9 | 20.87 |
| 17 | | 11.870 | (ASP) | −0.900 | | | | |
| 18 | Stop | Plano | | 1.850 | | | | |
| 19 | Lens 9 | 11.940 | (ASP) | 1.000 | Plastic | 1.566 | 37.4 | −9.40 |
| 20 | | 3.570 | (ASP) | 1.000 | | | | |
| 21 | Filter | Plano | | 0.210 | Glass | 1.517 | 64.2 | — |
| 22 | | Plano | | 0.597 | | | | |
| 23 | Image | Plano | | — | | | | |

Note:
Reference wavelength is 587.6 nm (d-line).
An effective radius of the stop 301 (Surface 18) is 5.000 mm.

TABLE 6

Aspheric Coefficients

| Surface # | 2 | 3 | 4 | 5 | 6 |
|---|---|---|---|---|---|
| k = | 1.5800E−01 | −4.3202E+00 | −2.0908E+01 | −1.0764E+01 | −5.2623E+00 |
| A4 = | 8.4772E−05 | −6.8635E−03 | −9.0266E−03 | 6.9700E−03 | −6.2481E−04 |
| A6 = | −9.0506E−05 | 2.3932E−03 | 2.7866E−03 | −1.3581E−03 | −1.2222E−04 |
| A8 = | 4.0431E−05 | −4.6439E−04 | −4.7012E−04 | 4.7700E−04 | 1.7302E−05 |
| A10 = | −8.1150E−06 | 5.2957E−05 | 5.2455E−05 | −7.4364E−05 | −7.6704E−06 |
| A12 = | 8.8096E−07 | −2.9034E−06 | −3.3733E−06 | 6.0236E−06 | 5.5763E−07 |
| A14 = | −2.9961E−08 | 4.0545E−08 | 6.2350E−08 | −1.7112E−07 | −5.6414E−09 |

TABLE 6-continued

Aspheric Coefficients

| Surface # | 7 | 8 | 9 | 10 | 11 |
|---|---|---|---|---|---|
| k = | −4.2939E+01 | −5.6495E+01 | −6.4497E+01 | −5.0869E+01 | −8.9985E+01 |
| A4 = | −6.6066E−04 | −1.8226E−03 | −2.2630E−03 | −1.5113E−03 | −4.7009E−03 |
| A6 = | −7.6087E−05 | −6.8019E−05 | −5.5902E−05 | −1.6101E−04 | −1.6929E−04 |
| A8 = | −3.4667E−06 | 8.1983E−06 | −1.0810E−05 | 3.9992E−06 | 2.1437E−06 |
| A10 = | 7.0934E−07 | 4.6506E−07 | −7.0146E−07 | 6.5367E−07 | −1.4489E−06 |
| A12 = | 9.1344E−08 | 4.8088E−08 | 6.4550E−08 | 3.6644E−08 | −2.7199E−08 |
| A14 = | −8.1587E−09 | 1.3293E−09 | 7.5435E−09 | −2.6946E−09 | 3.1593E−09 |

| Surface # | 12 | 13 | 14 | 15 | 16 |
|---|---|---|---|---|---|
| k = | −8.3497E+01 | −8.9967E+01 | 8.3780E−01 | −2.5057E+00 | −1.4162E+01 |
| A4 = | −3.0880E−03 | −7.2957E−03 | −1.2254E−03 | −8.0991E−03 | 2.5762E−03 |
| A6 = | −1.3270E−04 | 7.8228E−04 | 1.5399E−03 | 1.9228E−03 | −2.3817E−03 |
| A8 = | −3.8320E−05 | −9.8981E−05 | −4.1103E−04 | −2.9157E−04 | 3.2434E−04 |
| A10 = | 1.3828E−06 | −1.5937E−05 | 5.3841E−05 | 2.8308E−05 | −2.3044E−05 |
| A12 = | 6.0302E−08 | 5.5263E−06 | −3.0543E−06 | −1.4498E−06 | 5.1837E−07 |
| A14 = | −1.2590E−08 | −5.0672E−07 | 5.4370E−08 | 2.9668E−08 | 1.1681E−08 |
| A16 = | — | 1.5687E−08 | — | −2.3696E−11 | −3.8233E−10 |

| Surface # | 17 | 19 | 20 |
|---|---|---|---|
| k = | −2.2352E+00 | −2.5353E−01 | −1.2546E+00 |
| A4 = | 1.0366E−02 | −1.7592E−02 | −2.0139E−02 |
| A6 = | −4.1042E−03 | 5.3690E−04 | 1.7821E−03 |
| A8 = | 5.7904E−04 | 3.5213E−05 | −1.1752E−04 |
| A10 = | −4.8090E−05 | −2.9847E−06 | 5.3096E−06 |
| A12 = | 2.3051E−06 | 8.8918E−08 | −1.4827E−07 |
| A14 = | −5.8105E−08 | −1.2167E−09 | 2.2450E−09 |
| A16 = | 5.9311E−10 | 6.2482E−12 | −1.3897E−11 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| f [mm] | 9.04 | T56/CT6 | 0.89 |
|---|---|---|---|
| Fno | 1.71 | ΣAT/(T23 + T89) | 1.95 |
| HFOV [deg.] | 40.0 | R8/f | 0.88 |
| V4 | 37.4 | R9/f | 0.87 |
| V7 | 18.4 | R15/R16 | 0.50 |
| V9 | 37.4 | (R17 + R18)/(R17 − R18) | 1.85 |
| Vmin | 18.4 | f/f3 | −0.24 |
| Nmax | 1.686 | f/f4 | −0.02 |
| V1/N1 | 36.22 | f4/f3 | 11.46 |
| V2/N2 | 14.59 | f/f7 | −0.14 |
| V3/N3 | 23.91 | f/f8 | 0.43 |
| V4/N4 | 23.91 | f8/f3 | −0.56 |
| V5/N5 | 36.22 | f/EPD | 1.71 |
| V6/N6 | 36.22 | Yc81/Yc82 | 0.90 |
| V7/N7 | 10.90 | f/(EPD × ImgH) [1/mm] | 0.22 |
| V8/N8 | 36.22 | ImgH [mm] | 7.83 |
| V9/N9 | 23.91 | TL/ImgH | 1.46 |
| (V/N)min | 10.90 | ImgH/BL | 4.33 |
| NV40 | 5 | SL/TL | 0.91 |
| tan(HFOV) | 0.84 | TL/f | 1.26 |
| CT8/CT9 | 1.00 | — | — |

4th Embodiment

Figure 7:
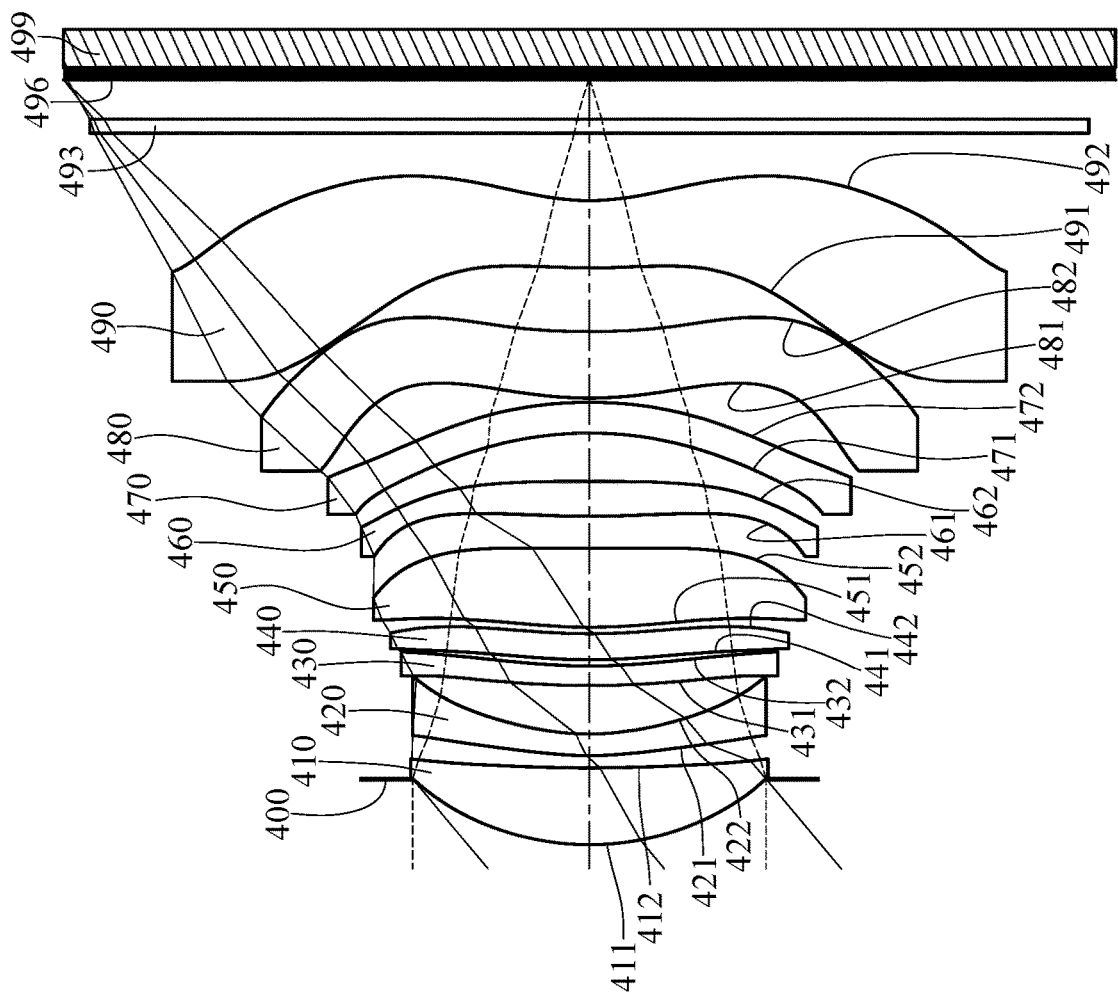
FIG. 7 is a schematic view of an image capturing unit according to the 4th embodiment of the present disclosure.

FIG. 7 is a schematic view of an image capturing unit according to the 4th embodiment of the present disclosure.

Figure 8:
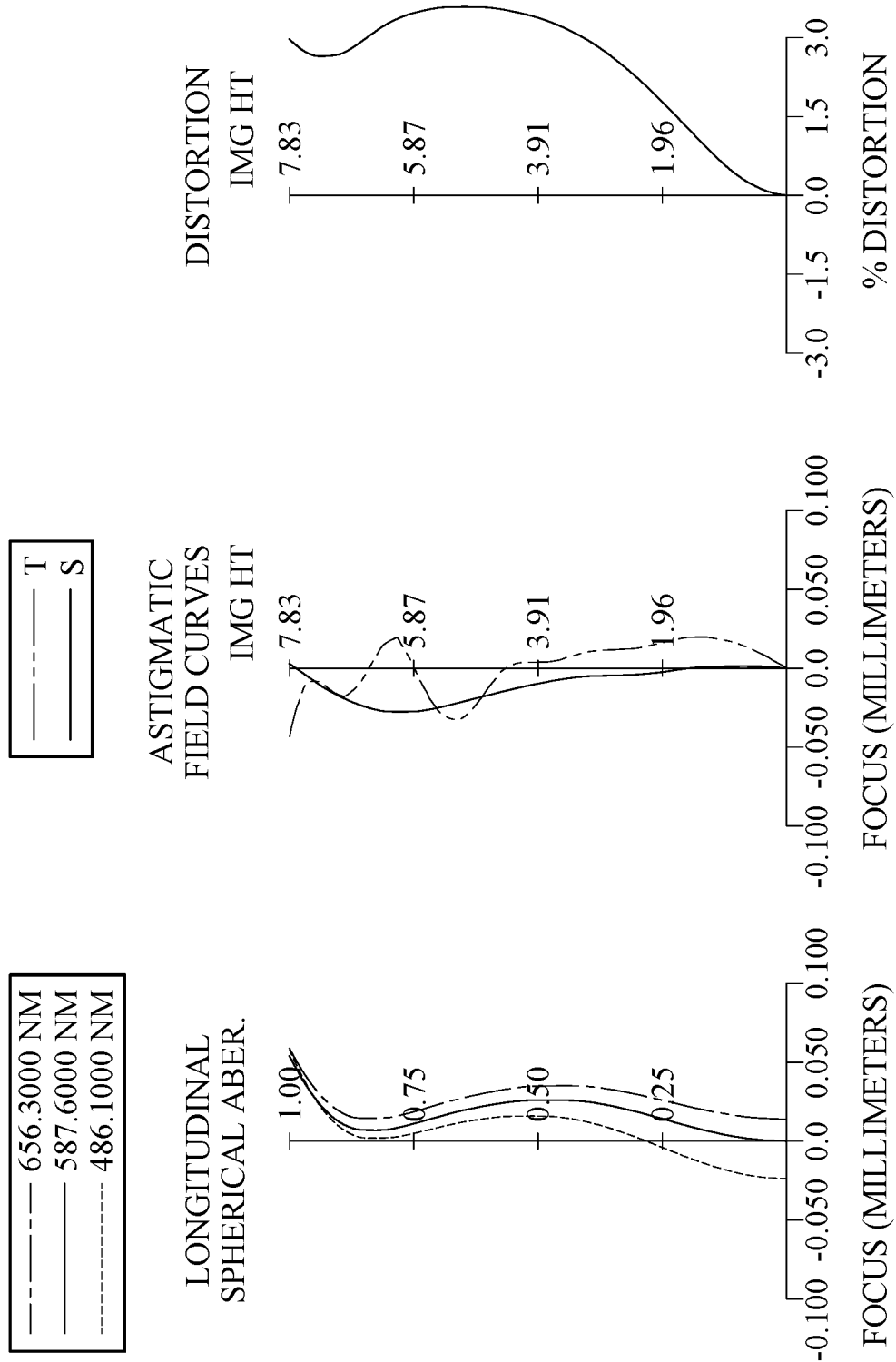
FIG. 8 shows spherical aberration curves, astigmatic field curves and a distortion curve of the image capturing unit according to the 4th embodiment.

FIG. 8 shows, in order from left to right, spherical aberration curves, astigmatic field curves and a distortion curve of the image capturing unit according to the 4th embodiment. In FIG. 7, the image capturing unit includes the optical image lens assembly (its reference numeral is omitted) of the present disclosure and an image sensor 499. The optical image lens assembly includes, in order from an object side to an image side along an optical path, an aperture stop 400, a first lens element 410, a second lens element 420, a third lens element 430, a fourth lens element 440, a fifth lens element 450, a sixth lens element 460, a seventh lens element 470, an eighth lens element 480, a ninth lens element 490, a filter 493 and an image surface 496. The optical image lens assembly includes nine lens elements (410, 420, 430, 440, 450, 460, 470, 480 and 490) with no additional lens element disposed between each of the adjacent nine lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The image-side surface 412 of the first lens element 410 has one inflection point.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has one inflection point.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has one inflection point. The image-side surface 432 of the third lens element 430 has one inflection point.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has two inflection points. The image-side surface 442 of the fourth lens element 440 has two inflection points.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has two inflection points. The image-side surface 452 of the fifth lens element 450 has one inflection point.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has one inflection point. The image-side surface 462 of the sixth lens element 460 has one inflection point.

The seventh lens element 470 with negative refractive power has an object-side surface 471 being concave in a paraxial region thereof and an image-side surface 472 being convex in a paraxial region thereof. The seventh lens element 470 is made of plastic material and has the object-side surface 471 and the image-side surface 472 being both aspheric. The image-side surface 472 of the seventh lens element 470 has three inflection points.

The eighth lens element 480 with positive refractive power has an object-side surface 481 being convex in a paraxial region thereof and an image-side surface 482 being concave in a paraxial region thereof. The eighth lens element 480 is made of plastic material and has the object-side surface 481 and the image-side surface 482 being both aspheric. The object-side surface 481 of the eighth lens element 480 has two inflection points. The image-side surface 482 of the eighth lens element 480 has one inflection point. The object-side surface 481 of the eighth lens element 480 has at least one critical point in an off-axis region thereof. The image-side surface 482 of the eighth lens element 480 has at least one critical point in an off-axis region thereof.

The ninth lens element 490 with negative refractive power has an object-side surface 491 being convex in a paraxial region thereof and an image-side surface 492 being concave in a paraxial region thereof. The ninth lens element 490 is made of plastic material and has the object-side surface 491 and the image-side surface 492 being both aspheric. The object-side surface 491 of the ninth lens element 490 has two inflection points. The image-side surface 492 of the ninth lens element 490 has two inflection points.

The filter 493 is made of glass material and located between the ninth lens element 490 and the image surface 496, and will not affect the focal length of the optical image lens assembly. The image sensor 499 is disposed on or near the image surface 496 of the optical image lens assembly.

The detailed optical data of the 4th embodiment are shown in Table 7 and the aspheric surface data are shown in Table 8 below.

TABLE 7

4th Embodiment
f = 9.05 mm, Fno = 1.72, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.976 | | | | |
| 2 | Lens 1 | 4.128 | (ASP) | 1.146 | Plastic | 1.544 | 55.9 | 9.42 |
| 3 | | 19.122 | (ASP) | 0.182 | | | | |
| 4 | Lens 2 | 5.477 | (ASP) | 0.318 | Plastic | 1.634 | 23.8 | −19.62 |
| 5 | | 3.717 | (ASP) | 0.724 | | | | |
| 6 | Lens 3 | 14.046 | (ASP) | 0.303 | Plastic | 1.566 | 37.4 | −40.91 |
| 7 | | 8.675 | (ASP) | 0.092 | | | | |
| 8 | Lens 4 | 8.723 | (ASP) | 0.385 | Plastic | 1.566 | 37.4 | −6068.47 |
| 9 | | 8.562 | (ASP) | 0.100 | | | | |
| 10 | Lens 5 | 8.435 | (ASP) | 1.172 | Plastic | 1.544 | 55.9 | 18.39 |
| 11 | | 51.056 | (ASP) | 0.479 | | | | |
| 12 | Lens 6 | 16.929 | (ASP) | 0.516 | Plastic | 1.544 | 55.9 | 25.45 |
| 13 | | −75.372 | (ASP) | 0.719 | | | | |
| 14 | Lens 7 | −5.582 | (ASP) | 0.460 | Plastic | 1.686 | 18.4 | −65.35 |
| 15 | | −6.589 | (ASP) | 0.062 | | | | |
| 16 | Lens 8 | 6.067 | (ASP) | 0.999 | Plastic | 1.544 | 55.9 | 21.05 |
| 17 | | 12.154 | (ASP) | 0.952 | | | | |
| 18 | Lens 9 | 11.947 | (ASP) | 0.999 | Plastic | 1.566 | 37.4 | −9.33 |
| 19 | | 3.552 | (ASP) | 1.000 | | | | |
| 20 | Filter | Plano | | 0.210 | Glass | 1.517 | 64.2 | — |
| 21 | | Plano | | 0.595 | | | | |
| 22 | Image | Plano | | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k = | 1.5512E−01 | −4.1984E+00 | −2.0539E+01 | −1.0754E+01 | −5.2570E+00 |
| A4 = | 1.1191E−04 | −6.8640E−03 | −9.0502E−03 | 6.9859E−03 | −6.2137E−04 |
| A6 = | −9.3462E−05 | 2.3843E−03 | 2.7853E−03 | −1.3584E−03 | −1.1766E−04 |
| A8 = | 3.9688E−05 | −4.6361E−04 | −4.6999E−04 | 4.7610E−04 | 1.8333E−05 |
| A10 = | −7.9132E−06 | 5.3067E−05 | 5.2453E−05 | −7.4393E−05 | −7.6780E−06 |
| A12 = | 8.7030E−07 | −2.9129E−06 | −3.3712E−06 | 6.0195E−06 | 5.3672E−07 |
| A14 = | −2.9541E−08 | 4.0680E−08 | 6.1627E−08 | −1.7109E−07 | −5.6553E−09 |

| Surface # | 7 | 8 | 9 | 10 | 11 |
|---|---|---|---|---|---|
| k = | −4.2972E+01 | −5.7390E+01 | −6.5377E+01 | −5.1219E+01 | −8.9981E+01 |
| A4 = | −6.6844E−04 | −1.8495E−03 | −2.2991E−03 | −1.5825E−03 | −4.7846E−03 |
| A6 = | −7.6738E−05 | −7.0988E−05 | −5.5120E−05 | −1.6819E−04 | −1.6748E−04 |
| A8 = | −3.5716E−06 | 8.0213E−06 | −1.0586E−05 | 3.7210E−06 | 2.6223E−06 |
| A10 = | 7.2385E−07 | 4.5673E−07 | −6.7509E−07 | 6.5950E−07 | −1.4175E−06 |
| A12 = | 9.3846E−08 | 4.9330E−08 | 6.8261E−08 | 3.9820E−08 | −2.6719E−08 |
| A14 = | −8.6862E−09 | 1.7982E−09 | 7.9244E−09 | −2.1873E−09 | 3.0993E−09 |

| Surface # | 12 | 13 | 14 | 15 | 16 |
|---|---|---|---|---|---|
| k = | −8.5459E+01 | −9.0000E+01 | 7.9043E−01 | −2.6534E+00 | −1.3518E+01 |
| A4 = | −2.9966E−03 | −6.3568E−03 | 8.3077E−06 | −6.6035E−03 | 3.2606E−03 |
| A6 = | −1.2145E−04 | 2.4381E−04 | 6.5165E−04 | 1.0776E−03 | −2.6419E−03 |
| A8 = | −3.7886E−05 | 6.9392E−05 | −1.3711E−04 | −6.9209E−05 | 3.8917E−04 |
| A10 = | 1.3822E−06 | −4.3311E−05 | 8.4543E−06 | −4.1872E−06 | −3.4005E−05 |
| A12 = | 5.8485E−08 | 7.7835E−06 | 1.0216E−06 | 1.2130E−06 | 1.5884E−06 |
| A14 = | −1.2756E−08 | −5.9025E−07 | −1.3041E−07 | −8.3666E−08 | −4.6524E−08 |
| A16 = | — | 1.6545E−08 | 3.3278E−09 | 1.9147E−09 | 1.2753E−09 |
| A18 = | — | — | — | — | −1.9227E−11 |

| Surface # | 17 | 18 | 19 |
|---|---|---|---|
| k = | −2.2906E+00 | −2.2342E−01 | −1.2525E+00 |
| A4 = | 1.1210E−02 | −1.7221E−02 | −2.0382E−02 |
| A6 = | −4.2608E−03 | 3.0288E−04 | 1.8203E−03 |
| A8 = | 6.1124E−04 | 9.6145E−05 | −1.2179E−04 |
| A10 = | −5.2870E−05 | −9.8525E−06 | 5.6283E−06 |
| A12 = | 2.7302E−06 | 4.8635E−07 | −1.6281E−07 |
| A14 = | −7.9862E−08 | −1.3694E−08 | 2.6270E−09 |
| A16 = | 1.1798E−09 | 2.0913E−10 | −1.9145E−11 |
| A18 = | −6.4032E−12 | −1.3429E−12 | 2.8911E−14 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

4th Embodiment

| f [mm] | 9.05 | T56/CT6 | 0.93 |
|---|---|---|---|
| Fno | 1.72 | ΣAT/(T23 + T89) | 1.97 |
| HFOV [deg.] | 40.0 | R8/f | 0.95 |
| V4 | 37.4 | R9/f | 0.93 |
| V7 | 18.4 | R15/R16 | 0.50 |
| V9 | 37.4 | (R17 + R18)/(R17 − R18) | 1.85 |
| Vmin | 18.4 | f/f3 | −0.22 |
| Nmax | 1.686 | f/f4 | 0.00 |
| V1/N1 | 36.22 | f4/f3 | 148.35 |
| V2/N2 | 14.59 | f/f7 | −0.14 |
| V3/N3 | 23.91 | f/f8 | 0.43 |
| V4/N4 | 23.91 | f8/f3 | −0.51 |
| V5/N5 | 36.22 | f/EPD | 1.72 |
| V6/N6 | 36.22 | Yc81/Yc82 | 0.88 |
| V7/N7 | 10.90 | f/(EPD × ImgH) [1/mm] | 0.22 |

-continued

4th Embodiment

| V8/N8 | 36.22 | ImgH [mm] | 7.83 |
|---|---|---|---|
| V9/N9 | 23.91 | TL/ImgH | 1.46 |
| (V/N)min | 10.90 | ImgH/BL | 4.34 |
| NV40 | 5 | SL/TL | 0.91 |
| tan(HFOV) | 0.84 | TL/f | 1.26 |
| CT8/CT9 | 1.00 | — | — |

5th Embodiment

Figure 9:
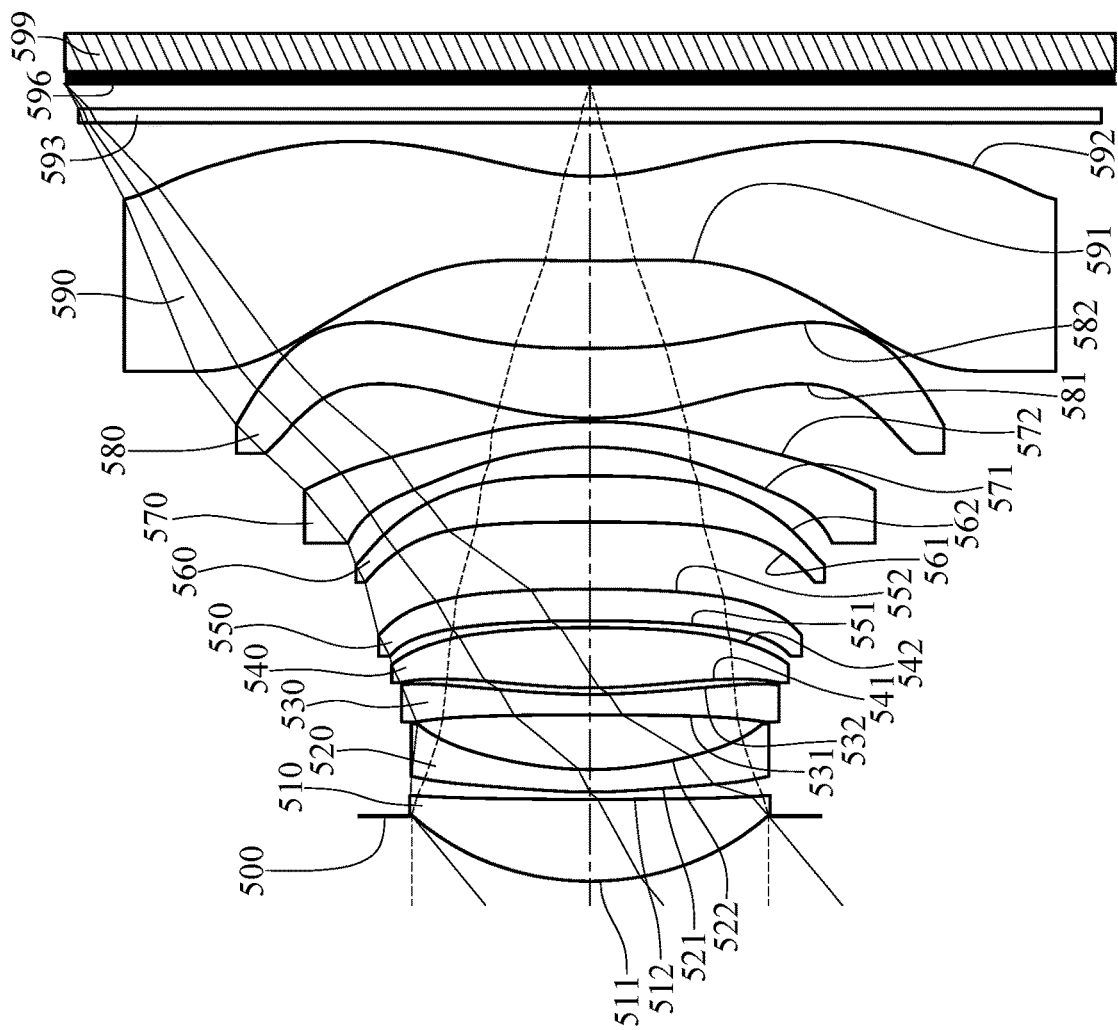
FIG. 9 is a schematic view of an image capturing unit according to the 5th embodiment of the present disclosure.
Figure 10:
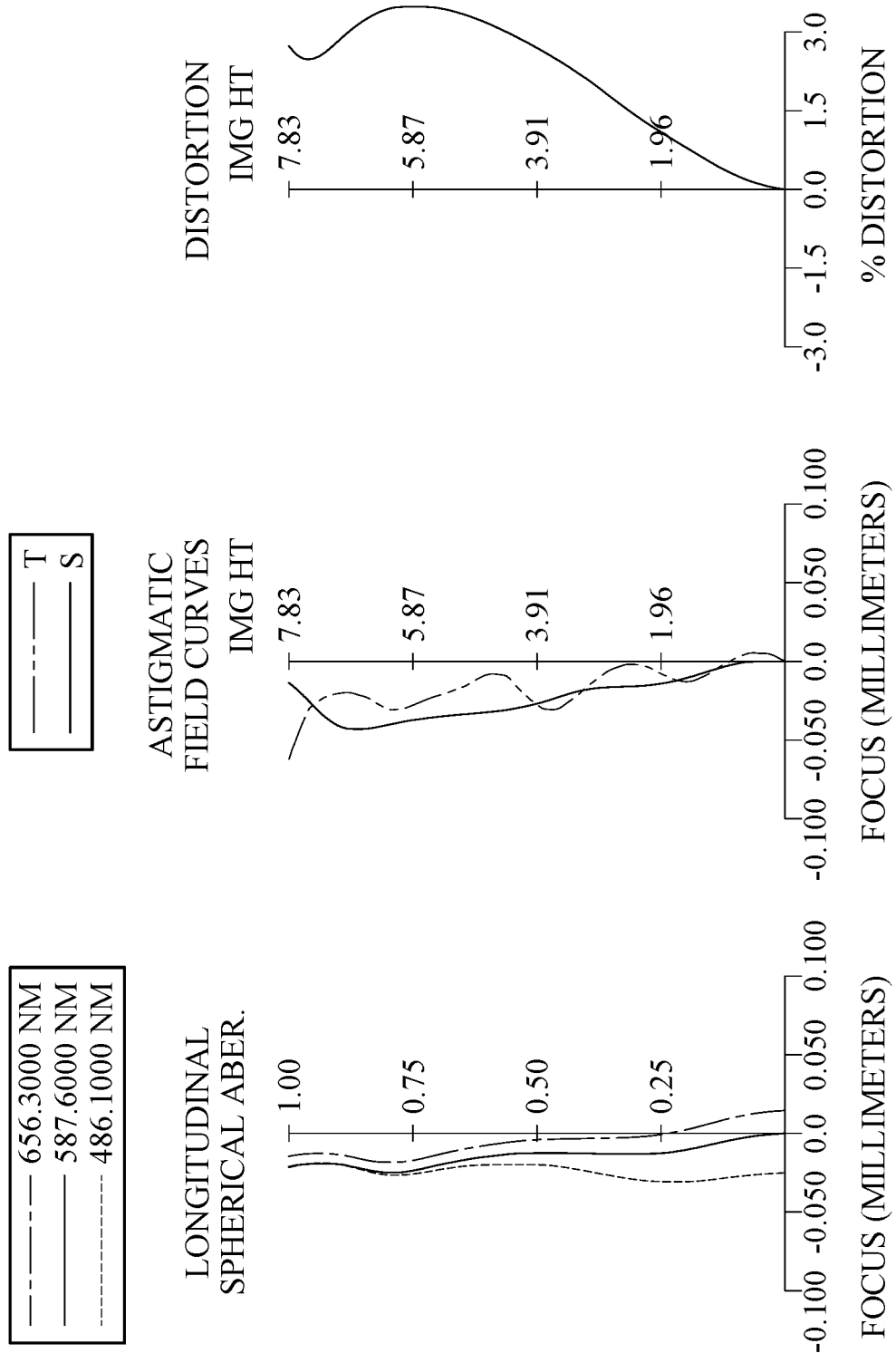
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical image lens assembly (its reference numeral is omitted) of the present disclosure and an image sensor 599. The optical image lens assembly includes, in order from an object side to an image side along an optical path, an aperture stop 500, a first lens element 510, a second lens element 520, a third lens element 530, a fourth lens element 540, a fifth lens element 550, a sixth lens element 560, a seventh lens element 570, an eighth lens element 580, a ninth lens element 590, a filter 593 and an image surface 596. The optical image lens assembly includes nine lens elements (510, 520, 530, 540, 550, 560, 570, 580 and 590) with no additional lens element disposed between each of the adjacent nine lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The image-side surface 512 of the first lens element 510 has two inflection points.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being concave in a paraxial region thereof. The third lens element 530 is made of plastic material and has the object-side surface 531 and the image-side surface 532 being both aspheric. The image-side surface 532 of the third lens element 530 has one inflection point.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has one inflection point.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with positive refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. The image-side surface 562 of the sixth lens element 560 has one inflection point.

The seventh lens element 570 with negative refractive power has an object-side surface 571 being concave in a paraxial region thereof and an image-side surface 572 being convex in a paraxial region thereof. The seventh lens element 570 is made of plastic material and has the object-side surface 571 and the image-side surface 572 being both aspheric. The image-side surface 572 of the seventh lens element 570 has three inflection points.

The eighth lens element 580 with positive refractive power has an object-side surface 581 being convex in a paraxial region thereof and an image-side surface 582 being concave in a paraxial region thereof. The eighth lens element 580 is made of plastic material and has the object-side surface 581 and the image-side surface 582 being both aspheric. The object-side surface 581 of the eighth lens element 580 has two inflection points. The image-side surface 582 of the eighth lens element 580 has two inflection points. The object-side surface 581 of the eighth lens element 580 has at least one critical point in an off-axis region thereof. The image-side surface 582 of the eighth lens element 580 has at least one critical point in an off-axis region thereof.

The ninth lens element 590 with negative refractive power has an object-side surface 591 being convex in a paraxial region thereof and an image-side surface 592 being concave in a paraxial region thereof. The ninth lens element 590 is made of plastic material and has the object-side surface 591 and the image-side surface 592 being both aspheric. The object-side surface 591 of the ninth lens element 590 has two inflection points. The image-side surface 592 of the ninth lens element 590 has two inflection points.

The filter 593 is made of glass material and located between the ninth lens element 590 and the image surface 596, and will not affect the focal length of the optical image lens assembly. The image sensor 599 is disposed on or near the image surface 596 of the optical image lens assembly.

The detailed optical data of the 5th embodiment are shown in Table 9 and the aspheric surface data are shown in Table 10 below.

TABLE 9

5th Embodiment
f = 9.25 mm, Fno = 1.74, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.978 | | | | |
| 2 | Lens 1 | 4.251 | (ASP) | 1.219 | Plastic | 1.544 | 55.9 | 8.73 |
| 3 | | 36.298 | (ASP) | 0.112 | | | | |
| 4 | Lens 2 | 8.553 | (ASP) | 0.337 | Plastic | 1.639 | 23.5 | −20.63 |
| 5 | | 5.106 | (ASP) | 0.815 | | | | |
| 6 | Lens 3 | −65.308 | (ASP) | 0.300 | Plastic | 1.544 | 55.9 | −15.20 |
| 7 | | 9.486 | (ASP) | 0.100 | | | | |
| 8 | Lens 4 | 7.972 | (ASP) | 0.911 | Plastic | 1.544 | 55.9 | 10.47 |
| 9 | | −19.164 | (ASP) | 0.101 | | | | |
| 10 | Lens 5 | −23.228 | (ASP) | 0.470 | Plastic | 1.566 | 37.4 | 801.48 |
| 11 | | −22.258 | (ASP) | 1.000 | | | | |
| 12 | Lens 6 | −53.795 | (ASP) | 0.687 | Plastic | 1.566 | 37.4 | 90.79 |
| 13 | | −26.404 | (ASP) | 0.428 | | | | |
| 14 | Lens 7 | −5.606 | (ASP) | 0.380 | Plastic | 1.639 | 23.5 | −26.36 |
| 15 | | −8.626 | (ASP) | 0.050 | | | | |

TABLE 9-continued

5th Embodiment
f = 9.25 mm, Fno = 1.74, HFOV = 39.5 deg.

| Surface # | | Curvature Radius | | Thickness | Material | Index | Abbe # | Focal Length |
|---|---|---|---|---|---|---|---|---|
| 16 | Lens 8 | 5.110 | (ASP) | 1.050 | Plastic | 1.544 | 55.9 | 12.75 |
| 17 | | 18.015 | (ASP) | 1.300 | | | | |
| 18 | Lens 9 | 18.363 | (ASP) | 1.260 | Plastic | 1.566 | 37.4 | −8.50 |
| 19 | | 3.720 | (ASP) | 0.800 | | | | |
| 20 | Filter | Plano | | 0.210 | Glass | 1.517 | 64.2 | — |
| 21 | | Plano | | 0.378 | | | | |
| 22 | Image | Plano | | — | | | | |

Note:
Reference wavelength is 587.6 nm (d-line).

TABLE 10

Aspheric Coefficients

| Surface # | 2 | 3 | 4 | 5 | 6 |
|---|---|---|---|---|---|
| k = | 2.1753E−01 | 3.3963E+01 | −3.9311E+01 | −1.8030E+01 | −9.0000E+01 |
| A4 = | 3.4688E−04 | −6.7836E−03 | −8.9838E−03 | 6.5099E−03 | 2.0872E−04 |
| A6 = | −1.0096E−04 | 2.4689E−03 | 2.8428E−03 | −1.4820E−03 | −2.2005E−04 |
| A8 = | 4.8171E−05 | −4.6869E−04 | −4.7670E−04 | 4.7424E−04 | 1.7151E−05 |
| A10 = | −8.6253E−06 | 5.0631E−05 | 5.1858E−05 | −7.1404E−05 | −6.0350E−06 |
| A12 = | 8.5800E−07 | −2.7902E−06 | −2.8903E−06 | 6.3127E−06 | 5.9591E−07 |
| A14 = | −3.9732E−08 | 5.5131E−08 | 6.1627E−08 | −1.7109E−07 | −5.6553E−09 |

| Surface # | 7 | 8 | 9 | 10 | 11 |
|---|---|---|---|---|---|
| k = | −7.4888E+01 | −4.6433E+01 | 3.8663E+01 | 5.7062E+01 | −3.8132E+00 |
| A4 = | −5.1024E−04 | −2.0662E−03 | −1.8071E−03 | −7.2605E−04 | −1.4956E−03 |
| A6 = | 1.4365E−05 | −1.3942E−04 | −7.4255E−05 | −9.4804E−05 | −1.5585E−04 |
| A8 = | 2.5753E−06 | 2.8264E−06 | −9.7731E−06 | 1.6825E−06 | −1.8124E−06 |
| A10 = | −3.2141E−07 | 9.3718E−08 | 1.0210E−08 | −4.5281E−07 | −1.1343E−06 |
| A12 = | −2.3413E−07 | −5.1636E−08 | 1.3332E−07 | −6.9463E−08 | −6.4304E−09 |
| A14 = | −8.6015E−18 | −3.6874E−18 | 9.7318E−19 | −8.0125E−09 | −3.7158E−09 |

| Surface # | 12 | 13 | 14 | 15 | 16 |
|---|---|---|---|---|---|
| k = | 2.4407E+01 | 5.1454E+01 | 1.1342E+00 | −9.0908E+00 | −8.9456E+00 |
| A4 = | −3.6336E−03 | −1.2452E−02 | −7.0823E−03 | −1.0934E−02 | 4.3055E−03 |
| A6 = | −8.5206E−05 | 3.3066E−03 | 5.4096E−03 | 3.4871E−03 | −1.3337E−03 |
| A8 = | −2.4447E−05 | −1.4446E−03 | −1.9539E−03 | −7.0608E−04 | 2.1085E−04 |
| A10 = | 7.7747E−07 | 3.6391E−04 | 4.2475E−04 | 9.9350E−05 | −3.0517E−05 |
| A12 = | 6.6231E−09 | −5.2706E−05 | −5.3528E−05 | −8.9661E−06 | 3.0388E−06 |
| A14 = | 1.0338E−09 | 4.4797E−06 | 3.8864E−06 | 4.8115E−07 | −1.8830E−07 |
| A16 = | — | −2.1098E−07 | −1.5239E−07 | −1.3935E−08 | 6.8704E−09 |
| A18 = | — | 4.2840E−09 | 2.5014E−09 | 1.6787E−10 | −1.3439E−10 |
| A20 = | — | — | — | — | 1.0867E−12 |

| Surface # | 17 | 18 | 19 |
|---|---|---|---|
| k = | −7.2234E−01 | 1.0379E+00 | −1.2073E+00 |
| A4 = | 1.1639E−02 | −1.3830E−02 | −1.5934E−02 |
| A6 = | −2.6013E−03 | 7.4961E−04 | 1.4729E−03 |
| A8 = | 3.3236E−04 | −3.7471E−05 | −1.0519E−04 |
| A10 = | −3.2701E−05 | −1.7566E−06 | 5.4150E−06 |
| A12 = | 2.3056E−06 | 9.9298E−08 | −1.9598E−07 |
| A14 = | −1.0920E−07 | −2.1682E−09 | 4.8724E−09 |
| A16 = | 3.2430E−09 | 9.2434E−12 | −7.8913E−11 |
| A18 = | −5.4247E−11 | 3.4037E−13 | 7.4321E−13 |
| A20 = | 3.8997E−13 | −3.8575E−15 | −3.0584E−15 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 9.25 | T56/CT6 | 1.46 |
| Fno | 1.74 | ΣAT/(T23 + T89) | 1.85 |
| HFOV [deg.] | 39.5 | R8/f | −2.07 |
| V4 | 55.9 | R9/f | −2.51 |
| V7 | 23.5 | R15/R16 | 0.28 |
| V9 | 37.4 | (R17 + R18)/(R17 − R18) | 1.51 |
| Vmin | 23.5 | f/f3 | −0.61 |
| Nmax | 1.639 | f/f4 | 0.88 |
| V1/N1 | 36.22 | f4/f3 | −0.69 |
| V2/N2 | 14.34 | f/f7 | −0.35 |
| V3/N3 | 36.22 | f/f8 | 0.73 |
| V4/N4 | 36.22 | f8/f3 | −0.84 |
| V5/N5 | 23.91 | f/EPD | 1.74 |
| V6/N6 | 23.91 | Yc81/Yc82 | 0.94 |
| V7/N7 | 14.34 | f/(EPD × ImgH) [1/mm] | 0.22 |
| V8/N8 | 36.22 | ImgH [mm] | 7.83 |
| V9/N9 | 23.91 | TL/ImgH | 1.52 |
| (V/N)min | 14.34 | ImgH/BL | 5.64 |
| NV40 | 5 | SL/TL | 0.92 |
| tan(HFOV) | 0.82 | TL/f | 1.29 |
| CT8/CT9 | 0.83 | — | — |

6th Embodiment

Figure 11:
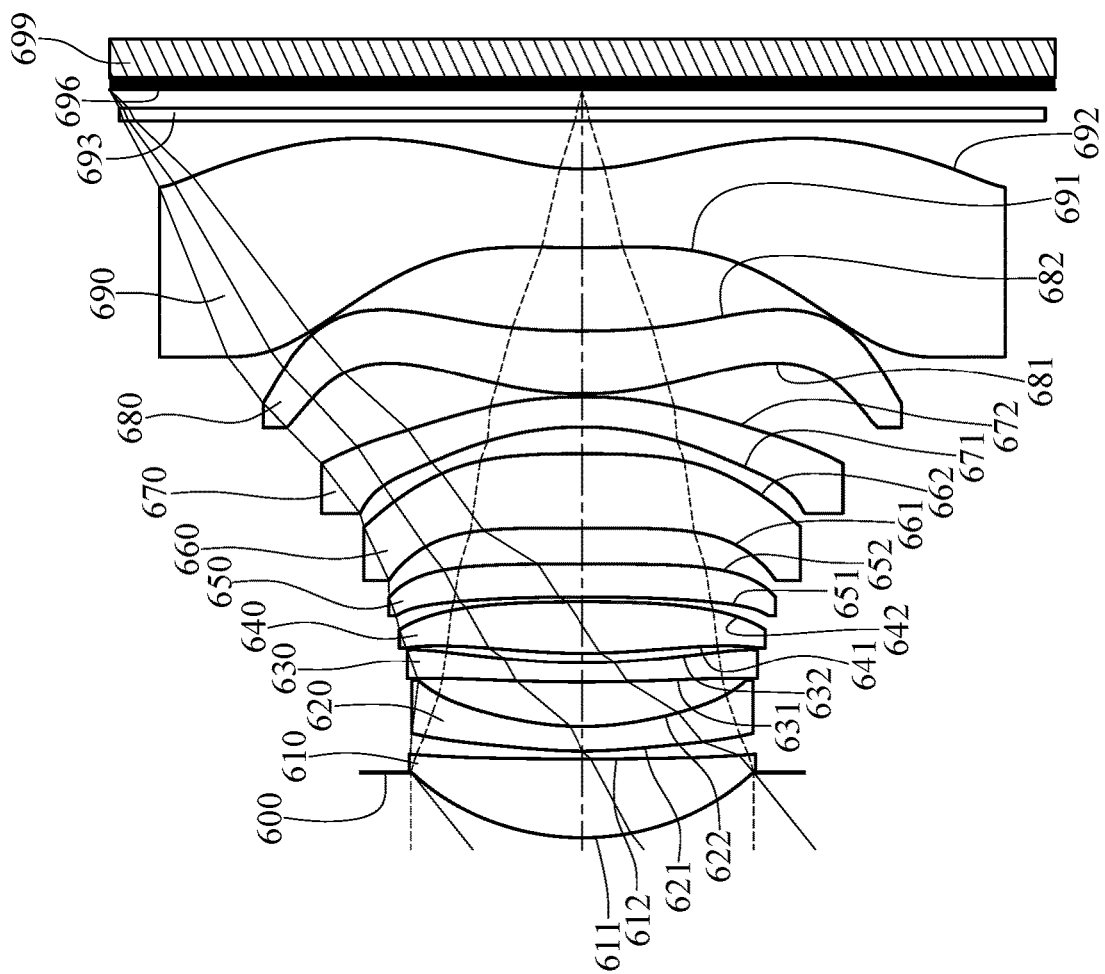
FIG. 11 is a schematic view of an image capturing unit according to the 6th embodiment of the present disclosure.
Figure 12:
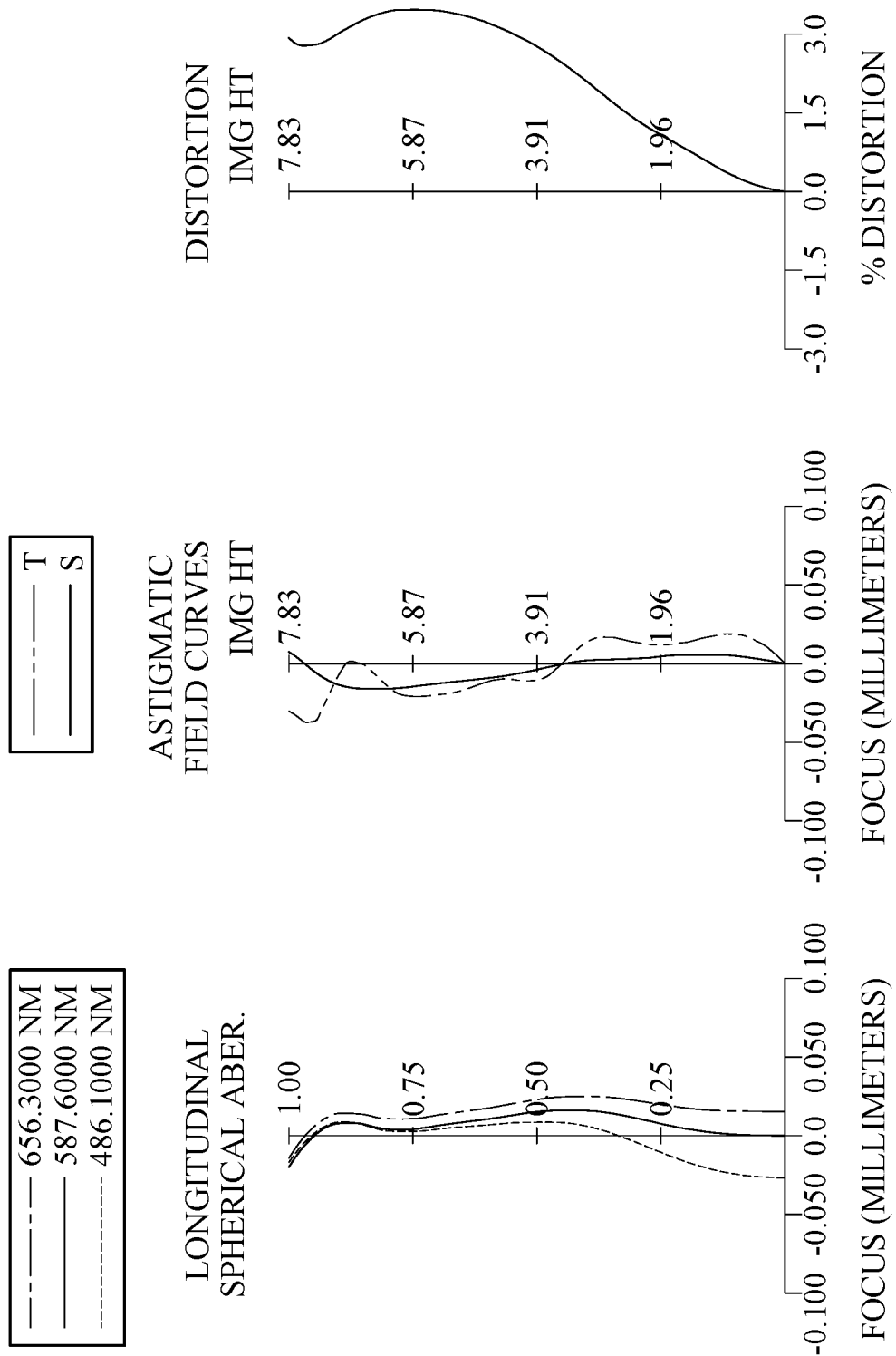
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical image lens assembly (its reference numeral is omitted) of the present disclosure and an image sensor 699. The optical image lens assembly includes, in order from an object side to an image side along an optical path, an aperture stop 600, a first lens element 610, a second lens element 620, a third lens element 630, a fourth lens element 640, a fifth lens element 650, a sixth lens element 660, a seventh lens element 670, an eighth lens element 680, a ninth lens element 690, a filter 693 and an image surface 696. The optical image lens assembly includes nine lens elements (610, 620, 630, 640, 650, 660, 670, 680 and 690) with no additional lens element disposed between each of the adjacent nine lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The image-side surface 612 of the first lens element 610 has one inflection point.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has one inflection point. The image-side surface 632 of the third lens element 630 has one inflection point.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has one inflection point.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with positive refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric. The image-side surface 662 of the sixth lens element 660 has one inflection point.

The seventh lens element 670 with negative refractive power has an object-side surface 671 being concave in a paraxial region thereof and an image-side surface 672 being convex in a paraxial region thereof. The seventh lens element 670 is made of plastic material and has the object-side surface 671 and the image-side surface 672 being both aspheric. The image-side surface 672 of the seventh lens element 670 has two inflection points.

The eighth lens element 680 with positive refractive power has an object-side surface 681 being convex in a paraxial region thereof and an image-side surface 682 being concave in a paraxial region thereof. The eighth lens element 680 is made of plastic material and has the object-side surface 681 and the image-side surface 682 being both aspheric. The object-side surface 681 of the eighth lens element 680 has two inflection points. The image-side surface 682 of the eighth lens element 680 has two inflection points. The object-side surface 681 of the eighth lens element 680 has at least one critical point in an off-axis region thereof. The image-side surface 682 of the eighth lens element 680 has at least one critical point in an off-axis region thereof.

The ninth lens element 690 with negative refractive power has an object-side surface 691 being convex in a paraxial region thereof and an image-side surface 692 being concave in a paraxial region thereof. The ninth lens element 690 is made of plastic material and has the object-side surface 691 and the image-side surface 692 being both aspheric. The object-side surface 691 of the ninth lens element 690 has two inflection points. The image-side surface 692 of the ninth lens element 690 has two inflection points.

The filter 693 is made of glass material and located between the ninth lens element 690 and the image surface 696, and will not affect the focal length of the optical image lens assembly. The image sensor 699 is disposed on or near the image surface 696 of the optical image lens assembly.

The detailed optical data of the 6th embodiment are shown in Table 11 and the aspheric surface data are shown in Table 12 below.

TABLE 11

6th Embodiment
f = 9.48 mm, Fno = 1.67, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.081 | | | | |
| 2 | Lens 1 | 4.405 | (ASP) | 1.300 | Plastic | 1.544 | 55.9 | 9.18 |
| 3 | | 33.349 | (ASP) | 0.133 | | | | |
| 4 | Lens 2 | 7.573 | (ASP) | 0.407 | Plastic | 1.639 | 23.5 | −22.18 |
| 5 | | 4.831 | (ASP) | 0.738 | | | | |
| 6 | Lens 3 | 31.703 | (ASP) | 0.320 | Plastic | 1.544 | 55.9 | −27.17 |
| 7 | | 10.046 | (ASP) | 0.160 | | | | |
| 8 | Lens 4 | 9.861 | (ASP) | 0.856 | Plastic | 1.544 | 55.9 | 13.56 |
| 9 | | −28.379 | (ASP) | 0.080 | | | | |
| 10 | Lens 5 | −31.530 | (ASP) | 0.547 | Plastic | 1.566 | 37.4 | −76.20 |
| 11 | | −117.932 | (ASP) | 0.596 | | | | |
| 12 | Lens 6 | −279.191 | (ASP) | 1.230 | Plastic | 1.566 | 37.4 | 52.12 |
| 13 | | −26.726 | (ASP) | 0.442 | | | | |
| 14 | Lens 7 | −5.603 | (ASP) | 0.500 | Plastic | 1.660 | 20.4 | −38.10 |
| 15 | | −7.465 | (ASP) | 0.050 | | | | |
| 16 | Lens 8 | 5.692 | (ASP) | 1.050 | Plastic | 1.544 | 55.9 | 15.71 |
| 17 | | 15.915 | (ASP) | 1.380 | | | | |
| 18 | Lens 9 | 22.475 | (ASP) | 1.300 | Plastic | 1.566 | 37.4 | −8.73 |
| 19 | | 3.965 | (ASP) | 0.800 | | | | |
| 20 | Filter | Plano | | 0.210 | Glass | 1.517 | 64.2 | — |
| 21 | | Plano | | 0.300 | | | | |
| 22 | Image | Plano | | — | | | | |

Note:
Reference wavelength is 587.6 nm (d-line).

TABLE 12

Aspheric Coefficients

| Surface # | 2 | 3 | 4 | 5 | 6 |
|---|---|---|---|---|---|
| k = | 1.8686E−01 | 1.7099E+01 | −2.8761E+01 | −1.5759E+01 | 8.9974E+01 |
| A4 = | 3.4860E−04 | −6.8746E−03 | −8.7853E−03 | 6.2545E−03 | −6.6857E−04 |
| A6 = | −1.2897E−04 | 2.4852E−03 | 2.8242E−03 | −1.5359E−03 | −1.6019E−04 |
| A8 = | 4.7388E−05 | −4.6795E−04 | −4.8057E−04 | 4.6897E−04 | 2.3716E−05 |
| A10 = | −8.5091E−06 | 5.0545E−05 | 5.1192E−05 | −7.1661E−05 | −6.5029E−06 |
| A12 = | 8.3586E−07 | −2.7962E−06 | −2.8687E−06 | 6.1113E−06 | 6.0824E−07 |
| A14 = | −3.3597E−08 | 5.5947E−08 | 5.9240E−08 | −1.8224E−07 | −1.4667E−08 |

| Surface # | 7 | 8 | 9 | 10 | 11 |
|---|---|---|---|---|---|
| k = | −5.4177E+01 | −5.3886E+01 | 7.5908E+01 | 2.1102E+01 | 4.3885E+01 |
| A4 = | 1.7188E−04 | −1.6556E−03 | −1.8641E−03 | 2.6046E−04 | −1.1505E−03 |
| A6 = | 2.4152E−05 | −8.9240E−05 | −4.7065E−05 | −2.2045E−04 | −5.9374E−04 |
| A8 = | 2.2968E−07 | 5.3423E−06 | −5.6889E−06 | −8.5282E−06 | 1.1425E−04 |
| A10 = | −1.9985E−07 | 2.7954E−07 | −1.8610E−08 | 1.3107E−05 | −1.8017E−05 |
| A12 = | −1.1786E−07 | −9.1627E−08 | 4.4751E−08 | −2.5766E−06 | 1.4616E−06 |
| A14 = | −4.3355E−09 | 1.4422E−09 | −2.8985E−09 | 2.0805E−07 | −5.4703E−08 |
| A16 = | — | — | — | −7.3503E−09 | −1.3940E−10 |

| Surface # | 12 | 13 | 14 | 15 | 16 |
|---|---|---|---|---|---|
| k = | −9.0000E+01 | 4.9813E+01 | 1.0695E+00 | −1.2624E+01 | −8.9368E+00 |
| A4 = | −4.2584E−03 | −1.0351E−02 | −6.7903E−03 | −8.0058E−03 | 6.0862E−03 |
| A6 = | −2.3604E−04 | 1.5933E−03 | 5.0763E−03 | 2.4929E−03 | −2.2875E−03 |
| A8 = | −4.6708E−05 | −3.4624E−04 | −1.5986E−03 | −5.9890E−04 | 4.5505E−04 |
| A10 = | 1.8278E−05 | 2.9511E−06 | 2.7131E−04 | 9.4800E−05 | −6.4246E−05 |
| A12 = | −4.4774E−06 | 1.4548E−05 | −2.1855E−05 | −8.9707E−06 | 5.7870E−06 |
| A14 = | 4.9086E−07 | −2.9647E−06 | 3.2020E−07 | 4.9233E−07 | −3.2234E−07 |
| A16 = | −1.9198E−08 | 2.7393E−07 | 7.3724E−08 | −1.4861E−08 | 1.0668E−08 |
| A18 = | — | −1.2636E−08 | −5.0506E−09 | 2.1037E−10 | −1.9141E−10 |
| A20 = | — | 2.3627E−10 | 1.0247E−10 | −7.7848E−13 | 1.4334E−12 |

TABLE 12-continued

| Aspheric Coefficients | | | |
|---|---|---|---|
| Surface # | 17 | 18 | 19 |
| k = | 1.9348E+00 | 4.6750E+00 | −9.4778E−01 |
| A4 = | 7.5362E−03 | −1.3901E−02 | −1.5348E−02 |
| A6 = | −1.8606E−03 | 8.1780E−04 | 1.3692E−03 |
| A8 = | 2.7432E−04 | −9.2288E−06 | −9.5586E−05 |
| A10 = | −3.1692E−05 | −2.1285E−06 | 4.7439E−06 |
| A12 = | 2.4783E−06 | 1.6027E−07 | −1.6494E−07 |
| A14 = | −1.2405E−07 | −5.1712E−09 | 3.9459E−09 |
| A16 = | 3.7919E−09 | 8.2267E−11 | −6.1667E−11 |
| A18 = | −6.4598E−11 | −5.5765E−13 | 5.6215E−13 |
| A20 = | 4.7205E−13 | 6.2085E−16 | −2.2458E−15 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 9.48 | T56/CT6 | 0.48 |
| Fno | 1.67 | ΣAT/(T23 + T89) | 1.69 |
| HFOV [deg.] | 38.7 | R8/f | −2.99 |
| V4 | 55.9 | R9/f | −3.33 |
| V7 | 20.4 | R15/R16 | 0.36 |
| V9 | 37.4 | (R17 + R18)/(R17 − R18) | 1.43 |
| Vmin | 20.4 | f/f3 | −0.35 |
| Nmax | 1.660 | f/f4 | 0.70 |
| V1/N1 | 36.22 | f4/f3 | −0.50 |
| V2/N2 | 14.34 | f/f7 | −0.25 |
| V3/N3 | 36.22 | f/f8 | 0.60 |
| V4/N4 | 36.22 | f8/f3 | −0.58 |
| V5/N5 | 23.91 | f/EPD | 1.67 |
| V6/N6 | 23.91 | Yc81/Yc82 | 0.97 |
| V7/N7 | 12.29 | f/(EPD × ImgH) [1/mm] | 0.21 |
| V8/N8 | 36.22 | ImgH [mm] | 7.83 |
| V9/N9 | 23.91 | TL/ImgH | 1.58 |
| (V/N)min | 12.29 | ImgH/BL | 5.97 |
| NV40 | 5 | SL/TL | 0.91 |
| tan(HFOV) | 0.80 | TL/f | 1.31 |
| CT8/CT9 | 0.81 | — | — |

7th Embodiment

Figure 13:
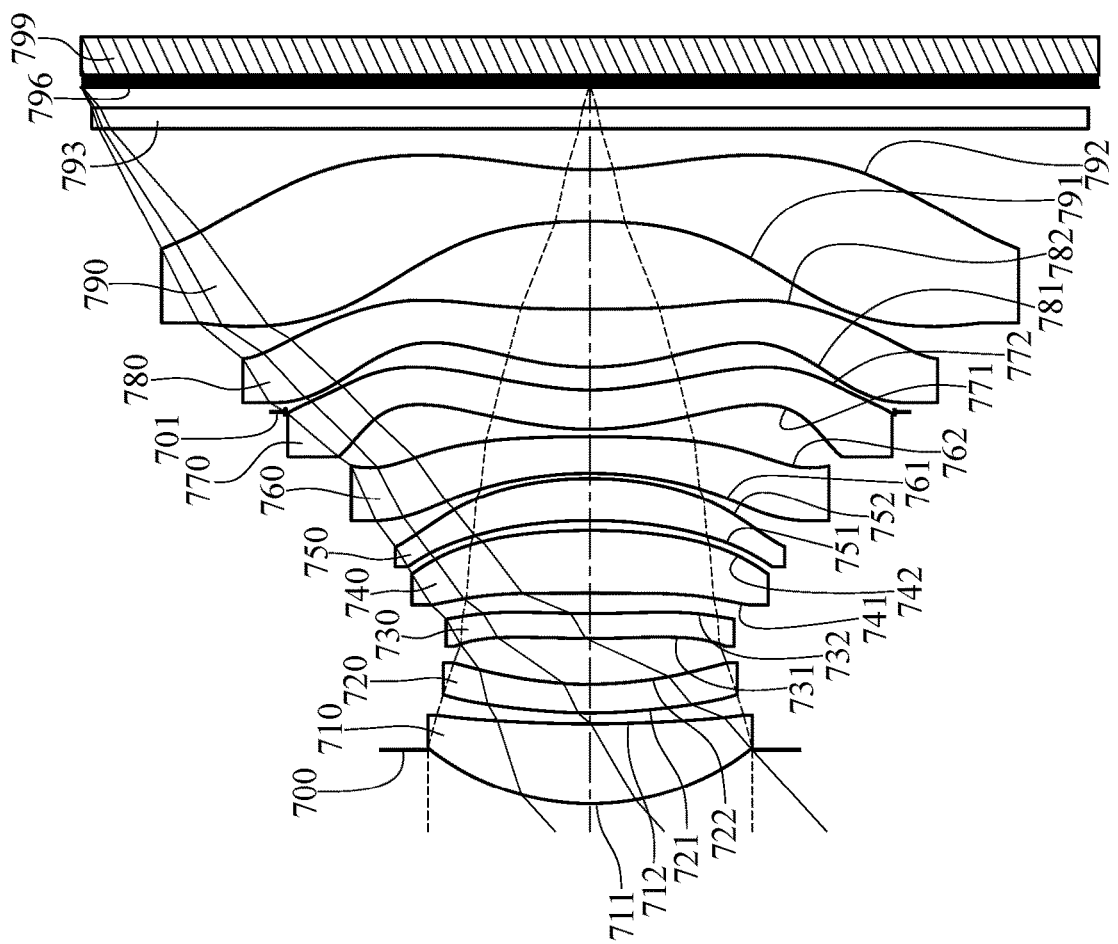
FIG. 13 is a schematic view of an image capturing unit according to the 7th embodiment of the present disclosure.
Figure 14:
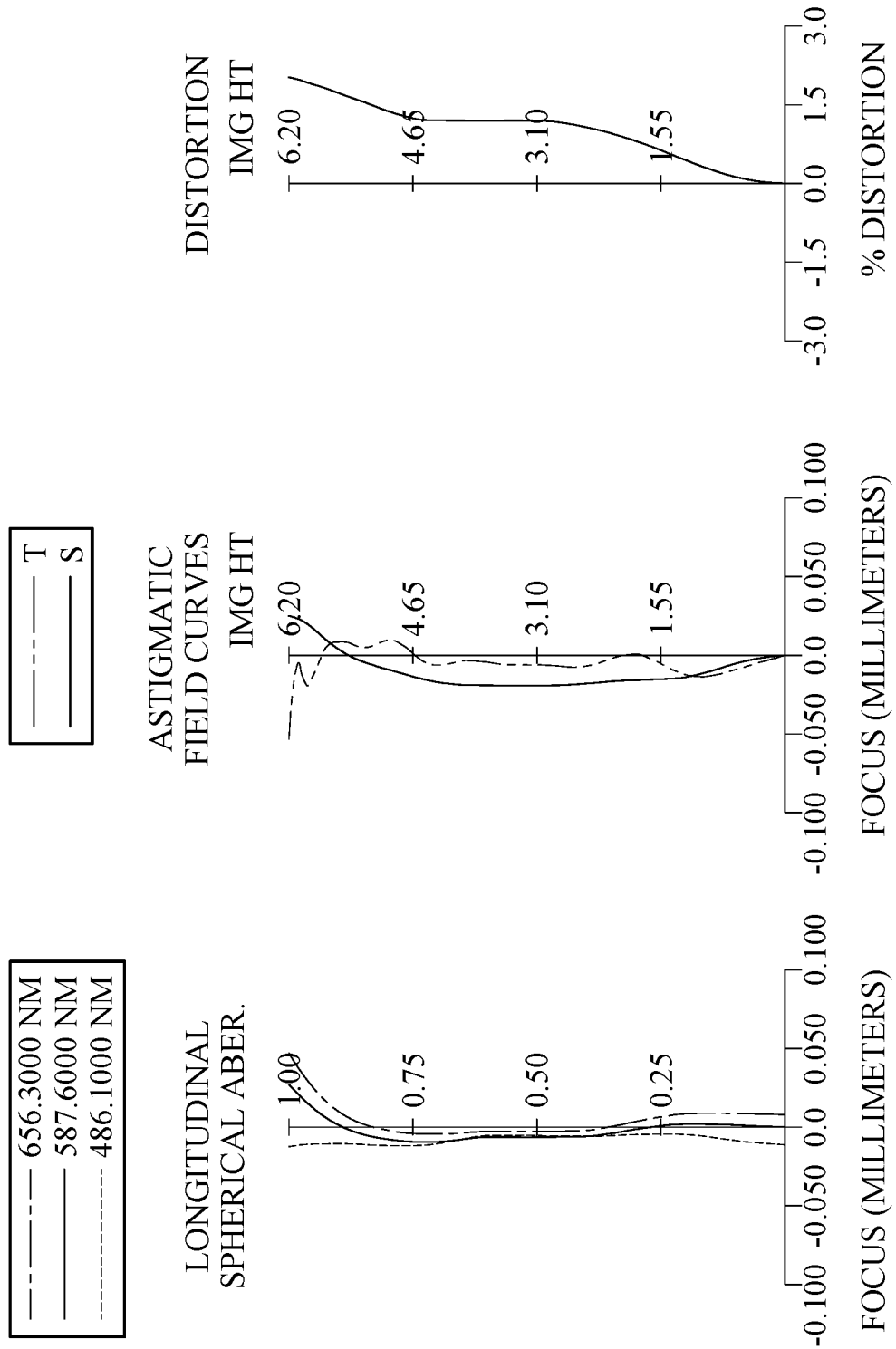
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical image lens assembly (its reference numeral is omitted) of the present disclosure and an image sensor 799. The optical image lens assembly includes, in order from an object side to an image side along an optical path, an aperture stop 700, a first lens element 710, a second lens element 720, a third lens element 730, a fourth lens element 740, a fifth lens element 750, a sixth lens element 760, a seventh lens element 770, a stop 701, an eighth lens element 780, a ninth lens element 790, a filter 793 and an image surface 796. The optical image lens assembly includes nine lens elements (710, 720, 730, 740, 750, 760, 770, 780 and 790) with no additional lens element disposed between each of the adjacent nine lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The image-side surface 722 of the second lens element 720 has one inflection point.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has one inflection point. The image-side surface 732 of the third lens element 730 has two inflection points.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has one inflection point.

The fifth lens element 750 with positive refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The image-side surface 752 of the fifth lens element 750 has one inflection point.

The sixth lens element 760 with negative refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has two inflection points. The image-side surface 762 of the sixth lens element 760 has one inflection point.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has two inflection points. The image-side surface 772 of the seventh lens element 770 has three inflection points. The image-side surface 772 of the seventh lens element 770 has at least one convex critical point in an off-axis region thereof.

The eighth lens element 780 with positive refractive power has an object-side surface 781 being convex in a paraxial region thereof and an image-side surface 782 being convex in a paraxial region thereof. The eighth lens element 780 is made of plastic material and has the object-side surface 781 and the image-side surface 782 being both aspheric. The object-side surface 781 of the eighth lens element 780 has two inflection points. The image-side surface 782 of the eighth lens element 780 has three inflection points. The object-side surface 781 of the eighth lens element 780 has at least one critical point in an off-axis region thereof. The image-side surface 782 of the eighth lens element 780 has at least one critical point in an off-axis region thereof.

The ninth lens element 790 with negative refractive power has an object-side surface 791 being concave in a paraxial region thereof and an image-side surface 792 being concave in a paraxial region thereof. The ninth lens element 790 is made of plastic material and has the object-side surface 791 and the image-side surface 792 being both aspheric. The object-side surface 791 of the ninth lens element 790 has two inflection points. The image-side surface 792 of the ninth lens element 790 has three inflection points.

The filter 793 is made of glass material and located between the ninth lens element 790 and the image surface 796, and will not affect the focal length of the optical image lens assembly. The image sensor 799 is disposed on or near the image surface 796 of the optical image lens assembly.

The detailed optical data of the 7th embodiment are shown in Table 13 and the aspheric surface data are shown in Table 14 below.

TABLE 13

7th Embodiment
f = 6.69 mm, Fno = 1.69, HFOV = 42.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.660 | | | | |
| 2 | Lens 1 | 3.240 | (ASP) | 0.980 | Plastic | 1.545 | 56.1 | 7.49 |
| 3 | | 14.020 | (ASP) | 0.132 | | | | |
| 4 | Lens 2 | 6.162 | (ASP) | 0.350 | Plastic | 1.720 | 16.0 | −26.01 |
| 5 | | 4.526 | (ASP) | 0.561 | | | | |
| 6 | Lens 3 | 13.364 | (ASP) | 0.300 | Plastic | 1.700 | 17.5 | 7677.89 |
| 7 | | 13.274 | (ASP) | 0.250 | | | | |
| 8 | Lens 4 | −7477.929 | (ASP) | 0.764 | Plastic | 1.544 | 56.0 | 14.21 |
| 9 | | −7.721 | (ASP) | 0.120 | | | | |
| 10 | Lens 5 | −5.921 | (ASP) | 0.518 | Plastic | 1.544 | 56.0 | 31.25 |
| 11 | | −4.527 | (ASP) | 0.063 | | | | |
| 12 | Lens 6 | −4.734 | (ASP) | 0.450 | Plastic | 1.639 | 23.5 | −9.73 |
| 13 | | −20.620 | (ASP) | 0.088 | | | | |
| 14 | Lens 7 | 3.696 | (ASP) | 0.480 | Plastic | 1.639 | 23.5 | −57.39 |
| 15 | | 3.188 | (ASP) | −0.271 | | | | |
| 16 | Stop | Plano | | 0.546 | | | | |
| 17 | Lens 8 | 3.218 | (ASP) | 0.711 | Plastic | 1.566 | 37.4 | 5.67 |
| 18 | | −1060.178 | (ASP) | 1.068 | | | | |
| 19 | Lens 9 | −6.626 | (ASP) | 0.637 | Plastic | 1.566 | 37.4 | −4.56 |
| 20 | | 4.371 | (ASP) | 0.500 | | | | |
| 21 | Filter | Plano | | 0.260 | Glass | 1.517 | 64.2 | — |
| 22 | | Plano | | 0.244 | | | | |
| 23 | Image | Plano | | — | | | | |

Note:
Reference wavelength is 587.6 nm (d-line).
An effective radius of the stop 701 (Surface 16) is 3.719 mm.

TABLE 14

Aspheric Coefficients

| Surface # | 2 | 3 | 4 | 5 | 6 |
|---|---|---|---|---|---|
| k = | −3.8771E−01 | −3.4007E+01 | 9.4234E−01 | 7.2170E−01 | 2.2689E+01 |
| A4 = | 1.1913E−03 | −1.2328E−02 | −2.5141E−02 | −1.8082E−02 | −2.4230E−02 |
| A6 = | 1.7543E−03 | 1.1277E−02 | 1.6653E−02 | 8.6767E−03 | −3.5006E−03 |
| A8 = | −1.8342E−03 | −6.0103E−03 | −7.7634E−03 | −3.0178E−03 | 3.1241E−03 |
| A10 = | 1.1348E−03 | 2.2958E−03 | 2.7068E−03 | 5.7545E−04 | −1.6659E−03 |

TABLE 14-continued

| Aspheric Coefficients | | | | | |
|---|---|---|---|---|---|
| A12 = | −3.7492E−04 | −6.0959E−04 | −6.6627E−04 | −8.1327E−05 | 3.8605E−04 |
| A14 = | 6.2150E−05 | 9.6901E−05 | 1.0271E−04 | 8.8435E−06 | −3.8185E−05 |
| A16 = | −4.0332E−06 | −6.3829E−06 | −6.3229E−06 | −8.8719E−07 | — |

| Surface # | 7 | 8 | 9 | 10 | 11 |
|---|---|---|---|---|---|
| k = | 9.3542E+00 | 9.0000E+01 | 6.8223E+00 | 2.4732E+00 | −2.8674E+00 |
| A4 = | −2.1339E−02 | −7.4890E−03 | −4.1830E−03 | −1.9834E−04 | −1.1675E−02 |
| A6 = | −4.6767E−03 | −4.9433E−03 | −8.7935E−04 | −2.8625E−03 | 8.8261E−04 |
| A8 = | 3.2017E−03 | 1.3456E−03 | −1.0537E−05 | 2.3764E−03 | −6.6012E−04 |
| A10 = | −1.0055E−03 | −2.6417E−04 | 6.6432E−06 | −1.1207E−03 | −3.0613E−04 |
| A12 = | 2.0878E−04 | 1.2702E−04 | 1.1131E−06 | 2.7819E−04 | 2.2570E−04 |
| A14 = | −1.4684E−05 | −2.5647E−05 | 1.2375E−07 | −3.5207E−05 | −3.9632E−05 |
| A16 = | — | 1.6450E−06 | — | 1.7964E−06 | 1.9212E−06 |
| A18 = | — | 1.2800E−09 | — | — | 6.5859E−08 |
| A20 = | — | 5.0572E−10 | — | — | −2.1351E−09 |

| Surface # | 12 | 13 | 14 | 15 | 17 |
|---|---|---|---|---|---|
| k = | −2.4596E+01 | −1.4314E+01 | 7.3386E−02 | −1.2746E+00 | −6.0772E−01 |
| A4 = | −2.0345E−02 | −2.9560E−03 | −3.9838E−02 | −6.5478E−02 | −2.2451E−02 |
| A6 = | 1.4339E−03 | −4.2541E−03 | 2.4676E−02 | 3.6805E−02 | 2.2232E−03 |
| A8 = | 3.5796E−03 | 1.1621E−03 | −1.2840E−02 | −1.4470E−02 | −7.7711E−04 |
| A10 = | −3.2180E−03 | 5.2753E−05 | 4.0172E−03 | 3.4905E−03 | 4.4580E−05 |
| A12 = | 1.2386E−03 | −1.0322E−04 | −8.2440E−04 | −5.3397E−04 | 1.3527E−05 |
| A14 = | −2.4851E−04 | 2.5478E−05 | 1.1310E−04 | 5.1799E−05 | −2.3840E−06 |
| A16 = | 2.7442E−05 | −2.7917E−06 | −1.0187E−05 | −3.0752E−06 | 1.6347E−07 |
| A18 = | −1.5888E−06 | 1.4103E−07 | 5.4509E−07 | 1.0177E−07 | −5.3709E−09 |
| A20 = | 3.7648E−08 | −2.5834E−09 | −1.2932E−08 | −1.4383E−09 | 7.0338E−11 |

| Surface # | 18 | 19 | 20 |
|---|---|---|---|
| k = | 2.0000E+01 | −3.4977E+01 | −8.1167E−01 |
| A4 = | 3.6700E−02 | −2.5439E−02 | −2.6744E−02 |
| A6 = | −1.3733E−02 | 1.7782E−03 | 3.1141E−03 |
| A8 = | 2.3357E−03 | 1.1237E−04 | −2.5256E−04 |
| A10 = | −2.4922E−04 | −9.7624E−06 | 1.1207E−05 |
| A12 = | 1.7461E−05 | −1.0842E−06 | −1.3922E−07 |
| A14 = | −7.5590E−07 | 1.6116E−07 | −9.0053E−09 |
| A16 = | 1.6705E−08 | −8.1437E−09 | 4.1682E−10 |
| A18 = | −6.2090E−11 | 1.9237E−10 | −6.1673E−12 |
| A20 = | −2.6764E−12 | −1.7951E−12 | 2.3153E−14 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.69 | T56/CT6 | 0.14 |
| Fno | 1.69 | ΣAT/(T23 + T89) | 1.57 |
| HFOV [deg.] | 42.3 | R8/f | −1.15 |
| V4 | 56.0 | R9/f | −0.88 |
| V7 | 23.5 | R15/R16 | 0.00 |
| V9 | 37.4 | (R17 + R18)/(R17 − R18) | 0.21 |
| Vmin | 16.0 | f/f3 | 0.00 |
| Nmax | 1.720 | f/f4 | 0.47 |
| V1/N1 | 36.30 | f4/f3 | 0.00 |
| V2/N2 | 9.30 | f/f7 | −0.12 |
| V3/N3 | 10.29 | f/f8 | 1.18 |
| V4/N4 | 36.26 | f8/f3 | 0.00 |
| V5/N5 | 36.26 | f/EPD | 1.69 |

| -continued | | | |
|---|---|---|---|
| 7th Embodiment | | | |
| V6/N6 | 14.34 | Yc81/Yc82 | 24.14; 0.96; 48.16; 1.92 |
| V7/N7 | 14.34 | f/(EPD × ImgH) [1/mm] | 0.27 |
| V8/N8 | 23.91 | ImgH [mm] | 6.20 |
| V9/N9 | 23.91 | TL/ImgH | 1.41 |
| (V/N)min | 9.30 | ImgH/BL | 6.17 |
| NV40 | 6 | SL/TL | 0.92 |
| tan(HFOV) | 0.91 | TL/f | 1.31 |
| CT8/CT9 | 1.12 | — | — |

8th Embodiment

Figure 15:
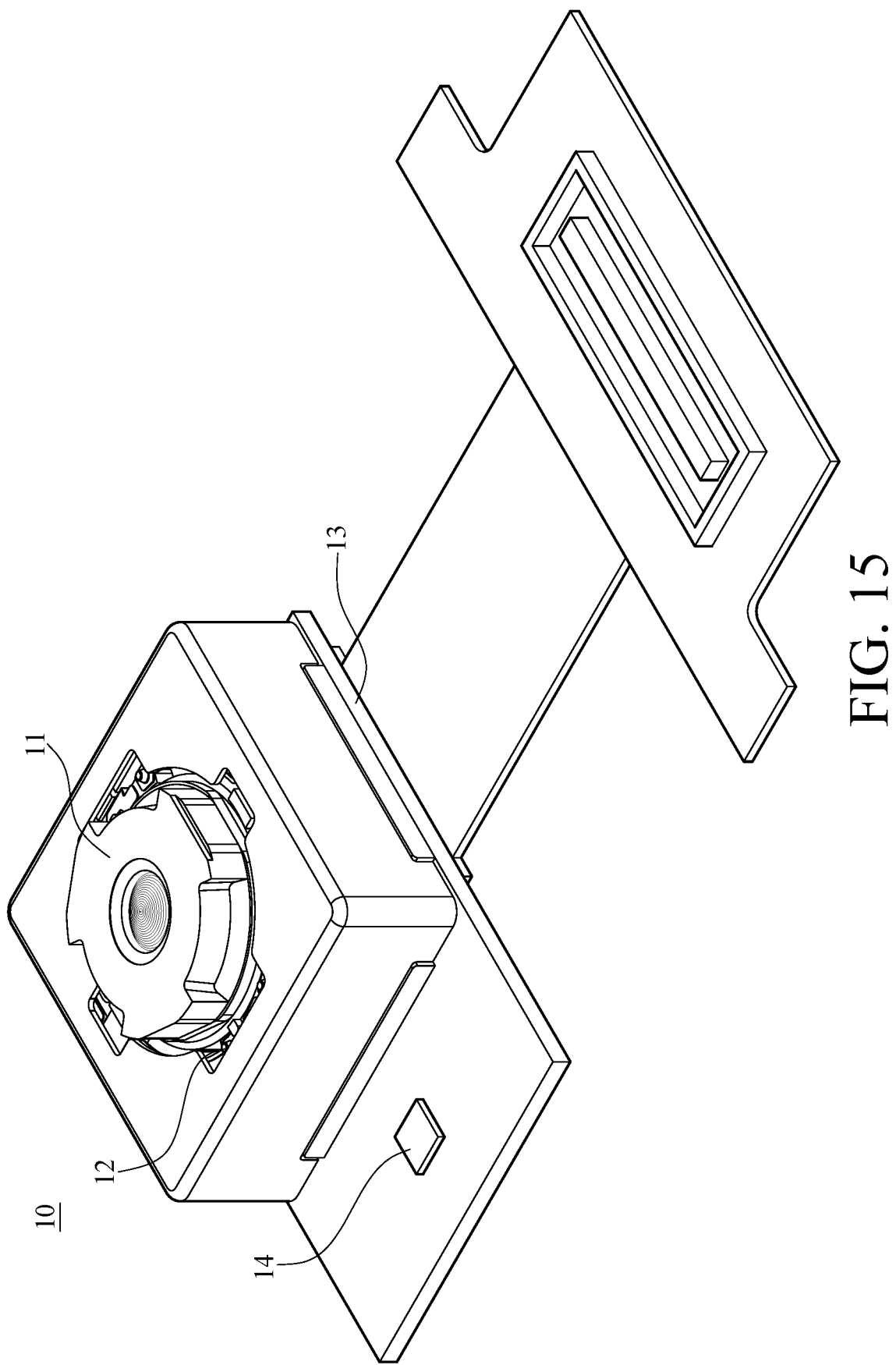
FIG. 15 is a perspective view of an image capturing unit according to the 8th embodiment of the present disclosure.

FIG. 15 is a perspective view of an image capturing unit according to the 8th embodiment of the present disclosure. In this embodiment, an image capturing unit 10 is a camera module including a lens unit 11, a driving device 12, an image sensor 13 and an image stabilizer 14. The lens unit 11 includes the optical image lens assembly disclosed in the 1st embodiment, a barrel and a holder member (their reference numerals are omitted) for holding the optical image lens assembly. However, the lens unit 11 may alternatively be provided with the optical image lens assembly disclosed in other abovementioned embodiments, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical image lens assembly to provide higher image quality. Moreover, the image sensor 13 can have at least 40 megapixels. Therefore, it is favorable for providing a better image detail. Moreover, the image sensor 13 can have a size larger than 1/1.4 inches (1/1.4"). Therefore, it is favorable for providing better image quality of the high-pixel image sensor. Additionally, the size of the image sensor being 1/1.4" has an effective area with a diagonal of approximately 11.4 mm.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

9th Embodiment

Figure 16:
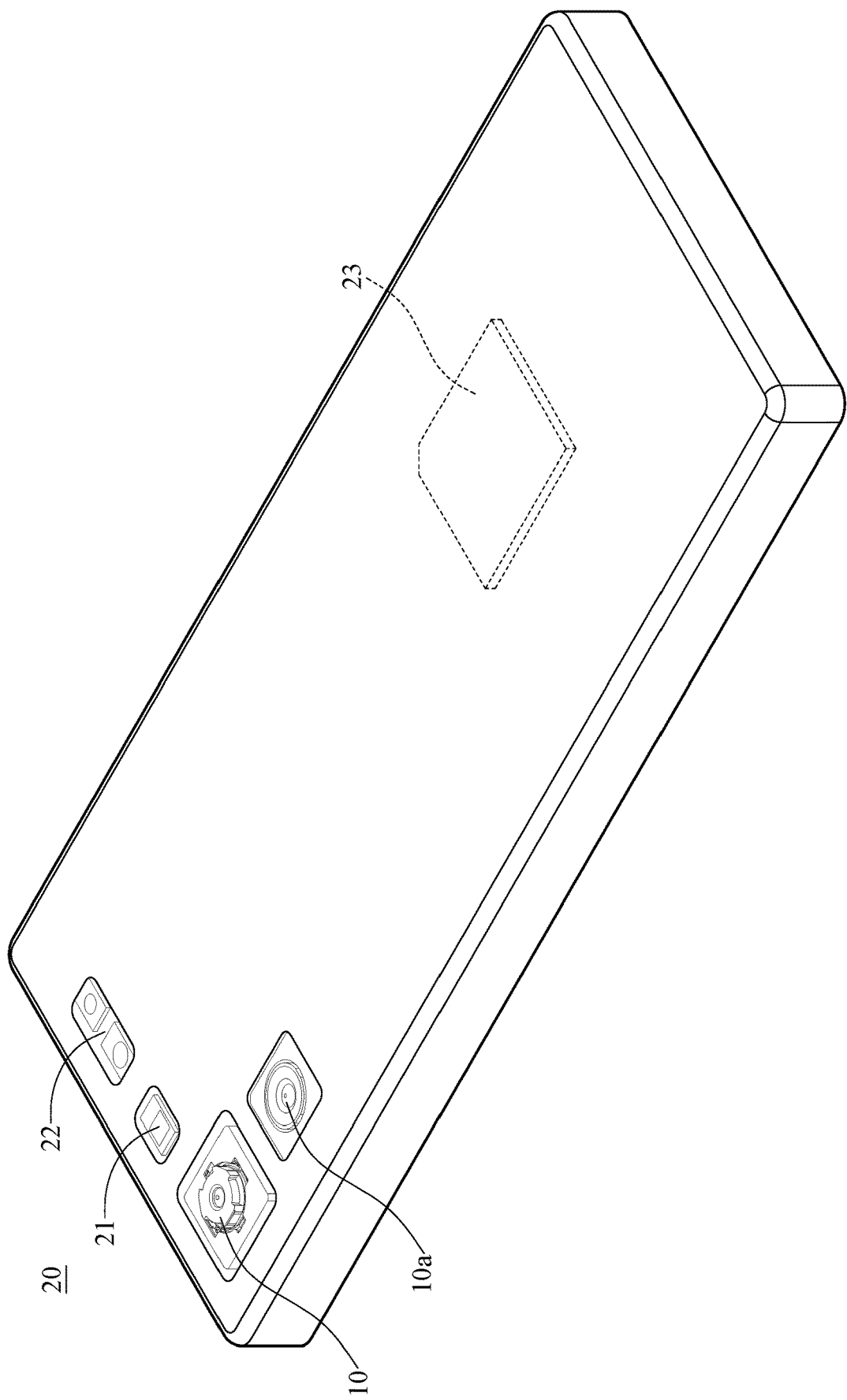
FIG. 16 is one perspective view of an electronic device according to the 9th embodiment of the present disclosure.
Figure 17:
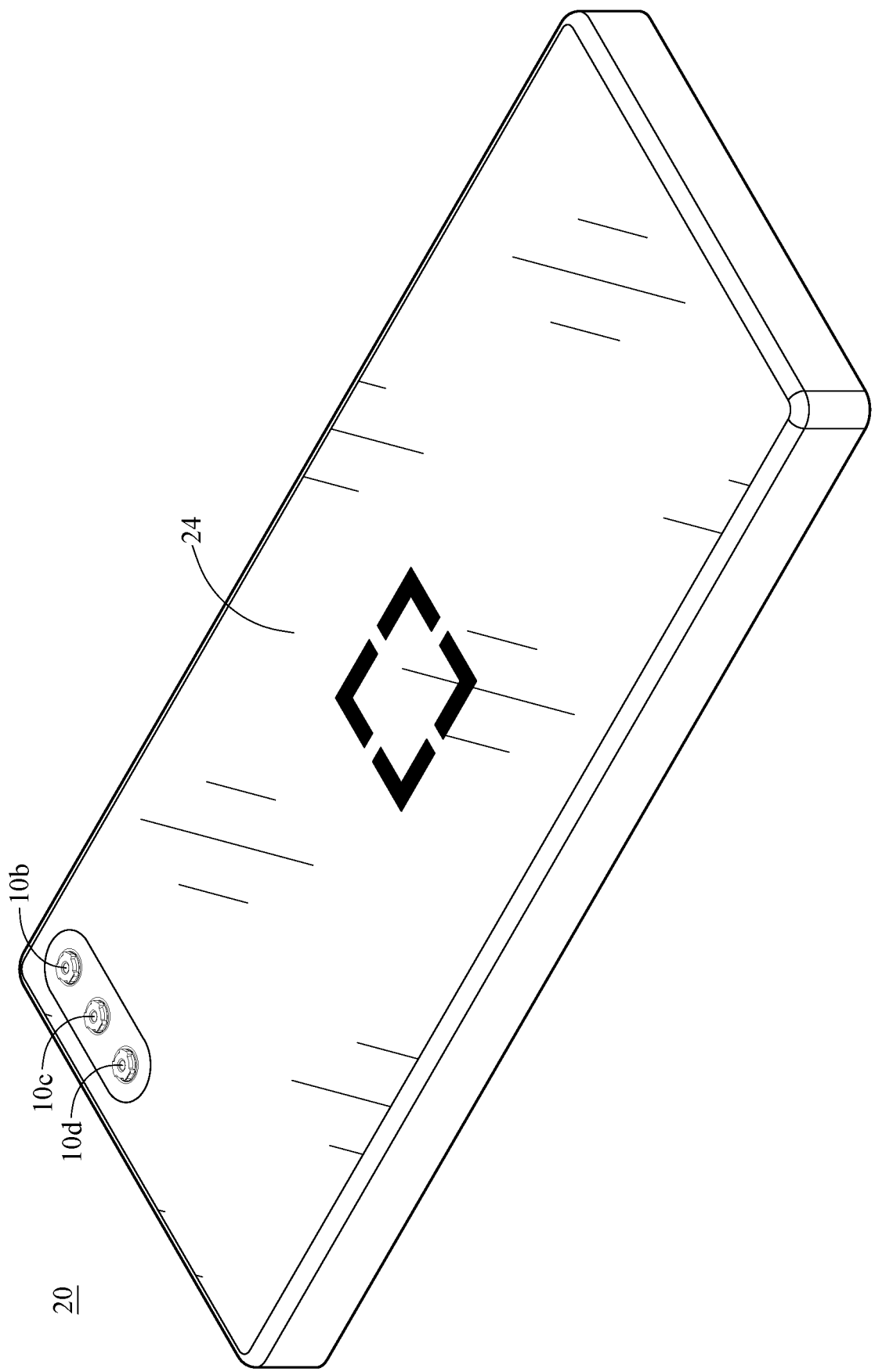
FIG. 17 is another perspective view of the electronic device in FIG. 16.
Figure 18:
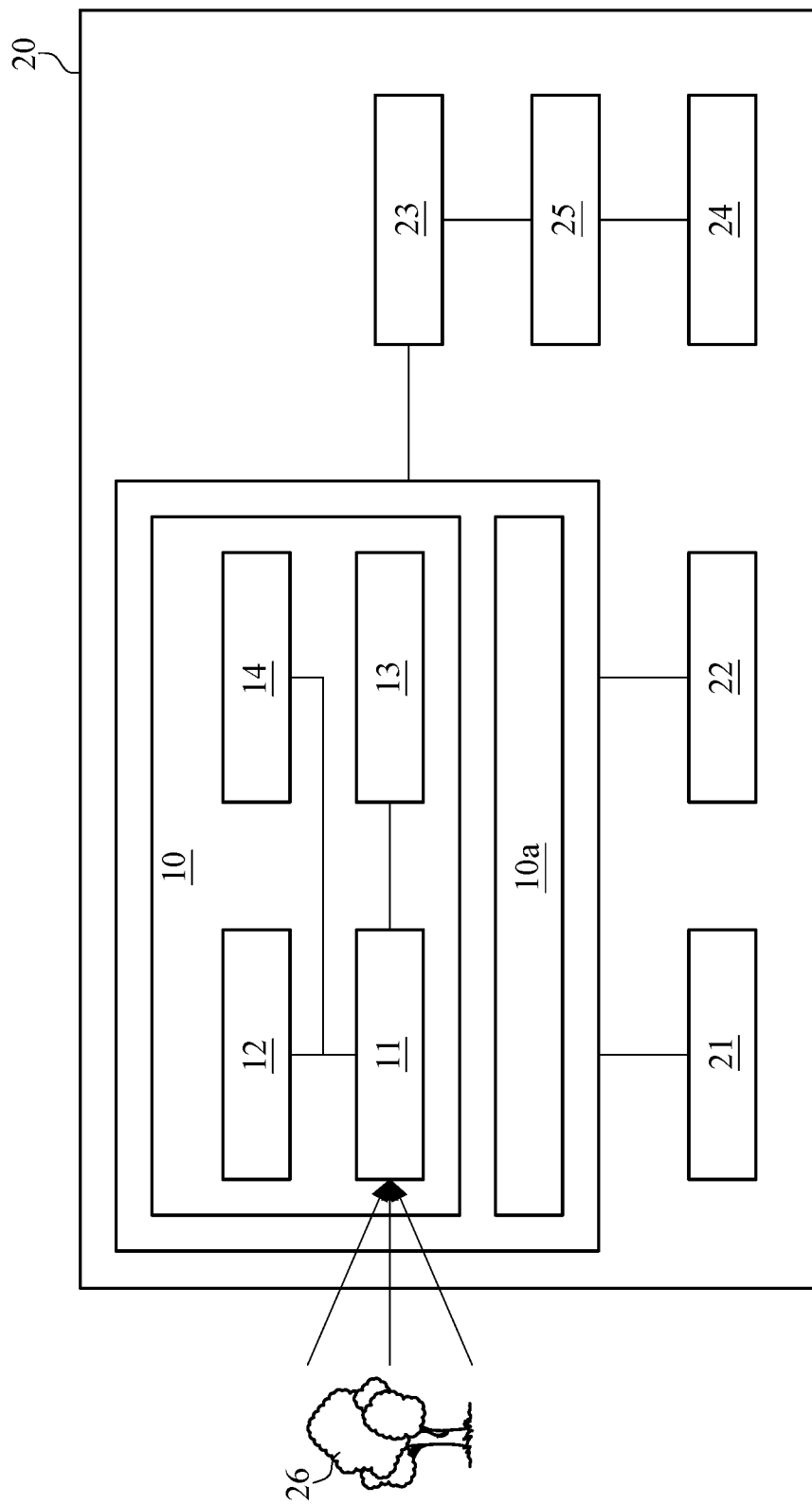
FIG. 18 is a block diagram of the electronic device in FIG. 16.

FIG. 16 is one perspective view of an electronic device according to the 9th embodiment of the present disclosure. FIG. 17 is another perspective view of the electronic device in FIG. 16. FIG. 18 is a block diagram of the electronic device in FIG. 16.

In this embodiment, an electronic device 20 is a smartphone including the image capturing unit 10 disclosed in the 8th embodiment, an image capturing unit 10a, an image capturing unit 10b, an image capturing unit 10c, an image capturing unit 10d, a flash module 21, a focus assist module 22, an image signal processor 23, a user interface 24 and an image software processor 25. The image capturing unit 10 and the image capturing unit 10a are disposed on the same side of the electronic device 20 and each of the image capturing units 10 and 10a has a single focal point. The image capturing unit 10b, the image capturing unit 10c, the image capturing unit 10d and the user interface 24 are disposed on the opposite side of the electronic device 20 and the user interface 24 is a display unit, such that the image capturing units 10b, 10c, 10d can be front-facing cameras of the electronic device 20 for taking selfies, but the present disclosure is not limited thereto. Furthermore, each of the image capturing units 10a, 10b, 10c and 10d can include the optical image lens assembly of the present disclosure and can have a configuration similar to that of the image capturing unit 10. In detail, each of the image capturing units 10a, 10b, 10c and 10d can include a lens unit, a driving device, an image sensor and an image stabilizer, and each of the lens unit can include an optical lens assembly such as the optical image lens assembly of the present disclosure, a barrel and a holder member for holding the optical lens assembly.

The image capturing unit 10 is a wide-angle image capturing unit, the image capturing unit 10a is an ultra-wide-angle image capturing unit, the image capturing unit 10b is a wide-angle image capturing unit, the image capturing unit 10c is an ultra-wide-angle image capturing unit, and the image capturing unit 10d is a ToF (time of flight) image capturing unit. In this embodiment, the image capturing units 10, 10a, 10b and 10c have different fields of view, such that the electronic device 20 can have various magnification ratios so as to meet the requirement of optical zoom functionality. Moreover, a maximum field of view of the image capturing unit 10 and a maximum field of view of one of the image capturing unit 10a, image capturing unit 10b, the image capturing unit 10c and the image capturing unit 10d can differ by at least 20 degrees. Therefore, it is favorable for obtaining images with different ranges and details for the electronic device 20 so as to meet various usage scenarios. In addition, the image capturing unit 10d can determine depth information of the imaged object. In this embodiment, the electronic device 20 includes multiple image capturing units 10, 10a, 10b, 10c and 10d, but the present disclosure is not limited to the number and arrangement of image capturing units.

When a user captures images of an object 26, light rays converge in the image capturing unit 10 or the image capturing unit 10a to generate images, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the light rays may converge in the image capturing unit 10b, 10c or 10d to generate images. The user interface 24 can be a touch screen or a physical button. The user is able to interact with the user interface 24 and the image software processor 25 having multiple functions to capture images and complete image processing. The image processed by the image software processor 25 can be displayed on the user interface 24.

10th Embodiment

Figure 19:
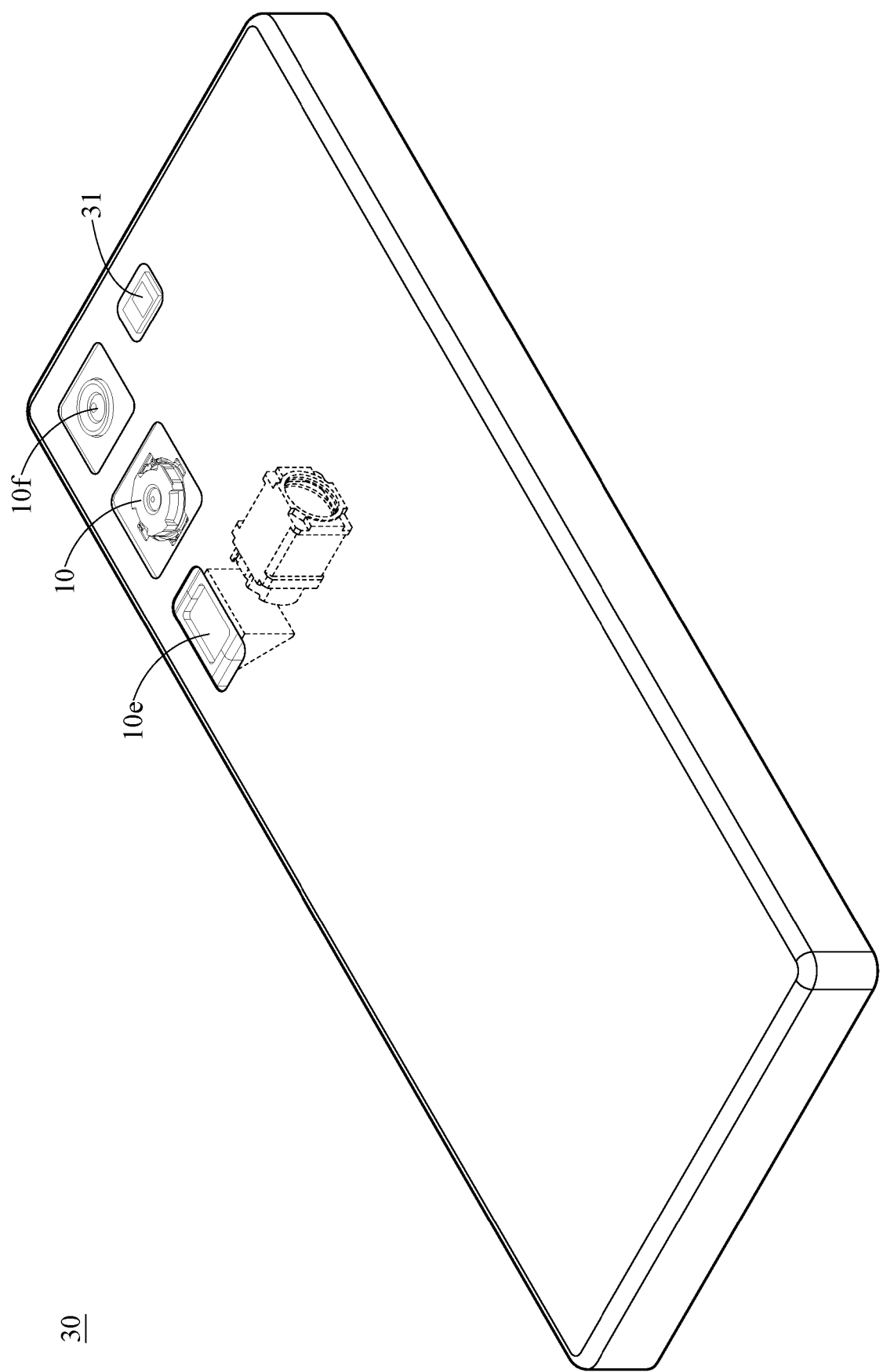
FIG. 19 is one perspective view of an electronic device according to the 10th embodiment of the present disclosure.

FIG. 19 is one perspective view of an electronic device according to the 10th embodiment of the present disclosure.

In this embodiment, an electronic device 30 is a smartphone including the image capturing unit 10 disclosed in the 8th embodiment, an image capturing unit 10e, an image capturing unit 10f, a flash module 31, a focus assist module, an image signal processor, a display unit and an image software processor (not shown). The image capturing unit 10, the image capturing unit 10e and the image capturing unit 10f are disposed on the same side of the electronic device 30, while the display unit is disposed on the opposite side of the electronic device 30. Furthermore, each of the image capturing units 10e and 10f can include the optical image lens assembly of the present disclosure and can have a configuration similar to that of the image capturing unit 10, so the details in this regard will not be provided again.

The image capturing unit 10 is a wide-angle image capturing unit, the image capturing unit 10e is a telephoto image capturing unit, and the image capturing unit 10f is an ultra-wide-angle image capturing unit. In this embodiment, the image capturing units 10, 10e and 10f have different fields of view, such that the electronic device 30 can have various magnification ratios so as to meet the requirement of optical zoom functionality. Moreover, the image capturing unit 10e can be a telephoto image capturing unit having a light-folding element configuration, such that the total track length of the image capturing unit 10e is not limited by the thickness of the electronic device 30. Moreover, the light-folding element configuration of the image capturing unit 10e can be similar to, for example, one of the structures shown in FIG. 22 to FIG. 24 which can be referred to foregoing descriptions corresponding to FIG. 22 to FIG. 24 so the details in this regard will not be provided again. In this embodiment, the electronic device 30 includes multiple image capturing units 10, 10e and 10f, but the present disclosure is not limited to the number and arrangement of image capturing units. When a user captures images of an object, light rays converge in the image capturing unit 10, 10e or 10f to generate images and the flash module 31 is activated for light supplement. Further, the subsequent processes are performed in a manner similar to the abovementioned embodiment, so the details in this regard will not be provided again.

11th Embodiment

Figure 20:
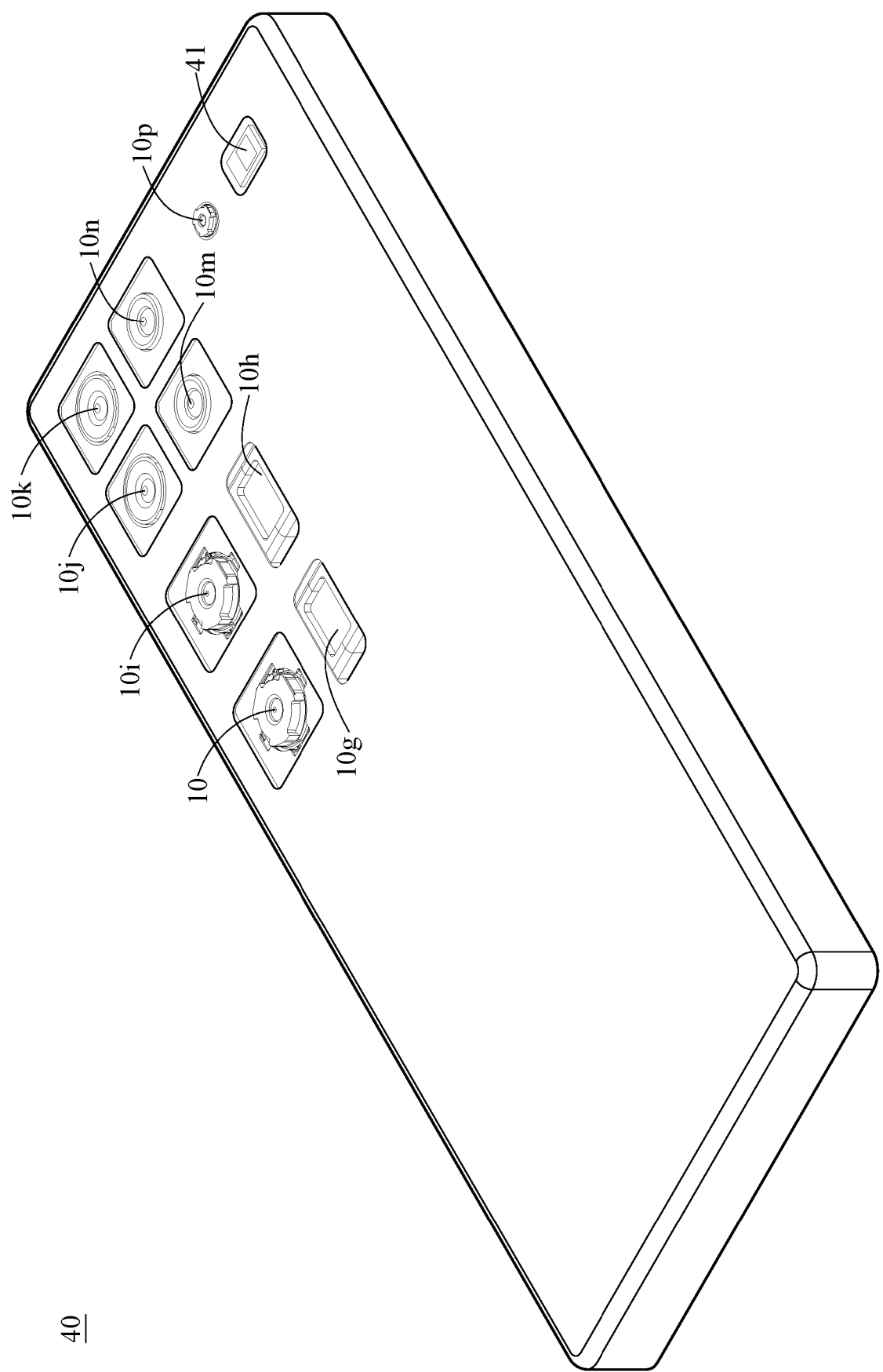
FIG. 20 is one perspective view of an electronic device according to the 11th embodiment of the present disclosure.

FIG. 20 is one perspective view of an electronic device according to the 11th embodiment of the present disclosure.

In this embodiment, an electronic device 40 is a smartphone including the image capturing unit 10 disclosed in the 8th embodiment, an image capturing unit 10g, an image capturing unit 10h, an image capturing unit 10i, an image capturing unit 10j, an image capturing unit 10k, an image capturing unit 10m, an image capturing unit 10n, an image capturing unit 10p, a flash module 41, a focus assist module, an image signal processor, a display unit and an image software processor (not shown). The image capturing unit 10, 10g, 10h, 10i, 10j, 10k, 10m, 10n and 10p are disposed on the same side of the electronic device 40, while the display unit is disposed on the opposite side of the electronic device 40. Furthermore, each of the image capturing units 10g, 10h, 10i, 10j, 10k, 10m, 10n and 10p can include the optical image lens assembly of the present disclosure and can have a configuration similar to that of the image capturing unit 10, so the details in this regard will not be provided again.

The image capturing unit 10 is a wide-angle image capturing unit, the image capturing unit 10g is a telephoto image capturing unit, the image capturing unit 10h is a telephoto image capturing unit, the image capturing unit 10i is a wide-angle image capturing unit, the image capturing unit 10j is an ultra-wide-angle image capturing unit, the image capturing unit 10k is an ultra-wide-angle image capturing unit, the image capturing unit 10m is a telephoto image capturing unit, the image capturing unit 10n is a telephoto image capturing unit, and the image capturing unit 10p is a ToF image capturing unit. In this embodiment, the image capturing units 10, 10g, 10h, 10i, 10j, 10k, 10m and 10n have different fields of view, such that the electronic device 40 can have various magnification ratios so as to meet the requirement of optical zoom functionality. Moreover, each of the image capturing units 10g and 10h can be a telephoto image capturing unit having a light-folding element configuration. Moreover, the light-folding element configuration of each of the image capturing unit 10g and 10h can be similar to, for example, one of the structures shown in FIG. 22 to FIG. 24 which can be referred to foregoing descriptions corresponding to FIG. 22 to FIG. 24 so the details in this regard will not be provided again. In addition, the image capturing unit 10p can determine depth information of the imaged object. In this embodiment, the electronic device 40 includes multiple image capturing units 10, 10g, 10h, 10i, 10j, 10k, 10m, 10n and 10p, but the present disclosure is not limited to the number and arrangement of image capturing units. When a user captures images of an object, light rays converge in the image capturing unit 10, 10g, 10h, 10i, 10j, 10k, 10m, 10n or 10p to generate images, and the flash module 41 is activated for light supplement. Further, the subsequent processes are performed in a manner similar to the abovementioned embodiments, so the details in this regard will not be provided again.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical image lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image lens assembly substantially consisting of nine lens elements, the nine lens elements being, in order from an object side to an image side along an optical path, a first lens element, a second lens element, a third lens element, a fourth lens element, a fifth lens element, a sixth lens element, a seventh lens element, an eighth lens element and a ninth lens element, and each of the nine lens elements having an object-side surface facing toward the object side and an image-side surface facing toward the image side;

wherein the first lens element has positive refractive power, the second lens element has negative refractive power, the fourth lens element has positive refractive power, at least one of the object-side surface and the image-side surface of the eighth lens element has at least one inflection point, and at least one of the object-side surface and the image-side surface of the ninth lens element has at least one inflection point; and wherein a focal length of the optical image lens assembly is f, a focal length of the fourth lens element is f4, an entrance pupil diameter of the optical image lens assembly is EPD, and the following conditions are satisfied:

0.30<f/f4<2.50; and 0.80<f/EPD<1.85.

2. The optical image lens assembly of claim 1, wherein the image-side surface of the second lens element is concave in a paraxial region thereof, the seventh lens element has negative refractive power, the ninth lens element has negative refractive power, and the image-side surface of the ninth lens element is concave in a paraxial region thereof.

3. The optical image lens assembly of claim 1, wherein at least five lens elements of the optical image lens assembly are made of plastic material, and the image-side surface of the seventh lens element is concave in a paraxial region thereof and has at least one convex critical point in an off-axis region thereof.

4. The optical image lens assembly of claim 1, wherein the nine lens elements comprise at least four materials with different refractive indices;
wherein the focal length of the optical image lens assembly is f, a focal length of the seventh lens element is f7, and the following condition is satisfied:

−3.0<f/f7<0.15.

5. The optical image lens assembly of claim 1, wherein there is an air gap in a paraxial region between each of all adjacent lens elements of the optical image lens assembly;
wherein an axial distance between the object-side surface of the first lens element and an image surface is TL, a maximum image height of the optical image lens assembly is ImgH, and the following condition is satisfied:

0.50<TL/ImgH<1.55.

6. The optical image lens assembly of claim 1, wherein a total number of lens elements having an Abbe number smaller than 40 in the optical image lens assembly is NV40, and the following condition is satisfied:

5≤NV40≤9.

7. The optical image lens assembly of claim 1, wherein a maximum image height of the optical image lens assembly is ImgH, an axial distance between the image-side surface of the ninth lens element and an image surface is BL, and the following condition is satisfied:

3.90<ImgH/BL<15.0.

8. The optical image lens assembly of claim 1, wherein a curvature radius of the image-side surface of the fourth lens element is R8, the focal length of the optical image lens assembly is f, a focal length of the third lens element is f3, and the following conditions are satisfied:

−2.50<R8/f<1.30; and

−2.0<f/f3<0.05.

9. The optical image lens assembly of claim 1, wherein the focal length of the optical image lens assembly is f, a focal length of the eighth lens element is f8, a curvature radius of the object-side surface of the fifth lens element is R9, and the following conditions are satisfied:

0.40<f/f8<2.00; and

−10.0<R9/f<15.0.

10. The optical image lens assembly of claim 1, wherein the focal length of the optical image lens assembly is f, the entrance pupil diameter of the optical image lens assembly is EPD, a maximum image height of the optical image lens assembly is ImgH, and the following conditions are satisfied:

0.10 [1/mm]<f/(EPD×ImgH)<0.28 [1/mm]; and 5.80 [mm]<ImgH<9.0 [mm].

11. The optical image lens assembly of claim 1, wherein the object-side surface of the eighth lens element has at least one critical point in an off-axis region thereof, the image-side surface of the eighth lens element has at least one critical point in an off-axis region thereof, a vertical distance between the at least one critical point on the object-side surface of the eighth lens element and an optical axis is Yc81, a vertical distance between the at least one critical point on the image-side surface of the eighth lens element and the optical axis is Yc82, and the following condition is satisfied:

0.20<Yc81/Yc82<3.0.

12. An image capturing unit, comprising:
the optical image lens assembly of claim 1; and
an image sensor disposed on an image surface of the optical image lens assembly, wherein the image sensor has at least 40 megapixels.

13. An electronic device, comprising at least two image capturing units which face a same side, wherein the at least two image capturing units comprise:
a first image capturing unit, comprising the optical image lens assembly of claim 1 and an image sensor that is disposed on an image surface of the optical image lens assembly; and
a second image capturing unit, comprising an optical lens assembly and an image sensor that is disposed on an image surface of the optical lens assembly; and
wherein a maximum field of view of the first image capturing unit and a maximum field of view of the second image capturing unit differ by at least 20 degrees.

14. The optical image lens assembly of claim 1, wherein a central thickness of the fourth lens element is larger than an axial distance between the seventh lens element and the eighth lens element, the image-side surface of the ninth lens element has at least one inflection point, and the optical image lens assembly further comprises an aperture stop located at an object side of the second lens element; and
wherein a total number of lens elements having an Abbe number smaller than 40 in the optical image lens assembly is NV40, a focal length of the third lens element is f3, and the following conditions are satisfied:

5≤NV40≤9; and

−2.0<f/f3<0.05.

15. The optical image lens assembly of claim 14, wherein the image-side surface of the second lens element is concave in a paraxial region thereof, the seventh lens element has negative refractive power, the eighth lens element has positive refractive power, and the ninth lens element has negative refractive power.

16. The optical image lens assembly of claim 14, wherein the object-side surface of the second lens element is convex in a paraxial region thereof, and the image-side surface of the eighth lens element is concave in a paraxial region thereof; and wherein a focal length of the eighth lens element is f8, and the following condition is satisfied:

$-1.3 < f8/f3 < 0.15$.

17. The optical image lens assembly of claim 14, wherein the image-side surface of the seventh lens element is concave in a paraxial region thereof; and
wherein an axial distance between the object-side surface of the first lens element and an image surface is TL, a maximum image height of the optical image lens assembly is ImgH, and the following condition is satisfied:

$0.50 < TL/ImgH < 1.55$.

18. The optical image lens assembly of claim 14, a sum of axial distances between each of all adjacent lens elements of the optical image lens assembly is ΣAT, an axial distance between the second lens element and the third lens element is T23, and an axial distance between the eighth lens element and the ninth lens element is T89, and the following condition is satisfied:

$1.0 < \Sigma AT/(T23+T89) < 2.25$.

19. The optical image lens assembly of claim 14, wherein half of a maximum field of view of the optical image lens assembly is HFOV, and the following condition is satisfied:

$0.80 < \tan(HFOV) < 3.0$.

20. The optical image lens assembly of claim 14, wherein an Abbe number of the ninth lens element is V9, and the following condition is satisfied:

$8.0 < V9 < 50.0$.

21. The optical image lens assembly of claim 14, wherein a maximum image height of the optical image lens assembly is ImgH, and the following conditions are satisfied:

$0.10 \text{ [1/mm]} < f/(EPD \times ImgH) < 0.28 \text{ [1/mm]}$; and $5.80 \text{ [mm]} < ImgH < 9.0 \text{ [mm]}$.

22. An image capturing unit, comprising:
the optical image lens assembly of claim 14; and
an image sensor disposed on an image surface of the optical image lens assembly, wherein the image sensor has a size larger than 1/1.4 inches.

23. The optical image lens assembly of claim 1, wherein the object-side surface of the eighth lens element has at least one inflection point; and
wherein a maximum image height of the optical image lens assembly is ImgH, an axial distance between the image-side surface of the ninth lens element and an image surface is BL, an Abbe number of the ninth lens element is V9, and the following conditions are satisfied:

$3.90 < ImgH/BL < 15.0$; and $8.0 < V9 < 50.0$.

24. The optical image lens assembly of claim 23, wherein the image-side surface of the second lens element is concave in a paraxial region thereof, the image-side surface of the ninth lens element is concave in a paraxial region thereof and has at least one inflection point in an off-axis region thereof, and there is an air gap in a paraxial region between each of all adjacent lens elements of the optical image lens assembly.

25. The optical image lens assembly of claim 23, wherein the seventh lens element has negative refractive power, the eighth lens element has positive refractive power, and the ninth lens element has negative refractive power; and
wherein half of a maximum field of view of the optical image lens assembly is HFOV, and the following condition is satisfied:

$0.80 \leq \tan(HFOV) < 3.0$.

26. The optical image lens assembly of claim 23, wherein the image-side surface of the eighth lens element is concave in a paraxial region thereof, and there is no relative displacement between any two lens elements of the optical image lens assembly; and
wherein the optical image lens assembly further comprises an aperture stop, an axial distance between the aperture stop and the image surface is SL, an axial distance between the object-side surface of the first lens element and the image surface is TL, and the following condition is satisfied:

$0.73 < SL/TL < 0.98$.

27. The optical image lens assembly of claim 23, wherein an axial distance between the object-side surface of the first lens element and the image surface is TL, a sum of axial distances between each of all adjacent lens elements of the optical image lens assembly is ΣAT, an axial distance between the second lens element and the third lens element is T23, and an axial distance between the eighth lens element and the ninth lens element is T89, and the following conditions are satisfied:

$0.80 < TL/f < 1.50$; and $1.0 < \Sigma AT/(T23+T89) < 3.0$.

28. The optical image lens assembly of claim 23, wherein a focal length of the seventh lens element is f7, a curvature radius of the object-side surface of the eighth lens element is R15, a curvature radius of the image-side surface of the eighth lens element is R16, and the following conditions are satisfied:

$-3.0 < f/f7 < 0.15$; and $-0.50 < R15/R16 < 0.70$.

* * * * *